(12) United States Patent
Schwartz

(10) Patent No.: US 10,592,854 B2
(45) Date of Patent: Mar. 17, 2020

(54) PLANOGRAM MATCHING

(71) Applicant: Edward L. Schwartz, Menlo Park, CA (US)

(72) Inventor: Edward L. Schwartz, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 576 days.

(21) Appl. No.: 15/164,633

(22) Filed: May 25, 2016

(65) Prior Publication Data
US 2017/0178060 A1 Jun. 22, 2017

Related U.S. Application Data

(60) Provisional application No. 62/269,899, filed on Dec. 18, 2015.

(51) Int. Cl.
*G06Q 10/08* (2012.01)
*G06K 9/00* (2006.01)
*G06K 9/46* (2006.01)
*G06K 9/62* (2006.01)

(52) U.S. Cl.
CPC ....... *G06Q 10/087* (2013.01); *G06K 9/00771* (2013.01); *G06K 9/4604* (2013.01); *G06K 9/6202* (2013.01); *G06K 9/6267* (2013.01)

(58) Field of Classification Search
CPC .................................................. G06Q 10/087
See application file for complete search history.

(56) References Cited

U.S. PATENT DOCUMENTS

| 5,848,399 | A | 12/1998 | Burke |
| 7,949,568 | B2 * | 5/2011 | Fano ........................ G06K 9/00 356/4.03 |
| 8,725,595 | B1 | 5/2014 | Siegel et al. |
| 2003/0033217 | A1 | 2/2003 | Cutlip |
| 2003/0154141 | A1 | 8/2003 | Capazario et al. |
| 2004/0133483 | A1 | 7/2004 | Potter et al. |
| 2005/0021561 | A1 | 1/2005 | Noonan |
| 2005/0203790 | A1 | 9/2005 | Cohen |

(Continued)

FOREIGN PATENT DOCUMENTS

| CN | 101809601 B | * | 3/2015 | ............... G06K 9/00 |
| EP | 2913779 A1 | | 9/2015 | |

OTHER PUBLICATIONS

Leonardo Weiss Ferreira Chaves et al. "Finding Misplaced items in Retail by Clustering RFID Data" dated Mar. 22, 2010, 12 pages.

(Continued)

*Primary Examiner* — Scott A Zare
(74) *Attorney, Agent, or Firm* — Patent Law Works LLP

(57) ABSTRACT

Methods and systems for planogram matching are described. The methods include capturing an image, processing the image to identify a product based on a symbolic identifier, receiving a planogram, identifying a region of a planogram based on a linear grouping, determining a geometrically consistent match between the product and a sample product included in the region of the planogram, and determining an alignment between the region of the planogram and a corresponding region of the image that includes the product. The methods may further include determining a location in the corresponding region that does not include an expected product based on the planogram.

20 Claims, 61 Drawing Sheets

(56) References Cited

U.S. PATENT DOCUMENTS

| | | |
|---|---|---|
| 2005/0256726 A1 | 11/2005 | Benson et al. |
| 2006/0190341 A1 | 8/2006 | Riley et al. |
| 2007/0288296 A1 | 12/2007 | Lewis |
| 2008/0077511 A1 | 3/2008 | Zimmerman |
| 2008/0144934 A1 | 6/2008 | Raynaud |
| 2008/0147475 A1 | 6/2008 | Gruttadauria |
| 2008/0208719 A1 | 8/2008 | Sharma et al. |
| 2008/0306787 A1 | 12/2008 | Hamilton et al. |
| 2009/0059270 A1 | 3/2009 | Opalach et al. |
| 2009/0063306 A1 | 3/2009 | Fano et al. |
| 2009/0063307 A1* | 3/2009 | Groenovelt .......... G06Q 10/087 705/28 |
| 2009/0192921 A1 | 7/2009 | Hicks |
| 2010/0070388 A1 | 3/2010 | Spindler et al. |
| 2010/0171826 A1 | 7/2010 | Hamilton et al. |
| 2010/0217681 A1 | 8/2010 | Geikie et al. |
| 2011/0011936 A1 | 1/2011 | Morandi et al. |
| 2011/0050396 A1 | 3/2011 | Chaves |
| 2011/0295764 A1 | 12/2011 | Cook et al. |
| 2012/0022913 A1 | 1/2012 | Volkmann et al. |
| 2012/0223943 A1 | 9/2012 | Williams et al. |
| 2012/0323620 A1 | 12/2012 | Hofman et al. |
| 2012/0324515 A1 | 12/2012 | Dashevskiy et al. |
| 2013/0076726 A1 | 3/2013 | Ferrara et al. |
| 2013/0119138 A1 | 5/2013 | Winkel |
| 2013/0173435 A1 | 7/2013 | Cozad, Jr. |
| 2013/0204750 A1 | 8/2013 | Nordman et al. |
| 2013/0226825 A1 | 8/2013 | Hathaway et al. |
| 2014/0045515 A1 | 2/2014 | Austin et al. |
| 2014/0058781 A1 | 2/2014 | Padmanabhan et al. |
| 2014/0129354 A1 | 5/2014 | Soon-Shiong |
| 2014/0201040 A1 | 7/2014 | Birch |
| 2014/0304124 A1 | 10/2014 | Amelmann et al. |
| 2015/0046299 A1 | 2/2015 | Yan |
| 2015/0052027 A1 | 2/2015 | Pavani et al. |
| 2015/0088703 A1 | 3/2015 | Yan |
| 2015/0123973 A1* | 5/2015 | Larsen .................... G06T 15/04 345/427 |
| 2015/0220784 A1 | 8/2015 | Gold |
| 2015/0262116 A1* | 9/2015 | Katircioglu .......... G06Q 10/087 705/28 |
| 2015/0324725 A1 | 11/2015 | Roesbery et al. |
| 2016/0119540 A1* | 4/2016 | Wu .................... H04N 5/23238 348/38 |
| 2016/0224857 A1 | 8/2016 | Zhang et al. |
| 2016/0371634 A1* | 12/2016 | Kumar ................. G06Q 10/087 |

OTHER PUBLICATIONS

European Search Report for EP Application No. 16201851.9-1901 dated May 30, 2017, 10 pages.

Anonoymous, "Bossa Nova Robotics IP Inc.; Researches Submit Patent Application, 'Data Reduction in a Bar Code Reading Robot Shelf Monitoring System,' for Approval (USPTO 20190034864)," Journal of Robotics & Machine Learning [Atlanta], Feb. 18, 2019, 10 pgs.

* cited by examiner

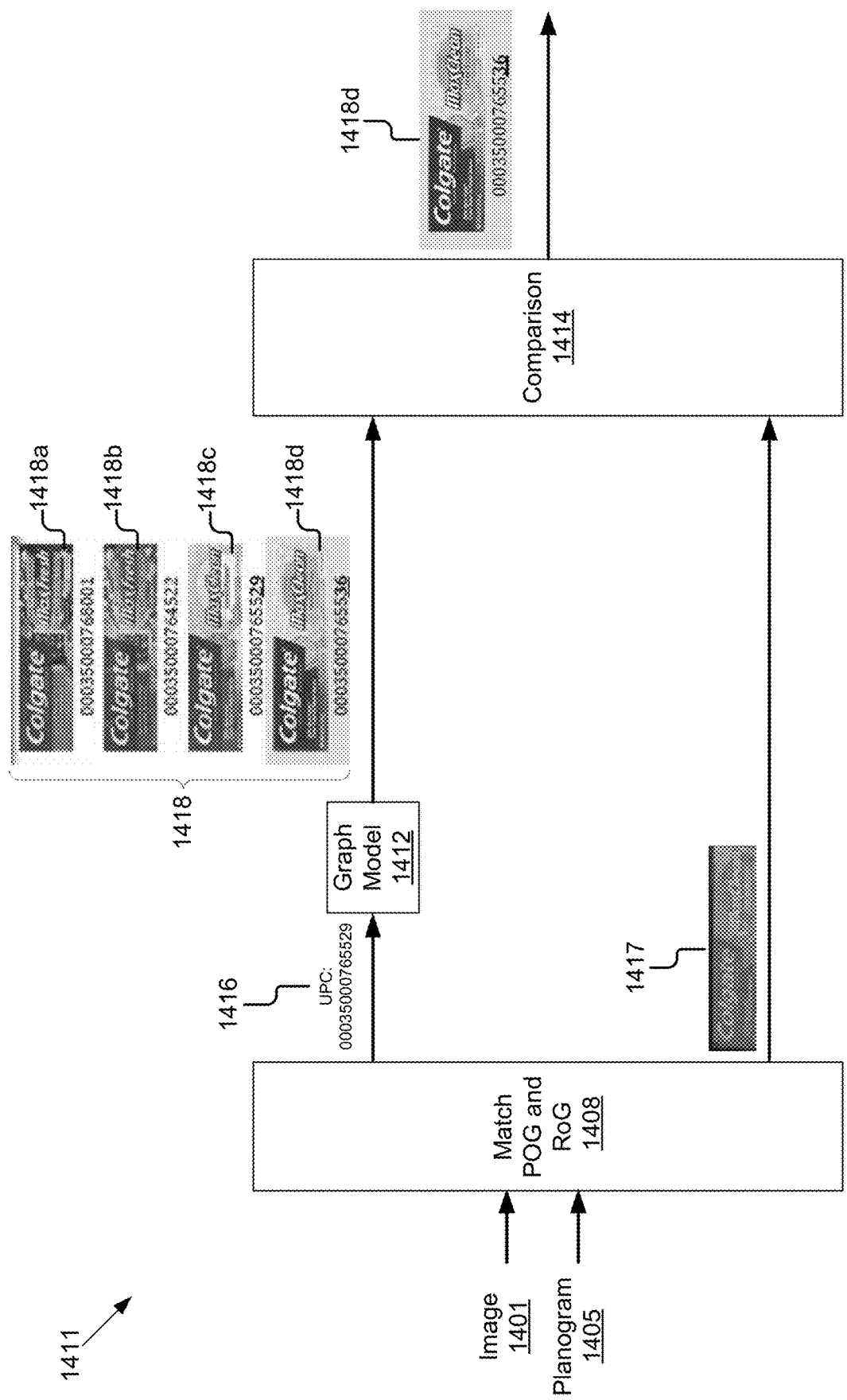

| Brand | POG (Ideal) | REAL | Delta |
|---|---|---|---|
| XXXXXXX | 17.285418 | 16.597479 | 0.688 |
| XXX | 0.330742 | 0.551155 | 0.22 |
| XXXXXX | 14.620726 | 16.912154 | 2.291 |
| XXXXXXXX | 0.833107 | 0.767595 | 0.066 |
| XXXX | 5.068824 | 6.117992 | 1.049 |
| XXXXX | 0.143831 | 0 | |
| XXXXXXXX | 0.323098 | 0.278551 | 0.044 |
| XXXXXXXXX | 1.164544 | 0.930361 | 0.234 |
| XXX | 2.298515 | 2.069341 | 0.229 |
| XXXXXXXXX | 5.1661 | 5.163842 | 0.002 |
| XXXXXX | 0.288356 | 0 | |
| XXXXXX | 1.075605 | 0.41217 | 0.663 |
| XXXXXXXXXX | 3.994608 | 4.66058 | 0.666 |
| XXXXXXX | 17.573079 | 16.429395 | 1.144 |
| XXXXXXXXXX | 0.165371 | 0 | |
| XXXXX | 0.432882 | 0.593865 | 0.161 |
| XXXXXXXXXXXXXX | 0.591305 | 0.558407 | 0.033 |
| XXXXXXX | 2.049069 | 1.491465 | 0.558 |
| XXXXXXXXX | 9.976443 | 9.374411 | 0.602 |
| XXXXXXX | 13.345701 | 14.410152 | 1.064 |
| XXXXXX | 2.896769 | 2.321485 | 0.575 |
| XXX | 0.175793 | 0.157819 | 0.018 |

PLANOGRAM MATCHING

CROSS REFERENCE TO RELATED APPLICATIONS

The present application claims priority, under 35 U.S.C. § 119, of U.S. Provisional Patent Application No. 62/269,899, filed Dec. 18, 2015 and entitled "Suggestion Generation Based on Planogram Matching," which is incorporated by reference in its entirety.

BACKGROUND

1. Field of the Invention

The specification generally relates to a system and method for performing planogram (POG) matching between an image and a planogram (POG). In particular, the specification relates to a system and method for analyzing and extracting data and a product from images and comparing that data and the product to a planogram to determine alignment differences that may be used for corrective actions, ground truth generation, and recognition.

2. Description of the Background Art

A planogram (POG) is a visual representation of products in a retail environment. For example, a planogram may describe where in the retail environment and in what quantity products should be located. Such planograms are known to be effective tools for increasing sales, managing inventory and otherwise ensuring that the desired quantity of objects are placed to optimize profits or other parameters. However, presentation and maintenance of adequate levels of stock on shelves, racks and displays stands is a labor-intensive effort, thereby making enforcement of planograms difficult. In addition, the planograms and the actual retail environment change over time, which make the maintenance of the actual retail environment more difficult. An approach that can capture overall data including time-changing information and provide real-time feedback is desired.

SUMMARY

The techniques introduced herein overcome the deficiencies and limitations of the prior art, at least in part, with a system and method of planogram matching. In one embodiment, the method includes capturing an image, processing the image to identify a product based on a symbolic identifier, receiving a planogram; identifying a region of the planogram based on a linear grouping, determining a geometrically consistent match between the product and a sample product included in the region of the planogram, and determining an alignment between the region of the planogram and a corresponding region of the image that includes the product.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

FIGS. 14A-14C are a block diagram of an example data flow for comparing an image to a planogram.

FIGS. 29A-29B are block diagrams of examples of share of shelf.

DETAILED DESCRIPTION

Figure 1:
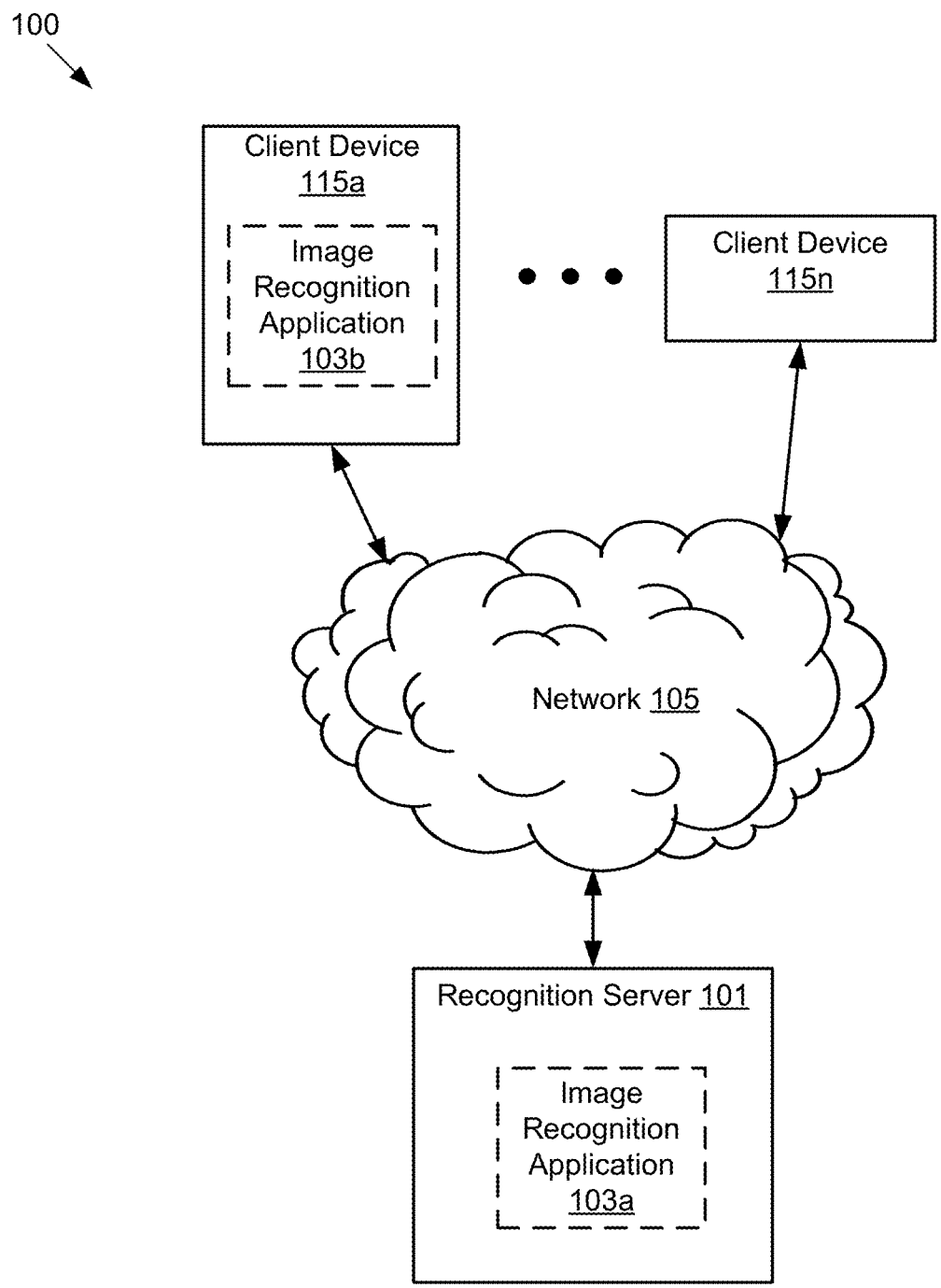
FIG. 1 is a high-level block diagram illustrating one embodiment of a system for classifying conditions of a data stream of an object.

FIG. 1 is a high-level block diagram illustrating one embodiment of a system 100 for classifying conditions of a data stream of an object. In some embodiments, an image may be the result of panoramic stitching of multiple images. In some embodiments, an image is understood to be any or all of multiple images from a scene that may include information describing the relationships between the images. The illustrated system 100 may have client devices 115a . . . 115n that can be accessed by users and a recognition server 101. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the client devices 115 and the recognition server 101, in practice one or more networks 105 can be connected to these entities.

In one embodiment, the system 100 includes a recognition server 101 coupled to the network 105. In some embodiments, the recognition server 101 may be either a hardware server, a software server, or a combination of software and hardware. The recognition server 101 may be, or may be implemented by, a computing device including a processor, a memory, applications, a database, and network communication capabilities. In the example of FIG. 1, the components of the recognition server 101 are configured to implement an image recognition application 103a described in more detail below. In one embodiment, the recognition server 101 provides services to a consumer packaged goods firm for identifying products on shelves, racks, or displays. While the examples herein describe recognition of products in an image of shelves, such as a retail display, it should be understood that the image may include any arrangement of organized objects. For example, the image may be of a warehouse, stockroom, storeroom, cabinet, etc. Similarly, the objects, in addition to retail products, may be tools, parts used in manufacturing, construction or maintenance, medicines, first aid supplies, emergency or safety equipment, etc.

In some embodiments, the recognition server 101 sends and receives data to and from other entities of the system 100 via the network 105. For example, the recognition server 101 sends and receives data including images of objects to and from the client device 115. The images of objects received by the recognition server 101 can include an image captured by the client device 115, an image copied from a website or an email, or an image from any other source. Although only a single recognition server 101 is shown in FIG. 1, it should be understood that there may be any number of recognition servers 101 or a server cluster.

The client device 115 may be a computing device that includes a memory, a processor and a camera, for example a laptop computer, a desktop computer, a tablet computer, a mobile telephone, a smartphone, a personal digital assistant (PDA), a mobile email device, a webcam, a user wearable computing device or any other electronic device capable of accessing a network 105. The client device 115 provides general graphics and multimedia processing for any type of application. The client device 115 includes a display for viewing information provided by the recognition server 101. While FIG. 1 illustrates two client devices 115a and 115n, the disclosure applies to a system architecture having one or more client devices 115.

The client device 115 is adapted to send and receive data to and from the recognition server 101. For example, in one embodiment, the client device 115 sends a query image to the recognition server 101 and the recognition server 101 provides data in JSON (JavaScript Object Notation) format about one or more objects recognized in the query image to the client device 115.

The image recognition application 103 may include software and/or logic to provide the functionality for generating a data stream including information of a plurality of objects based on processing one or more images with the objects, classifying conditions of the data stream and generating suggestion based on a condition, among other things. In some embodiments, the image recognition application 103 can be implemented using programmable or specialized hardware. In some embodiments, the image recognition application 103 can be implemented using a combination of hardware and software. In other embodiments, the image recognition application 103 may be stored and executed on a combination of the client devices 115 and the recognition server 101, or by any one of the client devices 115 or recognition server 101.

In some embodiments, the image recognition application 103b acts as a thin-client application with some functionality executed on the client device 115 and additional functionality executed on the recognition server 101 by image recognition application 103a. For example, the image recognition application 103b on the client device 115 could include software and/or logic for capturing the image, transmitting the image to the recognition server 101, and displaying image recognition results. A thin-client application 103b may include further functionality described herein with reference to image recognition application 103, such as processing the image and performing feature identification.

In some embodiments, the image recognition application 103 receives an image. For example, the image may be of a shelf stocking breakfast cereal boxes in a retail supermarket. The image recognition application 103 determines a plurality of objects from the image. In some embodiments, the image recognition application 103 may identify an object (e.g., a breakfast box) from the image. In other embodiments, the image recognition application 103 may determine an unindexed object (e.g., a red box with a flower on it) from the image without discovering a matching object in a database. The image recognition application 103 generates a data stream including information of the plurality of objects collected at one time or over time. For example, the data stream may include prices of a product every week.

The image recognition application 103 determines various conditions such as out of stock condition, recall condition, etc., from the data stream and automatically generates a suggestion based on the condition. The suggestion can be advice for performing a corrective action. For example, for a new product condition where an unindexed product is not yet identified, the image recognition application 103 generates advice for capturing additional information of the unindexed product, updating the data stream with the additional information, and adding the additional information to the database for indexing the product. The suggestion can also be a notification. Continuing with the above example, the image recognition module 103 may generate a notification notifying the presence of the new product for purpose of competitive awareness and tracking, or notifying that the portion of data may be used in making a business plan. The operation of the image recognition application 103 and the functions listed above are described in more detail below with reference to FIGS. 3-12.

The approach described herein is advantageous in many ways. The image recognition application 103 collects data in a greater frequency than that of human surveys, field work, etc., and generates a data stream including up-to-date data. The image recognition application 103 can then generate real-time feedback based on the up-to-date data. For example, the image recognition application 103 can instruct a representative to get stock of a product at the same day the product stock out occurs. Also the image recognition application 103 generates practical feedback or suggestion for a user to perform an action. For example, the image recognition application 103 tells a user at which location a product is misplaced, which product should be placed at that location, and to which location the misplaced product should be moved. The image recognition application 103 automatically generates a suggestion that provides accurate instructions or solutions to address difficult problems for a human. For example, for the situation such as a "hidden out of stock" in a store where a missing product has been covered up with a different product in the same space, a store representative may not realize there is a problem, much less solving the problem. However, the image recognition application 103 can automatically discover such problem and provide clear and accurate solution. In addition, the image recognition application 103 presents graphical data to a user to vividly and intuitively understand a problem.

In some embodiments, the image recognition application 103 may perform a matching between an image and a planogram to generate real world ground truths. The image recognition application 103 may match by aligning the planogram, or a portion of the planogram, with the image, or a portion of the image. The image recognition application 103 may identify expected products within the planogram and the location of where corresponding products should be in the image. In some embodiments, the alignment by the image recognition application 103 may use imperfect recognition results, where expected products from the planogram do not perfectly match with corresponding products in the image. These imperfect recognition results may be generated by the image recognition application 103 using images from various image capture and processing systems (not shown). In further embodiments, the image recognition application 103 may identify visually similar products using a similar product graph model to generate visually similar recommendations. The image recognition application 103 may provide the visually similar recommendations to the user interface module 213 for manual comparison. The results of the manual comparison may be used as real world ground truth data.

In some embodiments, the image recognition application 103 may perform product recognition using planogram matching. In some embodiments, the image recognition application 103 performs product recognition by performing product detection and product classification. In further implementations, the image recognition application 103 may be configured to perform a second product recognition after a first product recognition. In the second product recognition, the product detection is to identify locations where products are expected using a planogram, but no products were found in those locations in the first product recognition.

Figure 2:
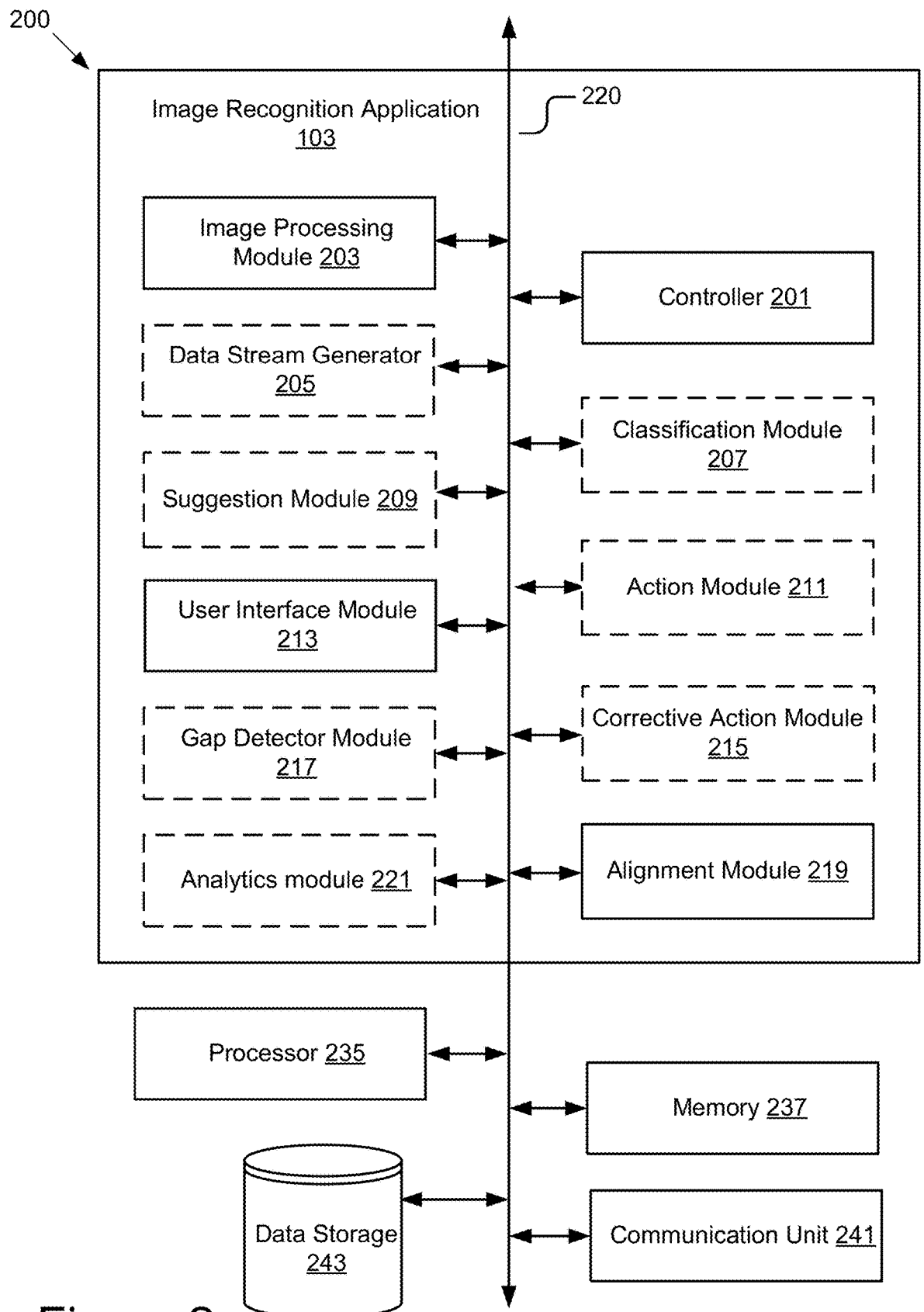
FIG. 2 is a block diagram illustrating one embodiment of a computing device including an image recognition application.

FIG. 2 is a block diagram illustrating one embodiment of a computing device 200 including an image recognition application 103. The computing device 200 may also include a processor 235, a memory 237, a communication unit 241, and data storage 243 according to some examples. The components of the system 200 are communicatively coupled to a bus or software communication mechanism 220 for communication with each other. In some embodiments, the computing device 200 may be a client device 115, a recognition server 101, or a combination of a client device 115 and a recognition server 101.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of images, capturing and transmitting images, performing complex tasks including various types of feature extraction and sampling, etc. In some implementations, the processor 235 may be coupled to the memory 237 via the bus 220 to access data and instructions therefrom and store data therein. The bus 220 may couple the processor 35 to the other components of the computing device 200 including, for example, the memory 237, the communication unit 241, the image recognition application 103, and the data storage 243. It will be apparent to one skilled in the art that other processors, operating systems, sensors, displays and physical configurations are possible.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, in one embodiment, the memory 237 may store the image recognition application 103. The memory 237 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, a static random access memory (SRAM) device, an embedded memory device, a discrete memory device (e.g., a PROM, FPROM, ROM), a hard disk drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. For example, the memory 237 may include, but is not limited to, one or more of a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blu-Ray™, etc.). It should be understood that the memory 237 may be a single device or may include multiple types of devices and configurations.

The communication unit 241 is hardware for receiving and transmitting data by linking the processor 235 to the network 105 and other processing systems. The communication unit 241 receives data such as requests from the client device 115 and transmits the requests to the controller 201, for example a request to process an image including a plurality of objects to generate a data stream. The communication unit 241 also transmits information including advice for performing a corrective action to the client device 115 for display, for example, in response to a condition classified from the data stream. The communication unit 241 is coupled to the bus 220. In one embodiment, the communication unit 241 may include a port for direct physical connection to the client device 115 or to another communication channel. For example, the communication unit 241 may include an RJ45 port or similar port for wired communication with the client device 115. In another embodiment, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as TCP/IP, HTTP, HTTPS and SMTP as will be understood to those skilled in the art.

The data storage 243 is a non-transitory memory that stores data for providing the functionality described herein.

The data storage 243 may be a dynamic random access memory (DRAM) device, a static random access memory (SRAM) device, flash memory or some other memory devices. In some embodiments, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the data storage 243 is communicatively coupled to the bus 220. The data storage 243 stores data for analyzing a received image and results of the analysis and other functionality as described herein. For example, the data storage 243 may store images of a plurality of objects received from the client device 115, a data stream including object information of the plurality of objects, conditions classified from the data stream, and advice and notification generated based on one or more conditions. The data stored in the data storage 243 is described below in more detail.

In some embodiments, the image recognition application 103 may include a controller 201, an image processing module 203, a data stream generator 205, a classification module 207, a suggestion module 209, an action module 211, a user interface module 213, a corrective action module 215, a gap detector module 217, an alignment module 219, and an analytics module 221. The components of the image recognition application 103 are communicatively coupled via the bus 220. The components of the image recognition application 103 may include software and/or logic to provide the functionality they perform. In some embodiments, the components can be implemented using programmable or specialized hardware including a field-programmable gate array (FPGA) or an application-specific integrated circuit (ASIC). In some embodiments, the components can be implemented using a combination of hardware and software executable by processor 235. In some embodiments, the components are instructions executable by the processor 235. In some embodiments, the components are stored in the memory 237 and are accessible and executable by the processor 235. In some embodiments, one or more of the data stream generator 205, the classification module 207, the suggestion module 209, the action module 211, the user interface module 213, the corrective action module 215, the gap detector module 217, and an analytics module 221 are optional.

The controller 201 may include software and/or logic to control the operation of the other components of the image recognition application 103. The controller 201 controls the other components of the image recognition application 103 to perform the methods described below with reference to FIGS. 3 and 4. In some implementations, the processor 235, the memory 237 and other components of the image recognition application 103 can cooperate and communicate without the controller 201.

In some embodiments, the controller 201 sends and receives data, via the communication unit 241, to and from one or more of a client device 115 and a recognition server 101. For example, the controller 201 receives, via the communication unit 241, an image from a client device 115 operated by a user and sends the image to the image processing module 203. In another example, the controller 201 receives data for providing a graphical user interface to a user from the user interface module 213 and sends the data to a client device 115, causing the client device 115 to present the user interface to the user.

In some embodiments, the controller 201 receives data from other components of the image recognition application 103 and stores the data in the data storage 243. For example, the controller 201 may receive information of a plurality of objects from the image processing module 203 and stores the data in the data storage 243. In other embodiments, the controller 201 retrieves data from the data storage 243 and sends the data to other components of the image recognition application 103. For example, the controller 201 may receive a data stream including information of a plurality of objects from the data storage 243, and transmit the data to the image classification module 207.

The image processing module 203 may include software and/or logic to provide the functionality for receiving and processing one or more images and outputting information associated with a plurality of objects determined from the one or more images.

In some embodiments, the image processing module 203 receives one or more images for recognition from a user. For example, an image may include multiple products on a shelf in a retail store. The image can be an image of packaged products such as, rectangular breakfast cereal boxes, circular soda bottles, etc. captured by the client device 115 at a distance from the shelving unit. The packaged product may include textual and pictorial information printed on its surface that distinguishes it from other items on the shelf. The packaged product may also sit in an arbitrary orientation on the shelf at any given time.

The image processing module 203 extracts features from the one or more received images and matches the extracted features to those features stored in the database for recognition. The image processing module 203 identifies a plurality of objects in the one or more received images matching the stored features. The image processing module 203 returns each identified object along with object information such as an object identifier, one or more images associated with an object, a location of an object, metadata related to an object, etc.

In some embodiments, the image processing module 203 determines a unique identifier for an object identified from the one or more received images. For example, the identifier may be a universal product code (UPC) of a breakfast box, an international article number, or an international standard book number (ISBN) of a book. The image processing module 203 may also generate an identifier to uniquely identify an object, for example, a new product.

In some embodiments, the image processing module 203 determines one or more images associated with an identified object. The one or more images can be an object image, an indexed image in a database, or an image of a plurality of objects. For example, the image processing module 203 crops an object from a received image and associates the cropped image with the object. In another example, the image processing module 203 retrieves an indexed image of an object from a database stored on the data storage 243 and associates the indexed image with the object. In yet another example, when the object is a product identified from the one or more images depicting products in a retail environment, the image processing module 203 may also retrieve an image of the planogram that describes where in the retail environment and in what quantity products should be located and associate the planogram with the product.

In some embodiments, the image processing module 203 determines a location of an identified object. For example, the image processing module 203 may identify an absolute position of an object in a received image with x-y coordinates of the object. The location can also be a relative location. For example, the image processing module 203 may determine the location of product A relative to product B from a competitor, or the location of product A relative to a shelf, or the location of product A relative to other points of reference (e.g., a light source, a sign).

In some embodiments, the image processing module 203 also determines metadata related to an identified object. For example, for a product sitting on a shelf of a retailer store, the image processing module 203 may determine metadata of a product including packaging dimension, packaging identifier, price of the product as sold in the retailer store, the number of product facing (e.g., one facing for one box of a brand, two facings for two boxes of the same brand sitting side by side), shelf identifier, width, height, depth, area, diagonal length, color, product attributes such as product name, product weight, product volume, product description, product size, ingredients, nutritional information, manufacturer brand, model number, material, or the like. It will be apparent to one skilled in the art that other metadata of an identified object might be determined.

In other embodiments, the image processing module 203 may determine from the one or more received images information about an object such as an image of the object, a location of the object, metadata related to the object (e.g., color, size, etc.). The image processing module 203 may not match the object information to information stored in a database. As a result, the image processing module 203 labels this object as an unindexed object.

In some embodiments, the image processing module 203 transmits the received images, identified objects, unindexed objects and object information to the data stream generator 205. In some embodiments, the image processing module 203 receives images captured at different time and provides time series data of objects to the data stream generator 205. In some embodiments, the image processing module 203 transmits the received images, identified objects, unindexed objects, and/or object information to the alignment module 219. In other embodiments, the image processing module 203 also stores the received images, identified objects, unindexed objects and object information on the data storage 243.

The data stream generator 205 may include software and/or logic to provide the functionality for generating a data stream to include object information determined by the image processing module 203.

The data stream generator 205 receives information of an object identified from one or more received images. The data stream generator 205 may also receive information of an unindexed object determined from the one or more received images. The object information associated with an object may include an object identifier, one or more associated images, a location of the object, metadata related to the object, etc. The data stream generator 205 generates a data stream including information of a plurality of objects. The data stream includes observations of objects in real world and ideal data of the objects, which provides useful information for improvement in practice.

In some embodiments, the data stream generator 205 generates a data stream based on object information collected at one time. For example, the image processing module 203 processes the images taken at a single visit to a single store to identify objects and determine object information. The data stream generator 205 generates a single event oriented data stream based on the object information determined by the image processing module 203. In other embodiments, the data stream generator 205 generates a time series based data stream of object information, for example, from images taken during multiple visits to a store. In some other embodiments, the data stream generator 205 aggregates and summarizes object information received from the image processing module 203 to generate a data stream. For example, the data stream generator 205 generates a data stream by aggregating the object information determined from images of multiple stores of the same or different type, or by aggregating the object information determined from images of multiple stores with the same or different local demographics, or by aggregating the object information collected over time. In some embodiments, the data stream generator 205 transmits the data stream to the classification module 207. In other embodiments, the data stream generator 205 stores the data stream on the data storage 243.

The classification module 207 may include software and/or logic to provide the functionality for classifying conditions of a data stream.

The classification module 207 receives a data stream of a plurality of objects and classifies conditions of the data stream. In some embodiments, the classification module 207 determines a condition from the data stream and extracts a portion of data from the data stream based on the condition. For simplicity of description, the classification module 207 will be described below based on a data stream that includes product information of a retail environment. The data stream generator 205 generates the data stream based on images taken from a single visit to a single store, multiple visits to a single store, and multiple visits to multiple stores. It should be understood that the classification module 207 can function similarly in other environment such as warehouse, stockroom, store room, cabinet, etc. It should also be understood that the classification module 207 may determine more conditions and extract more data from the data stream than example conditions and example extracted data described below.

In some embodiments, the classification module 207 determines an out of stock or stock out condition from the data stream and extracts a portion of data from the data stream based on the stock out condition. In some embodiments, the classification module 207 identifies missing products on a shelf (e.g., based on the voids of the shelf) of an image taken from a single visit to a store and determines a regular stock out condition. The classification module 207 extracts location data of the missing products (e.g., x-y coordinates of the missing products in the image) from the data stream, and associates the extracted data to the regular stock out condition. In other embodiments, the classification module 207 compares the image taken from a retailer store with an image of the planogram that describes where in the retailer store and in what quantity products should be located, and determines a hidden out of stock condition by identifying products other than a particular product appearing at the positions where the particular product is expected be located. By this way, the classification module 207 automatically detects a hidden out of stock condition, which is hard to be manually discovered in practice. In some embodiments, the classification module 207 also identifies the unexpected products sitting at the locations of the particular product is expected to be. For example, the classification module 207 determines that a second product and a third product show in the locations of a first product. The classification module 207 extracts a portion of data including the received image, the planogram image, information of the particular product (i.e., the missing product), information of the unexpected products, the current locations of the unexpected products, the expected locations of the unexpected products, etc., and associates the extracted data to the hidden out of stock condition.

When the classification module 207 receives the time series based data stream including product information collected over time, the classification module 207 can track and store repetition of stock outs. In some embodiments, the classification module 207 tracks and records stock outs of a particular product in a particular store based on the data stream that is generated from multiple visits to a store at different time. In other embodiments, the classification module 207 tracks and records frequency of stock outs across multiple stores over a time period based on the data stream that is generated from multiple visits to multiple stores. It is advantageous that the classification module 207 can automatically detect recurring stock outs because it is difficult for a person to do so based on his or her memory.

In some embodiments, the classification module 207 determines a recall condition from the data stream and extracts a portion of data from the data stream based on the recall condition. The classification module 207 matches product information in the data stream to a list of recall products in a database. For example, the classification module 207 determines whether a received image of the data stream includes the recall products. The classification module 207 identifies a recall condition responsive to a match (e.g., determining that the received image includes the recall products). In some embodiments, the classification module 207 flags each recall product on the received image. The classification module 207 extracts, from the data stream, a portion of data including the received image, locations of the recall products (e.g., flagged products) in the received image, the list of recall products, etc., and associates the extracted data with the recall condition.

In some embodiments, the classification module 207 determines a position map condition from the data stream and extracts a portion of data from the data stream based on the position map condition. The classification module 207 receives a product location indicating an actual position of the product shown in a received image. The product location may indicate an absolute position or a relative position of the product. The classification module 207 compares the actual position of the product to the expected position of the product shown in an image of the planogram (i.e., the image showing ideal/expected product positions) and determines a position map condition based on the comparison. In some embodiments, the classification module 207 overlays the position information onto the image of the planogram or the image of the realogram (ROG) (i.e., the received image showing actual product positions) to determine a position map condition.

The position map condition indicates whether a product is located at the right place at a time. The position map condition also indicates a frequency of a product sitting in wrong locations over time. For example, the classification module 207 determines that a product is actually positioned at places A, A and B in three weeks based on three weekly-taken images of a retailer store. The classification module 207 overlays the actual positions A, A and B on images of the planogram that show the expect positions A, B and B. From the overlaps and non-overlap on the images, the classification module 207 determines the position map condition. The condition indicates that the product is misplaced in the second week while the product is in its right location in the first and third weeks. By tracking product positions with the position map condition, the classification module 207 clearly identifies and visually presents where the wrong location is and where the correct location should be. The current approaches may notify a user a UPC code in a wrong position; however, it has limited use in a store where a large amount of products sit on shelves.

In some embodiments, the classification module 207 determines a position map condition based on product locations in a single store. In other embodiment, the classification module 207 determines a position map condition based on product locations in two or more stores by aggregating location information of the two or more stores if the two or more stores have the same planogram. The classification module 207 extracts, from the data stream, a portion of data including the received image, the planogram image, actual locations of a product in the received image, expected locations of the product in the planogram image, etc., and associates the extracted data and the overlays with the position map condition.

In some embodiments, the classification module 207 determines a new product condition from the data stream and extracts a portion of data from the data stream based on the new product condition. In some embodiments, the classification module 207 identifies an unindexed product from the data stream and determines a new product condition. The information of an unindexed product is absent in a database, i.e., the features of unindexed product (e.g., luminance, color, package dimension) do not match the features stored in the database. The classification module 207 extracts a portion of data including an image of the unindexed image, a location of the unindexed product and features of the unindexed product from the data stream. The extracted data will be used to combine with additional information (e.g., obtained from other resources) to identify the product and index the product in the database. In other embodiments, the classification module 207 determines a new product condition based on identifying a new product from competitors' product information in the data stream. For example, the data stream includes competitors' on-shelf inventory that was collected during one or more visits to the competitors' store. The classification module 207 extracts the competitor's product information from the data stream and associates the extracted data with the new product condition.

In some embodiments, the classification module 207 determines a price match condition from the data stream and extracts a portion of data from the data stream based on the price match condition. In some embodiments, the classification module 207 determines a price match condition based on a price adherence score. The price adherence score is a measure of an expected price of a product to an actual price of the product. For example, the price adherence score is the quotient of dividing the expected price by the actual price. If the price adherence score for a product is often higher or lower than one, the product may be overpriced or underpriced. The classification module 207 extracts, from the data stream, a portion of data including an actual price of a product, an expected price of the product, an image of the product, etc., and associates the extracted data and the price adherence score with the price match condition.

In some embodiments, the classification module 207 determines a representative performance condition from the data stream and extracts a portion of data from the data stream based on the representative performance condition. The classification module 207 determines a representative performance condition based on a representative score that measures the performance of a retail execution representative (herein referred as "representative"). In some embodiments, the classification module 207 aggregates information such as planogram compliance, the number of stock outs, the frequency of recurring stock outs for a product, etc., to compute a representative score for a representative. The planogram compliance indicates a match level between the realogram (ROG) and the planogram. For example, the classification module 207 computes a higher score for a first representative than for a second representative since there is no stock outs in the working area of the first representative and a number of stock outs in the working area of the second representative during a time period. The classification module 207 may also compute a higher representative score for the first representative in September than in August. The higher the representative score of a representative, the better the performance of the representative. The classification module 207 extracts, from the data stream, a portion of data including a received image of realogram (ROG), an image of the planogram, the planogram compliance, the number of stock outs, the frequency of recurring stock outs, etc., and associates the extracted data and the representative score with the representative performance condition.

In some embodiments, the classification module 207 determines a planogram adherence condition from the data stream and extracts a portion of data from the data stream based on the planogram adherence condition. The classification module 207 determines a planogram adherence condition based on a planogram adherence score. In some embodiments, the classification module 207 rates adherence of a product to the expected x-y coordinates of the product to compute a planogram adherence score. For example, the classification module 207 determines, from a received image, that the product sits on the expected location, and determines the planogram adherence score to be 100. If the product sits on the farthest possible distance from the expected x-y coordinates, for example, the expected location is the top-left corner of a shelf and the product is actually placed at the bottom-right corner of the shelf, the classification module determines the planogram adherence score to be one. If the product is missing in the received image, the classification module 207 determines the planogram adherence score to be zero. The classification module 207 may determine the planogram adherence score for a single product, some products or all products in a received image. The classification module 207 may determine an overall planogram adherence score based on the respective score for each product in the received image to provide a quick insight into overall planogram compliance. The classification module 207 extracts, from the data stream, a portion of data including a received image, an image of the planogram, the actual locations of a product, the expected locations of the product, etc., and associates the extracted data and the planogram adherence score(s) with the planogram adherence condition.

In some embodiments, the classification module 207 determines a profit adherence condition from the data stream and extracts a portion of data from the data stream based on the profit adherence condition. The classification module 207 determines a profit adherence condition based on a profit credit score. The profit credit score is used to provide feedback on profit potential of positions on shelves of product in realogram. In some embodiments, the classification module 207 receives locations of products in a received image and computes a profit credit score for a product based on the position of a product relative to a shelf and the position of the product relative to other products on the same shelf. The classification module 207 may assign a profit credit score of 100 to a highest profit position (e.g., the middle position of the second top shelf) and assign a profit credit score of one to a lowest profit position (e.g., the left corner of the bottom shelf). In some embodiments, the classification module 207 also aggregates the profit credit scores to determine an overall score of the product across multiple stores, which may then be compared to store demographics for further analysis. The classification module 207 extracts, from the data stream, a portion of data including a received image of realogram, an image of the planogram, the locations of products, the number of stock outs, the frequency of recurring stock outs, etc., and associates the extracted data and the profit credit score(s) with the profit adherence condition.

The suggestion module 209 may include software and/or logic to provide the functionality for generating a suggestion based on the condition determined from the data stream.

The suggestion module 209 receives a condition and a portion of data associated with the condition from the classification module 207 and generates one or more suggestions based on the condition. In some embodiments, a suggestion is advice for performing a corrective action. In other embodiments, a suggestion is a notification notifying the portion of data and describing potential usage of the portion of data.

In some embodiments, the suggestion module 209 receives an out of stock condition and generates advice for performing a corrective action based on the out of stock condition. For example, the suggestion module 209 generates advice for finding the missing products from the inventory and replacing voids of a shelf with the missing products. For a hidden out of stock condition, the suggestion module 209 may also generate advice for relocating the misplaced products. Responsive to out of stock conditions determined over time (e.g., repetition of stock outs), the suggestion module 209 may suggest a discussion about whether to change the product order or the order frequency.

In some embodiments, the suggestion module 209 receives a recall condition and generates advice for performing a corrective action based on the recall condition. For example, the suggestion module 209 generates advice for pulling recalled products from the shelves and from store inventory.

In some embodiments, the suggestion module 209 receives a position map condition and generates advice for performing a corrective action based on the position map condition. For example, the suggestion module 209 generates advice for repositioning a product. In other embodiments, responsive to receiving the position map condition and a portion of data associated with the position map condition, the suggestion module 209 may also generate a notification describing potential usage of the portion of data. For example, the suggestion module 209 generates a notification notifying that the portion of data should be merged with sales volume and profit data such that repositioning of products is based on overall shelf profit and is automatic. The suggestion module 209 may also generate a notification notifying that the portion of data can be used for feedback to in-store stockers or the portion of data should be compared against sales data to determine how the portion of data impacts the sales data.

In some embodiments, the suggestion module 209 receives a new product condition and generates advice for performing a corrective action based on the position map condition. For example, the suggestion module 209 generates advice for capturing additional information of the unindexed product, updating the data stream with the additional information, and adding the additional information to the database for indexing the product. In other embodiments, responsive to receiving the new product condition and a portion of data associated with the new product condition, the suggestion module 209 may also generate a notification. For example, the suggestion module 209 generates a notification notifying the presence of the new product for purpose of competitive awareness and tracking, or notifying that the portion of data may be used in making a business plan.

In some embodiments, the suggestion module 209 receives a price match condition and generates a notification. For example, the suggestion module 209 generates a notification notifying the price adherence sore and how this score can be used in adjusting business plan (e.g., adjusting the over-priced product).

In some embodiments, the suggestion module 209 receives a representative performance condition and generates advice for performing a corrective action based on the representative performance condition. For example, the suggestion module 209 generates advice of changing personal behavior or suggesting where in depth assessments may be required. In other embodiments, the suggestion module 209 may also generate a notification of the representative score for a representative and how this score may change job focus of the representative.

In some embodiments, the suggestion module 209 receives a planogram adherence condition and generates a notification. For example, the suggestion module 209 generates a notification notifying the planogram adherence score, the relationship between this score and overall planogram compliance, and an instruction to adjust the planogram compliance based on the score.

In some embodiments, the suggestion module 209 receives a profit adherence condition and generates a notification. For example, the suggestion module 209 generates a notification notifying the profit credit score and an instruction to maximize the profit of each given shelf arrangement based on the score.

The action module 211 may include software and/or logic to provide the functionality for performing an action based on the received advice and notification.

In some embodiments, the action module 211 receives advice and notification generated based on one or more conditions and determines one or more recipients for the advice and notification. A recipient can be a representative, a store manager, a category manager, a product manager, a space planner, a manufacture staff, etc. In some embodiments, the action module 211 determines the recipient for the advice and notification based on the condition. For example, the action module 211 determines the advice and notification generated based on the price match condition should be sent to a category manager. In other embodiments, the action module 211 determines the recipient for the advice and notification based on the content of the advice and notification. For example, the action module 211 determines that the recipients of the notification including a representative score for a representative are the representative and a store manager.

The action module 211 transmits the advice and notification to the recipient. The action module 211 also transmits to the recipient a portion of data associated with the condition based on which the advice and notification was generated. The data (e.g., images or other graphical data) presented to a recipient may help the recipient easily understand the problem. For example, the recipient intuitively sees where the product is missing or misplaced from a received image. The recipient may perform a corrective action based on the advice and the portion of data. Based on receiving a notification, the recipient may also use the portion of data for further analysis and make a future plan or decision based on the analysis. For example, a user can determine his or her own corrective action to be performed based on the notification.

For example, responsive to receiving advice, notification, a portion of data determined based on the out of stock condition, a representative may get stock and replace voids, or relocate misplaced products and fix hidden stock out problem, or discuss with the store manager as whether to change the product order. Responsive to receiving advice, notification, a portion of data determined based on the recall condition, a representative may pull the recall product from the shelves. Responsive to receiving advice, notification, a portion of data determined based on the position map condition, a representative may reposition the product. A category manager and a space planner may compare the portion of data against sales data, and factor into next season planning, profit expectations, sales expectations, etc. Responsive to receiving advice, notification, a portion of data determined based on the new product condition, a representative may capture additional information of an unindexed product and update the data stream and a database with the additional information. A category manager and a product manager may change business plans, products, etc. based on what competitors are doing with the new product. Responsive to receiving advice, notification, a portion of data determined based on the price match condition, a category manager may adjust business plans, store agreements, etc. Responsive to receiving advice, notification, a portion of data determined based on the representative performance condition, a representative may change his or her own behavior and a store manager may change how to focus on representative performance and which representative to spend more time with. Responsive to receiving advice, notification, a portion of data determined based on the planogram adherence condition, a representative receives high level scores that give a quick insight into overall planogram and as a result adjusts time spent on planogram compliance. Responsive to receiving advice, notification, a portion of data determined based on the profit adherence condition, a manufacturer staff can plan shelf space to maximize the profit of each given shelf arrangement. A category manager and a space planner may adjust future planograms based on the relationship between the overall profit credit scores, the overall profit credit score per product, the sales volume and net profit of each product.

In some embodiments, the action module 211 receives acknowledgement that a recipient has performed a first action based on the advice and notification, and performs a second action based on the acknowledgement. For example, the action module 211 receives an image from a representative showing the recall products having been removed from the shelves, and generates and sends a notification to the manufacture staff about the completion of the recall. In another example, the action module 211 receives acknowledgement of price adjustment and triggers the update of the data stream, e.g., the image processing module 203 receives an image of the new price tags and the data stream generator 205 adds the image to the data stream.

The user interface module 213 may include software and/or logic for providing user interfaces to a user.

In some embodiments, the user interface module 213 receives instructions from the image processing module 203 to generate a graphical interface that instructs the user to capture an image of a retail shelf stocking products. In some embodiments, the user interface module 213 generates a graphical image for displaying the advice and notification. In some embodiments, the user interface module 213 may generate a graphical image with a picture of an unidentified product and pictures of products with known identity for manual comparison to identify the unidentified product. In other embodiments, the user interface module 213 sends the graphical user interface data to an application (e.g., a browser) in the client device 115 via the communication unit 241 causing the application to display the data in a user interface.

The corrective action module 215 may include software and/or logic for providing corrective actions to a user. In some embodiments, the corrective action module 215 receives instructions from the image processing module 203 to provide a corrective action to a user. In some embodiments, the corrective action module 215 may compare an image and a planogram to determine a difference and provide a corrective action to a user or a back-end system based on the difference. In other embodiments, the corrective action module 215 may receive alignment information from a comparison between an image and a planogram from the alignment module 219. In other embodiments, the corrective action module 215 receives information from the data stream generator 205 related to an image and uses that image to determine a corrective action. In some embodiments, the corrective action module 215 determines corrective actions based on processing by classification module 207, suggestion module 209, action module 211 and gap detector module 217. In other embodiments, the corrective action module 215 sends the corrective action data to an application (e.g., a browser) in the client device 115 via the communication unit 241 causing the application to present the corrective action.

The gap detector module 217 may include software and/or logic for detecting a gap in a sequence of closely positioned products on a shelf included in an image of the shelf. In some embodiments, the gap detector module 217 receives information from the image processing module 203 and uses that information to determine a gap in an image. In other embodiments, the gap detector module 217 may receive information from the data stream generator 205 and use the information to determine a gap in an image. In other embodiments, the gap detector module 217 may send information related to gaps in an image to an application (e.g., a browser) in the client device 115 via the communication unit 241 for the application to use the information related to gaps in the image.

The alignment module 219 may include software and/or logic for aligning an image and a planogram. In some embodiments, the alignment module 219 may receive information from the image processing module 203 related to the image and use that information to align the image and a planogram. In other embodiments, the alignment module 219 may receive information from another component of the image recognition application 103 and use that information to align the image and the planogram. In some embodiments, the alignment module 219 may compare the aligned image and planogram to determine differences for corrective actions. In some embodiments, the alignment module 219 may compare the aligned image and planogram to determine locations of expected products for determining ground truth. In some embodiments, the alignment module 219 may send alignment information to the gap detector module 217, which may provide information related to gaps to the image processing module 203 for further processing to recognize products in the gaps. In other embodiments, the alignment module 219 may align the image and planogram and send the alignment information to the data stream generator 205 for further processing. In other embodiments, the alignment module 219 may align the image and planogram and send the alignment information to the analytics module 221 for further processing. In some embodiments, the alignment module 219 may perform alignment of portions of the image and the planogram.

The analytics module 221 may include software and/or logic for processing and comparing an image and a planogram. In some embodiments, the analytics module 221 may include software and/or logic for performing actions such as determining brand chunks, aligning chunks and products, pruning candidates based on planogram information, or generating share of shelf reports. In some embodiments, the analytics module 221 may receive information from the image processing module 203 and further analyze the information. In some embodiments, the analytics module 221 may process information and provide the information to the corrective action module 215 to present a corrective action to a user. In other embodiments, the analytics module 221 generates analytics information and provides it to the user via user interface or a report or warning.

Figure 3:
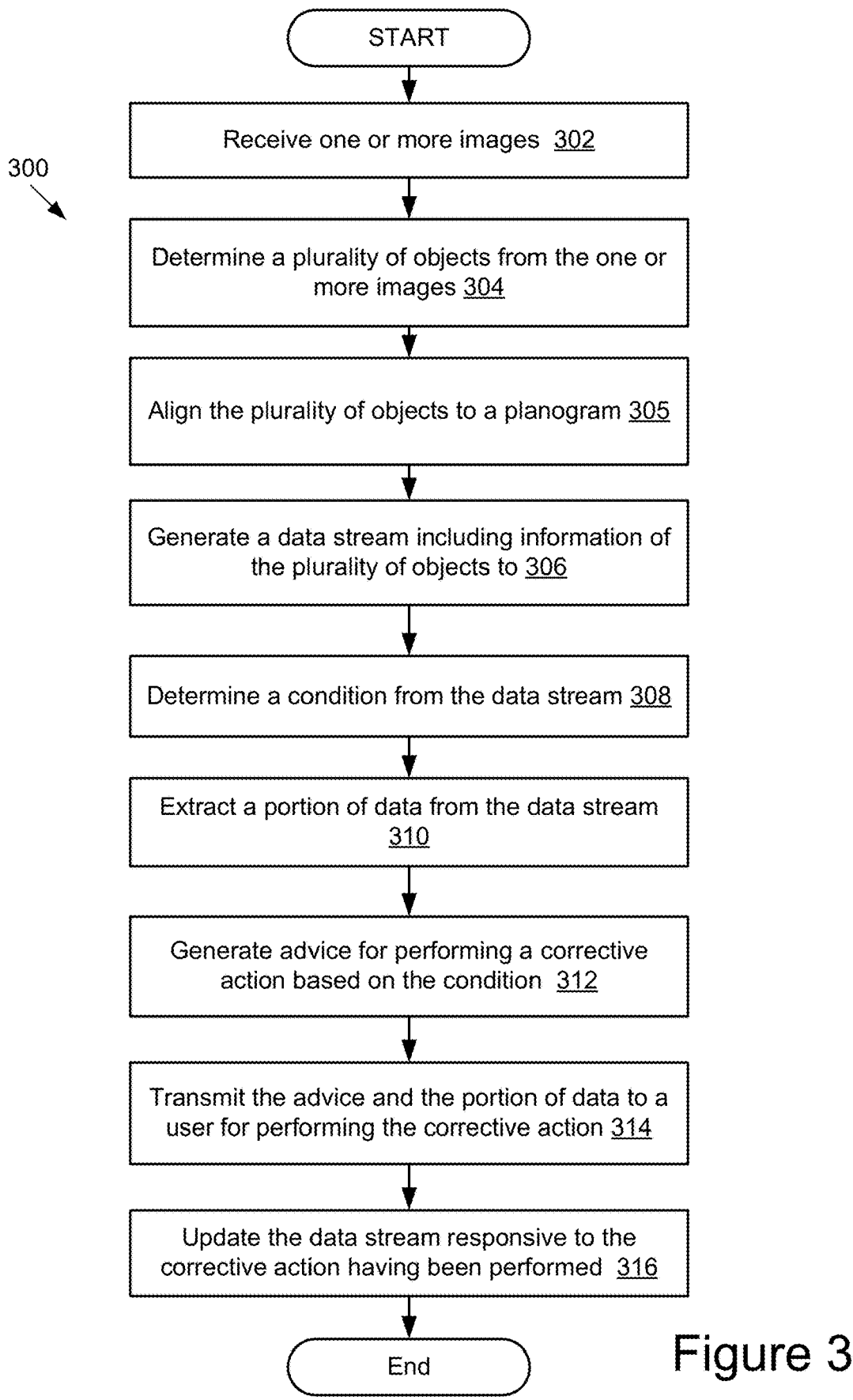
FIG. 3 is a flow diagram illustrating one embodiment of a method for generating an advice for performing a corrective action based on a condition.

FIG. 3 is a flow diagram 300 illustrating one embodiment of a method for generating an advice for performing a corrective action based on a condition. As described above, the image recognition application 103 may include an image processing module 203, an alignment module 219, a data stream generator 205, a classification module 207, a suggestion module 209, and an action module 211. At 302, the image processing module 203 receives one or more images. At 304, the image processing module 203 determines a plurality of objects from the one or more images. In some embodiments, the image processing module 203 identifies objects in the one or more images based on extracting features from the one or more images and matching the extracted features to those features stored in the database for recognition. In other embodiments, the image processing module 203 determines one or more unindexed objects from the one or more images, where information of the unindexed objects does not match information stored in the database. At 305, the alignment module 219 aligns the plurality of objects to a planogram. At 306, the data stream generator 205 generates a data stream including information of the plurality of objects. The object information may include an object identifier, one or more associated images, a location of an object (including location with respect to the planogram), metadata related to the object, etc.

At 308, the classification module 207 determines a condition from the data stream. In some embodiments, the condition can be one of the group of a regular out of stock condition, a hidden out of stock condition, a recall condition, a position map condition, a new product condition, a price match condition, a representative performance condition, a planogram adherence condition and a profit adherence condition. At 310, the classification module 207 extracts a portion of data from the data stream. At 312, the suggestion module 209 generates advice for performing a corrective action based on the condition. For example, for the out of stock condition, the suggestion module 209 generates advice for finding the missing products from the inventory and replacing voids of a shelf with the missing products. At 314, the action module 211 transmits the advice and the portion of data to a user for performing the corrective action. In some embodiments, the action module 211 receives the advice and determines one or more recipients for the advice. At 316, the data stream generator 205 updates the data stream responsive to the corrective action having been performed. For example, the action module 211 receives acknowledgement of price adjustment and triggers the update of the data stream, e.g., the image processing module 203 receives an image of the new price tags and the data stream generator 205 adds the image to the data stream.

Figure 4:
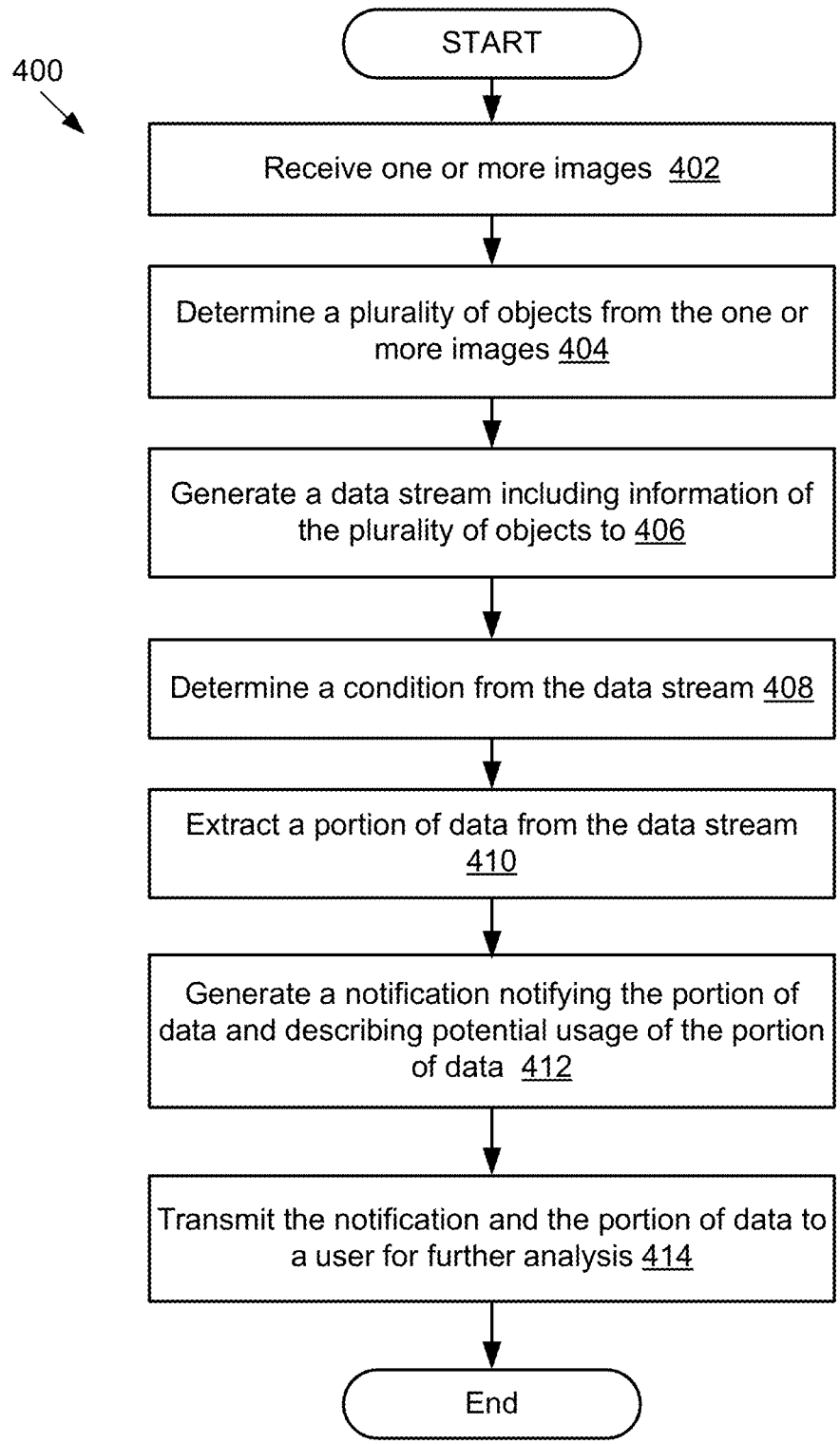
FIG. 4 is a flow diagram illustrating one embodiment of a method for generating a notification describing potential usage of a portion of data associated with a condition.

FIG. 4 is a flow diagram 400 illustrating one embodiment of a method for generating a notification describing potential usage of a portion of data associated with a condition. As described above, the image recognition application 103 may include an image processing module 203, a data stream generator 205, a classification module 207, a suggestion module 209 and an action module 211. At 402, the image processing module 203 receives one or more images. At 404, the image processing module 203 determines a plurality of objects from the one or more images. At 406, the data stream generator 205 generates a data stream including information of the plurality of objects. At 408, the classification module 207 determines a condition from the data stream. At 410, the classification module 207 extracts a portion of data from the data stream. At 412, the suggestion module 209 generates a notification notifying the portion of data and describing potential usage of the portion of data. At 414, the action module 211 transmits the notification and the portion of data to a user for further analysis. For example, the suggestion module 209 generates a notification notifying the presence of a new product for purpose of competitive awareness and tracking, or notifying that the portion of data may be used in making a business plan.

Figure 5:
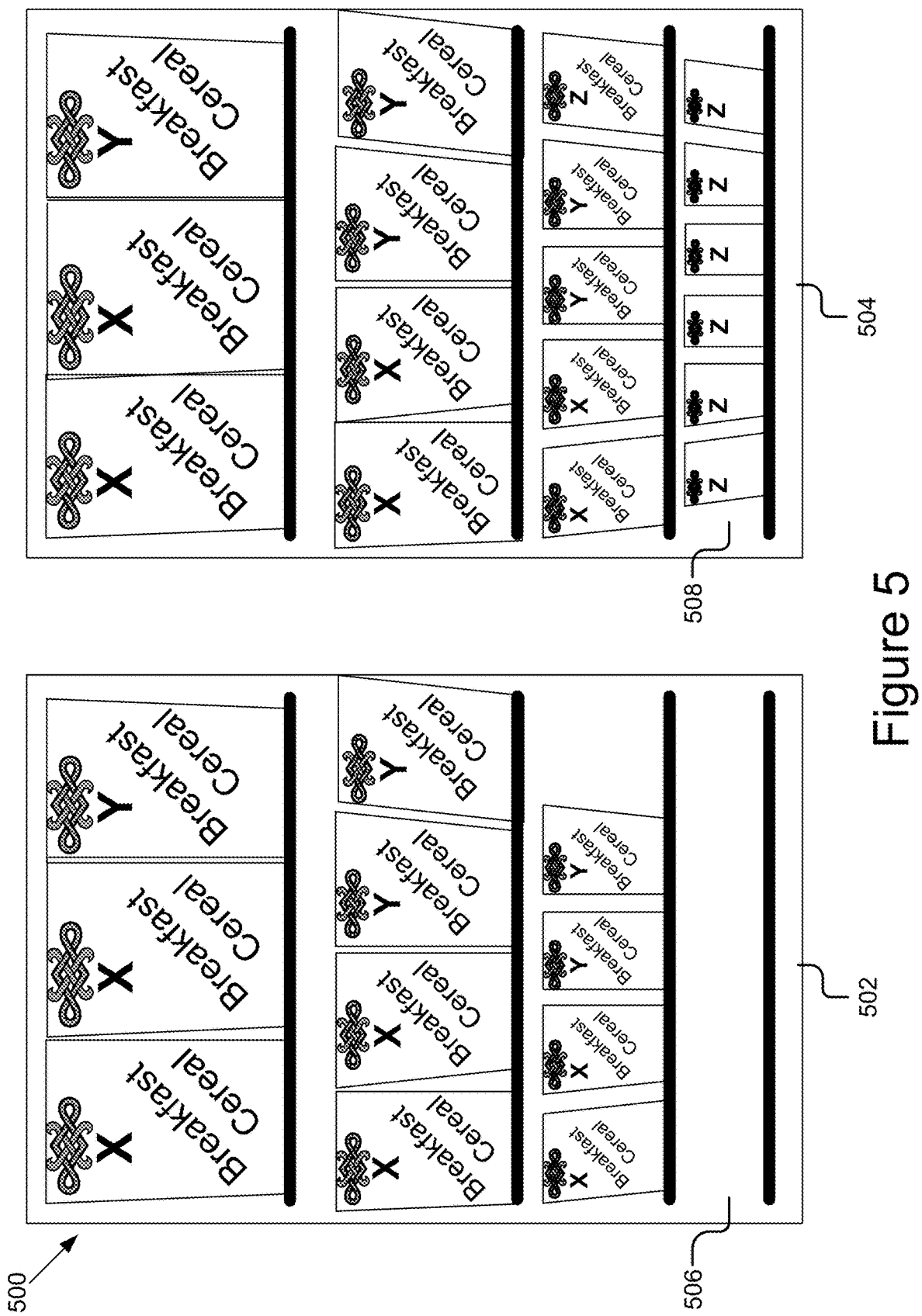
FIG. 5 is a graphical representation of an example out of stock condition.

FIG. 5 is a graphical representation 500 of an example out of stock condition. Images 502 and 504 depict shelves of a store before and after adjustment. The classification module 207 determines an out of stock condition, for example, based on identifying voids on the bottom shelf 506 of image 502. The suggestion module 209 generates advice for a representative to get stock of the product and replace voids of the bottom shelf 506 with the missing product. As a result, a number of products are placed on the bottom shelf 508 as shown in image 504.

Figure 6:
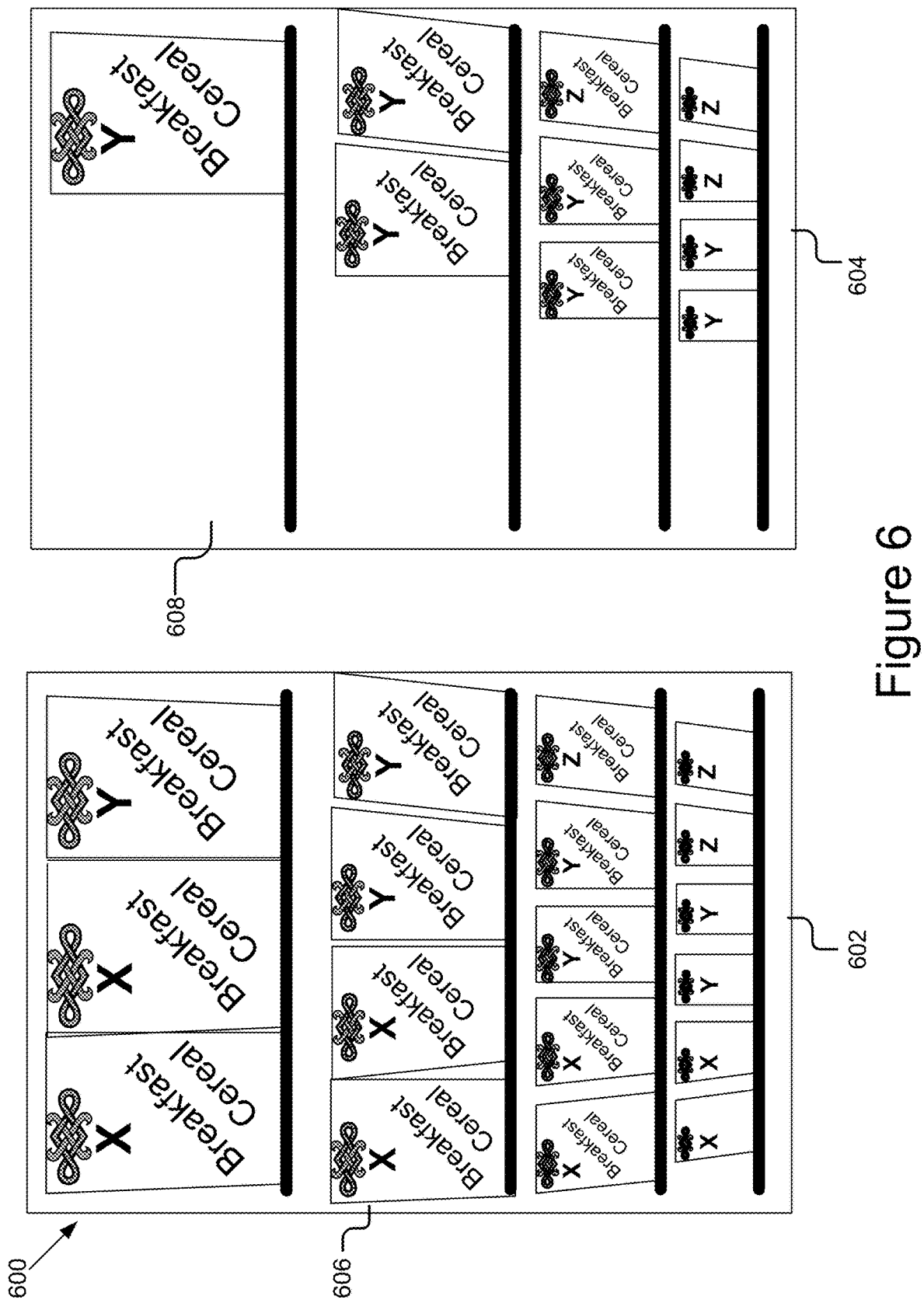
FIG. 6 is a graphical representation of an example recall condition.

FIG. 6 is a graphical representation 600 of an example recall condition. Images 602 and 604 depict shelves of a store before and after adjustment. The classification module 207 compares image 602 with a list of recall products stored in a database, and determines a recall condition. In the example of FIG. 6, all the breakfast cereal boxes with "X" label or cereal X should be recalled. The suggestion module 209 generates advice for a representative to pull cereal X boxes from the shelves. As a result, the left side of the shelves 608, where the cereal X boxes were placed, is empty as shown in image 604.

Figure 7:
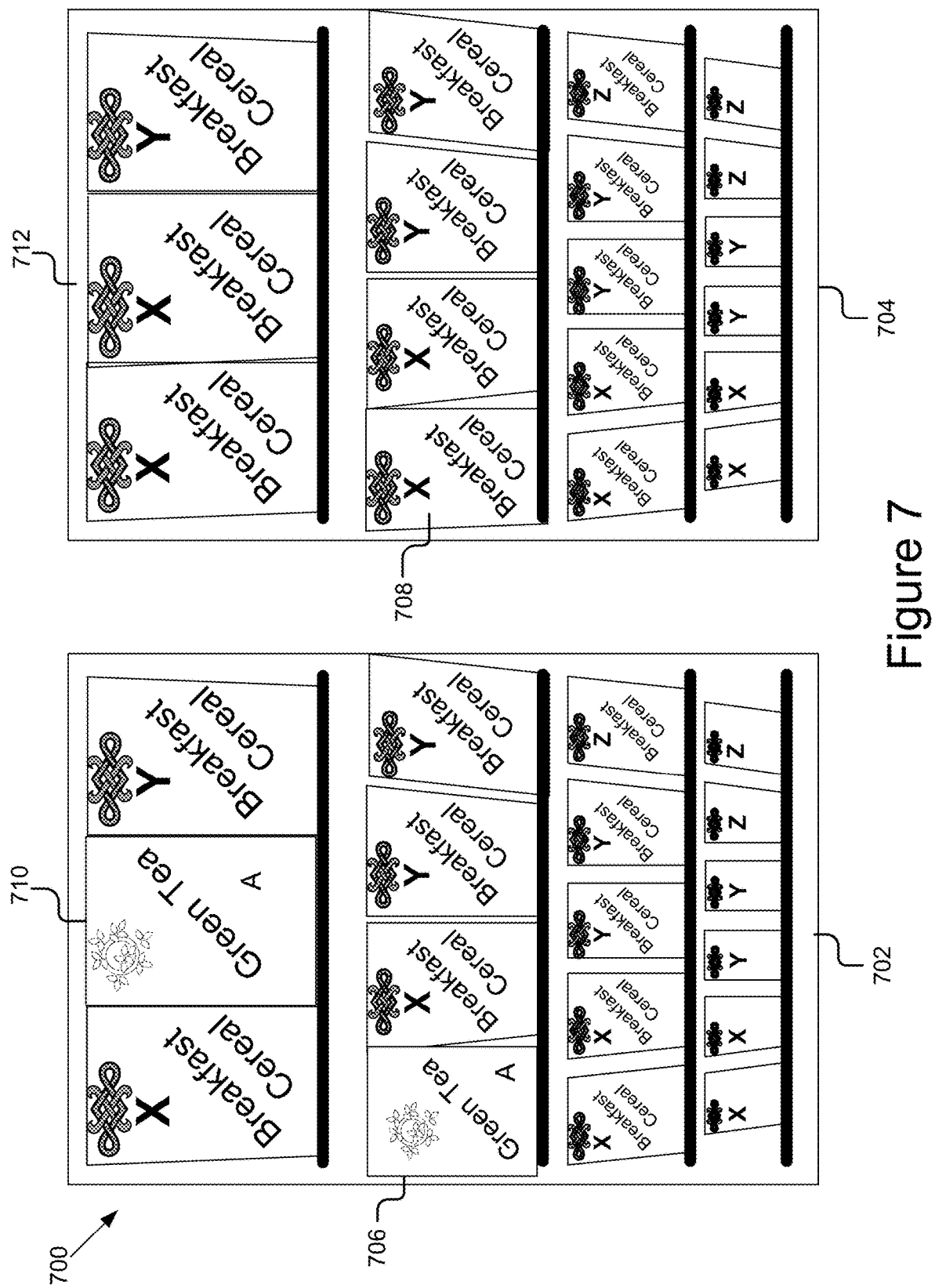
FIG. 7 is a graphical representation of an example position map condition.

FIG. 7 is a graphical representation 700 of an example position map condition. Images 702 and 704 depict shelves of a store before and after adjustment. The classification module 207 compares image 702 with an image of a planogram by overlaying the image 702 on the image of the planogram. From the overlay, the classification module 207 determines two non-overlaps. At locations 706 and 710, two green tea boxes are identified from image 702 while two breakfast cereal boxes are identified from the image of the planogram. As a result, the suggestion module 209 generates advice for a representative to reposition the green tea boxes at locations 706 and 710 of image 702. The representative performed the corrective action and captured an image 704 after correction. As shown in image 704, two breakfast cereal boxes are placed at locations 708 and 712 corresponding to locations 706 and 710 of image 702.

Figure 8:
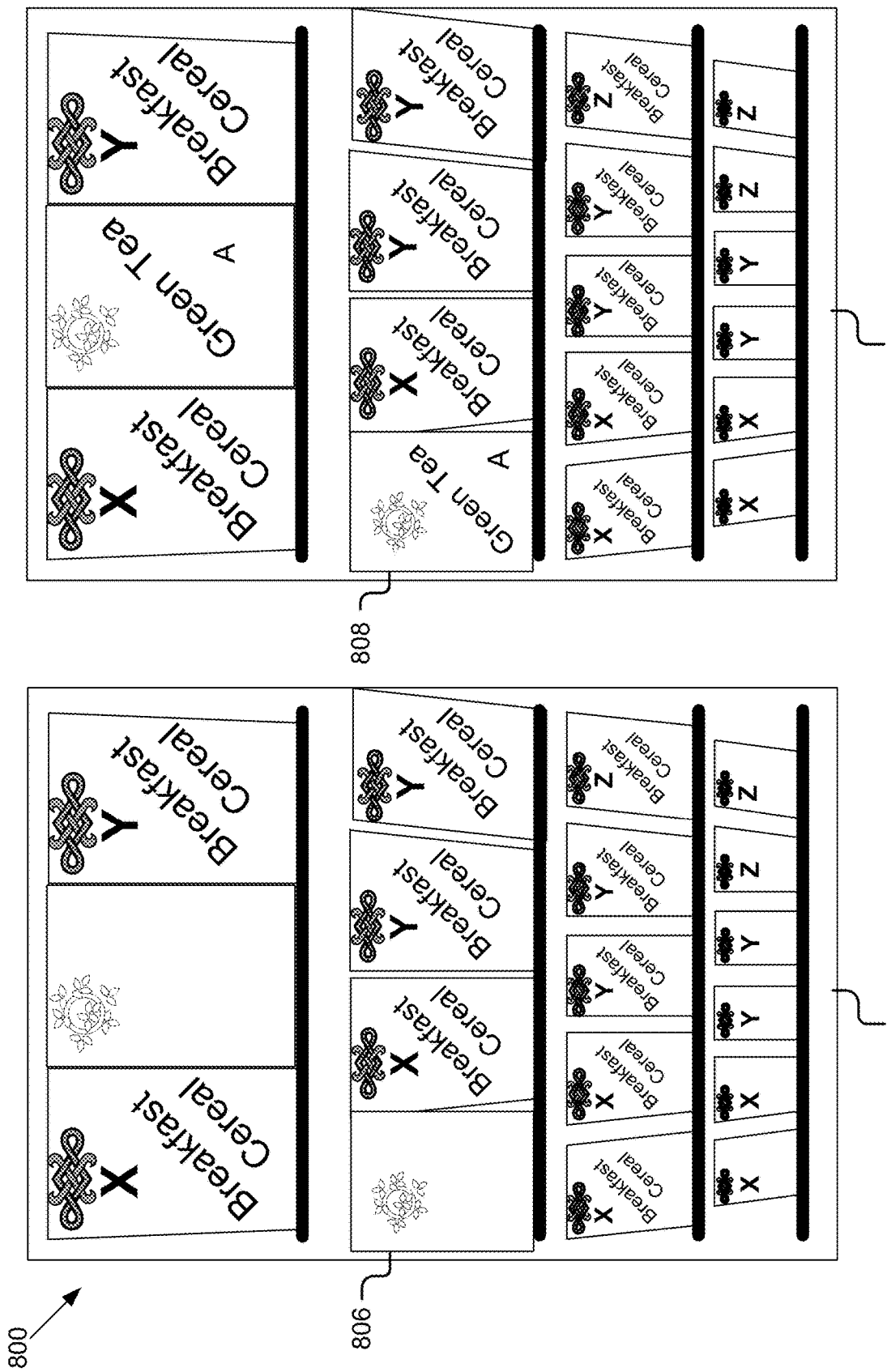
FIG. 8 is a graphical representation of an example new product condition.

FIG. 8 is a graphical representation 800 of an example new product condition. Images 802 and 804 depict shelves of a store before and after adjustment. The classification module 207 determines a new product condition based on information about an unindexed product at location 806 of image 802. The product information includes an image of the package, a package size, a product description (e.g., the flower logo), which cannot be matched to information stored in a database. The suggestion module 209 generates advice for a representative to capture additional information of the unindexed product. The additional information is used to recognize the product as green tea. As a result, the product at location 808 of image 804 is shown as green tea. The additional information is also added to the database for indexing and used to update the data stream.

Figure 9:
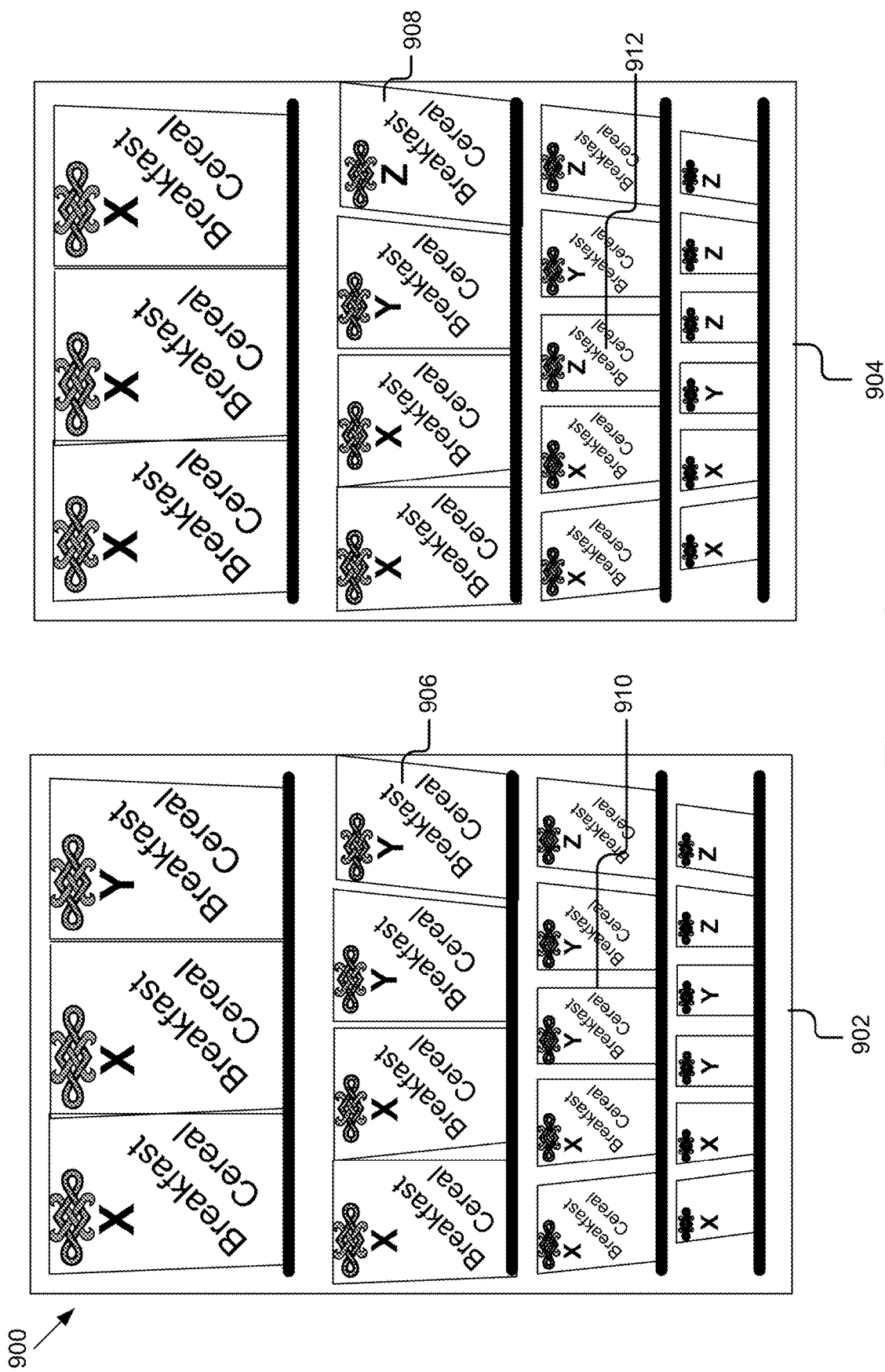
FIG. 9 is a graphical representation of an example price match condition.

FIG. 9 is a graphical representation 900 of an example price match condition. Images 902 and 904 depict shelves of a store before and after adjustment. The classification module 207 receives an actual price of a product from image 902 and an expected price of the product from an image of a planogram, and computes a price adherence score for the product based on the expected price and the actual price of the product. The classification module 207 may compute multiple price adherence scores for the product based on images 902 taken from the store at different time. The classification module 207 determines a price match condition based on the price adherence scores. The suggestion module 209 provides the time series price adherence scores to a category manager. The category manager may determine to reduce the order of cereal Y since the sales data of cereal Y is lower than expected even if its price adherence scores over time show that the cereal Y is already underpriced. Image 902 shows an amount of cereal Y located at positions of shelves such as locations 906 and 910. After the category manager changed the product order, image 904 shows cereal Y is replaced by cereal Z at locations 908 and 912 corresponding to locations 906 and 910 in image 902. Compared with image 902, the total amount of cereal Y is reduced in image 904.

Figure 10:
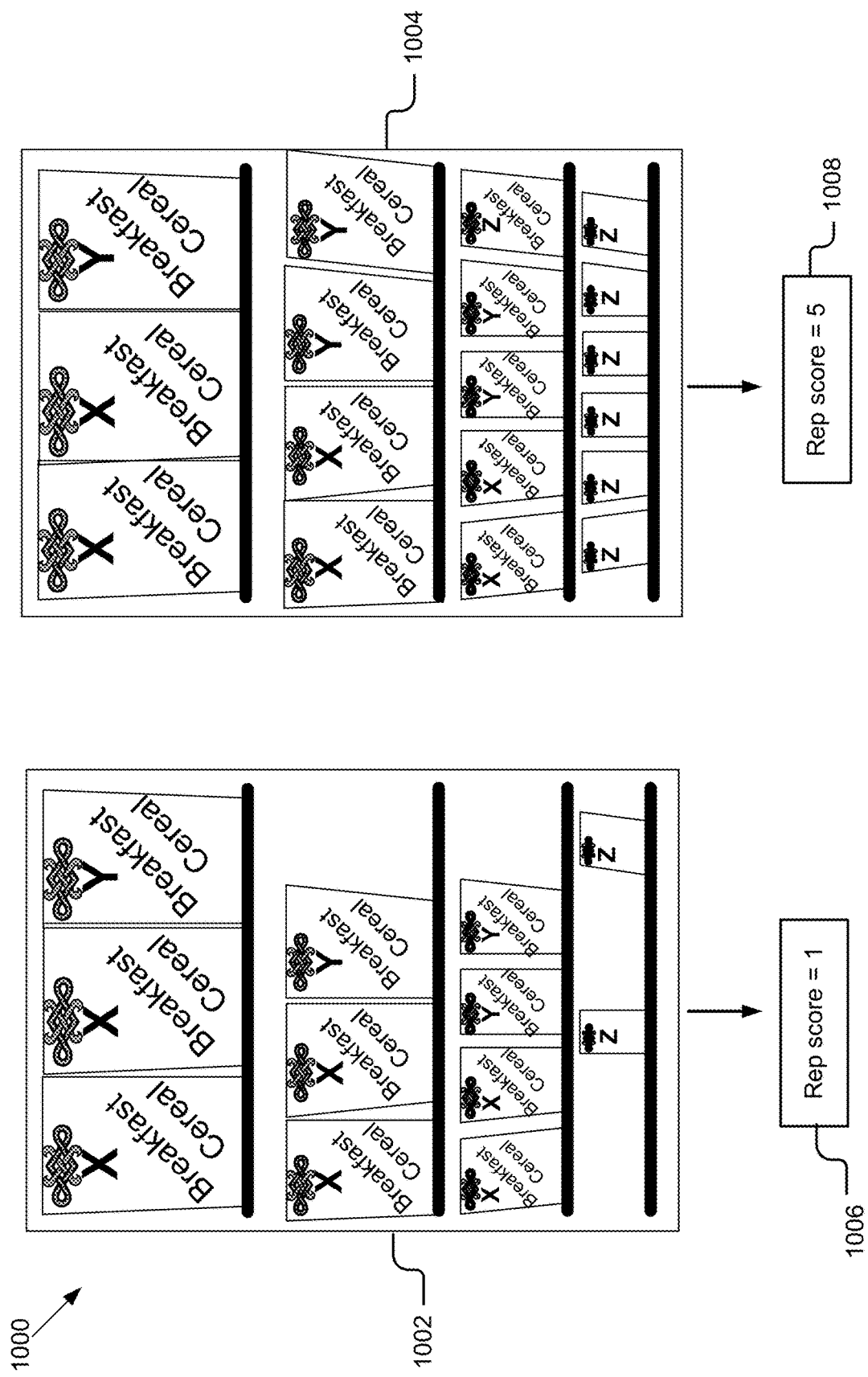
FIG. 10 is a graphical representation of an example representative performance condition.

FIG. 10 is a graphical representation 1000 of an example representative performance condition. Image 1002 shows working area of a first representative. Image 1004 shows working area of a second representative. The two representatives may work in two different stores with the same planogram. The classification module 207 determines representative performance condition based on representative scores for the first and second representatives. The classification module 207 computes a representative score 1006 of one for the first representative based on the out of stock products shown in image 1002. The classification module 207 also computes a representative score 1008 of five for the second representative based on lack of stock out product shown in image 1004. Responsive to receiving scores from the suggestion module 209, the first and second representatives may understand their scores and improve their performance accordingly.

Figure 11:
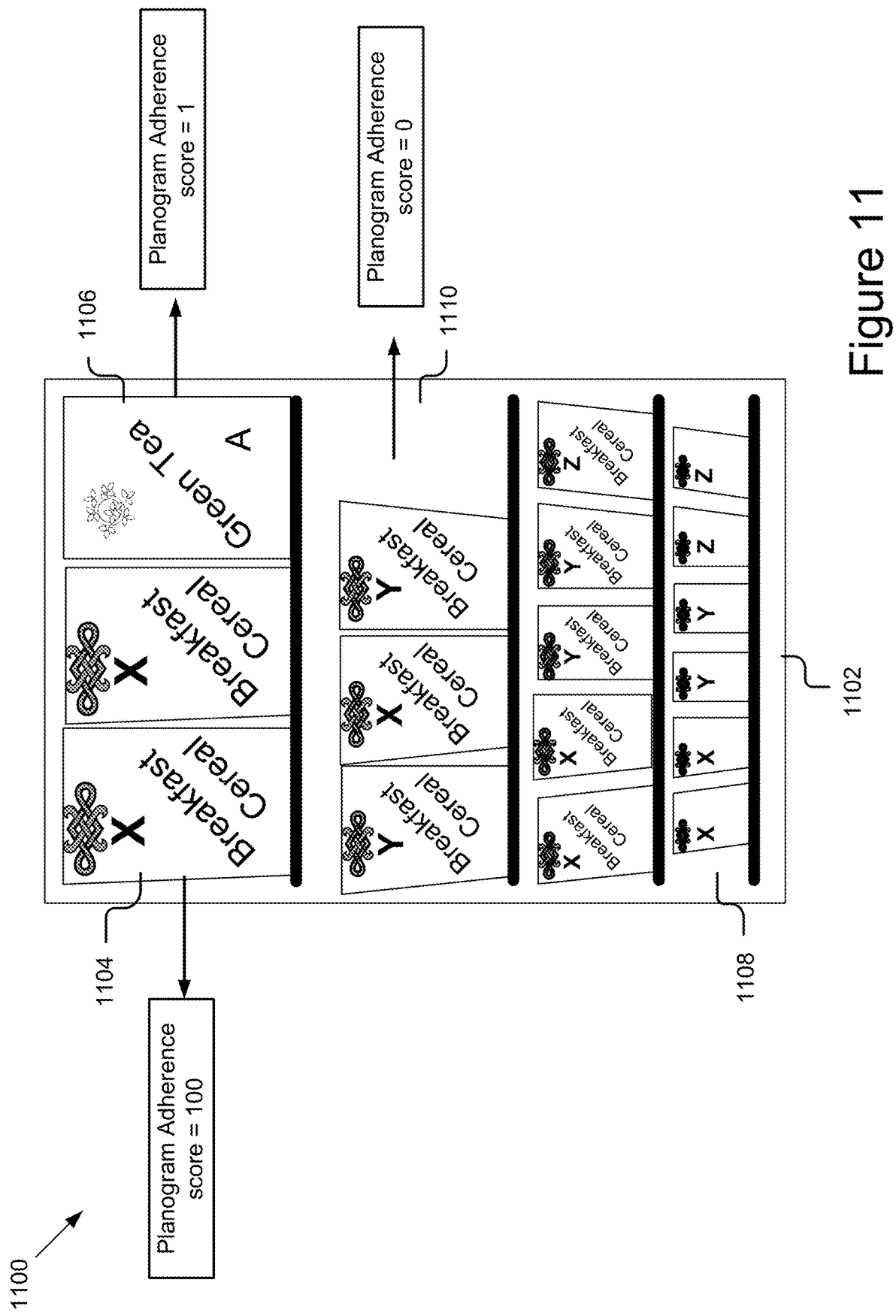
FIG. 11 is a graphical representation of an example planogram adherence condition.

FIG. 11 is a graphical representation 1100 of an example planogram adherence condition. Image 1102 depicts products sitting on shelves of a store. The classification module 207 determines a planogram adherence condition based on a planogram adherence score. The planogram adherence score gives users overall insight of planogram compliance. As shown in image 1102, the classification module 207 determines that the product sits on the expected location 1104 and determines the planogram adherence score to be 100. The classification module 207 determines that the product at location 1106 actually sits on the farthest possible distance from its expected x-y coordinates (e.g., its expected location is 1108), and determines the planogram adherence score to be one. The classification module 207 determines the planogram adherence score to be zero at location 1110 since the product is missing at this location.

Figure 12:
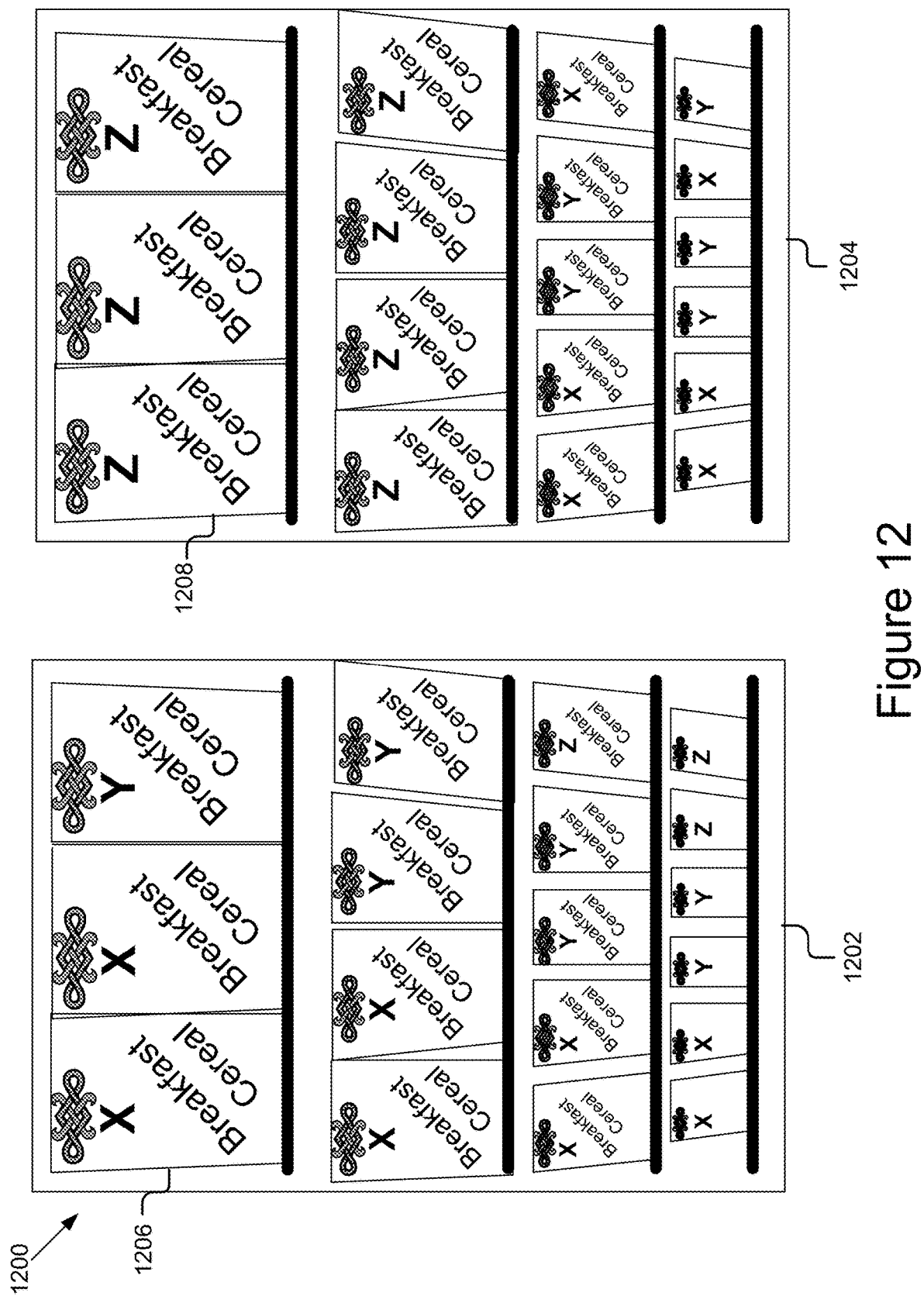
FIG. 12 is a graphical representation of an example profit adherence condition.

FIG. 12 is a graphical representation 1200 of an example profit adherence condition. Images 1202 and 1204 depict shelves of a store before and after adjustment. The classification module 207 determines a profit adherence condition based on a profit credit score. The profit credit score is used to provide feedback on profit potential of positions on shelves of product in image 1202. The suggestion module 209 transmits the score to a category manager. The category manager determines that the popular cereal Z should be positioned at the high score positions (i.e., the top two shelves) to increase the profit. As a result, cereals X and Y on shelf 1206 of image 1202 are relocated to bottom shelves in image 1204. Also cereal Z is moved from low shelves to the top shelf 1208 in image 1204.

Figure 13A:
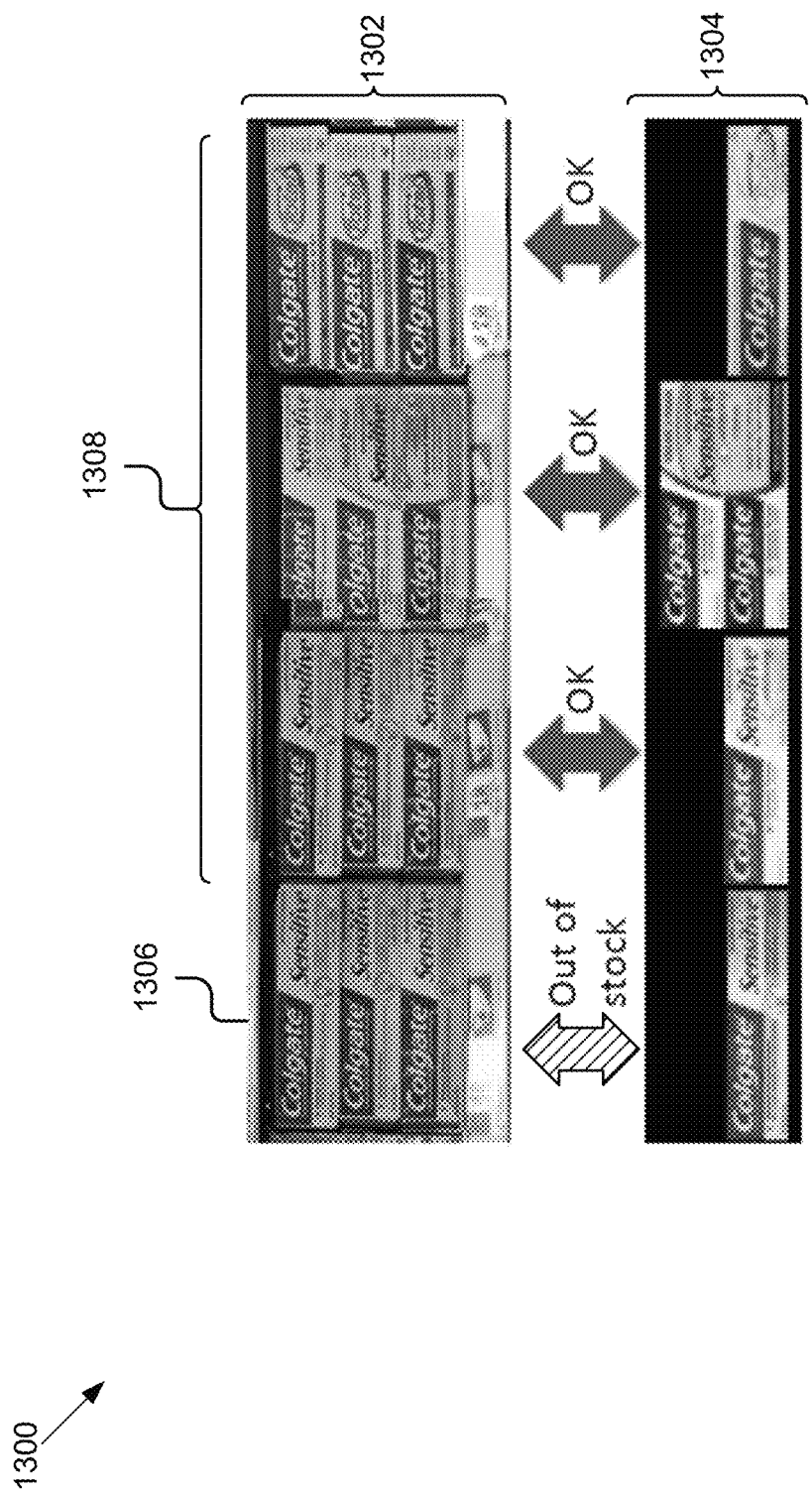
FIG. 13A-13B are graphical representations of an example comparing a planogram and image.

FIG. 13A is a graphical representation 1300 showing a comparison of a planogram 1304 with an image 1302. The planogram 1304 includes a mapping of where products should appear on a product shelf in a store. The image 1302 may be an image of an actual product shelf in the store that ideally corresponds to the placement and existence of products on the planogram 1304. In some embodiments, the image 1302 may be referred to as a "realogram". More specifically, the terms "realogram," "realogram image" and "scene" are used interchangeably in this application to an image of a product shelf or display. The image may be one or more images or a plurality of images stitched together. In the image 1302, a portion of the shelf 1308 includes products that match with corresponding portions of the image 1304. This shelf portion 1308 indicates products that are correctly stocked on the shelf shown in the image 1302. A product 1306 in an image 1302 may not match with the sample product appearing on the planogram 1304. In this graphical representation 1300, the product 1306 is different from the product mapped on the planogram 1304. This may be an example of a hidden out of stock item, where the shelf in the image 1302 includes a product, however the product is not the product that should be present on that shelf In other examples, an out of stock item may be identified by the comparison between the planogram 1304 and the image 1302 identifying empty spots (e.g., locations) in the image 1302 that should include a specific product shown in the planogram 1304. It should be understood that the comparison of the image 1302 to the planogram 1304 can be combined with other information to determine other conditions such as recalled products.

Figure 13B:
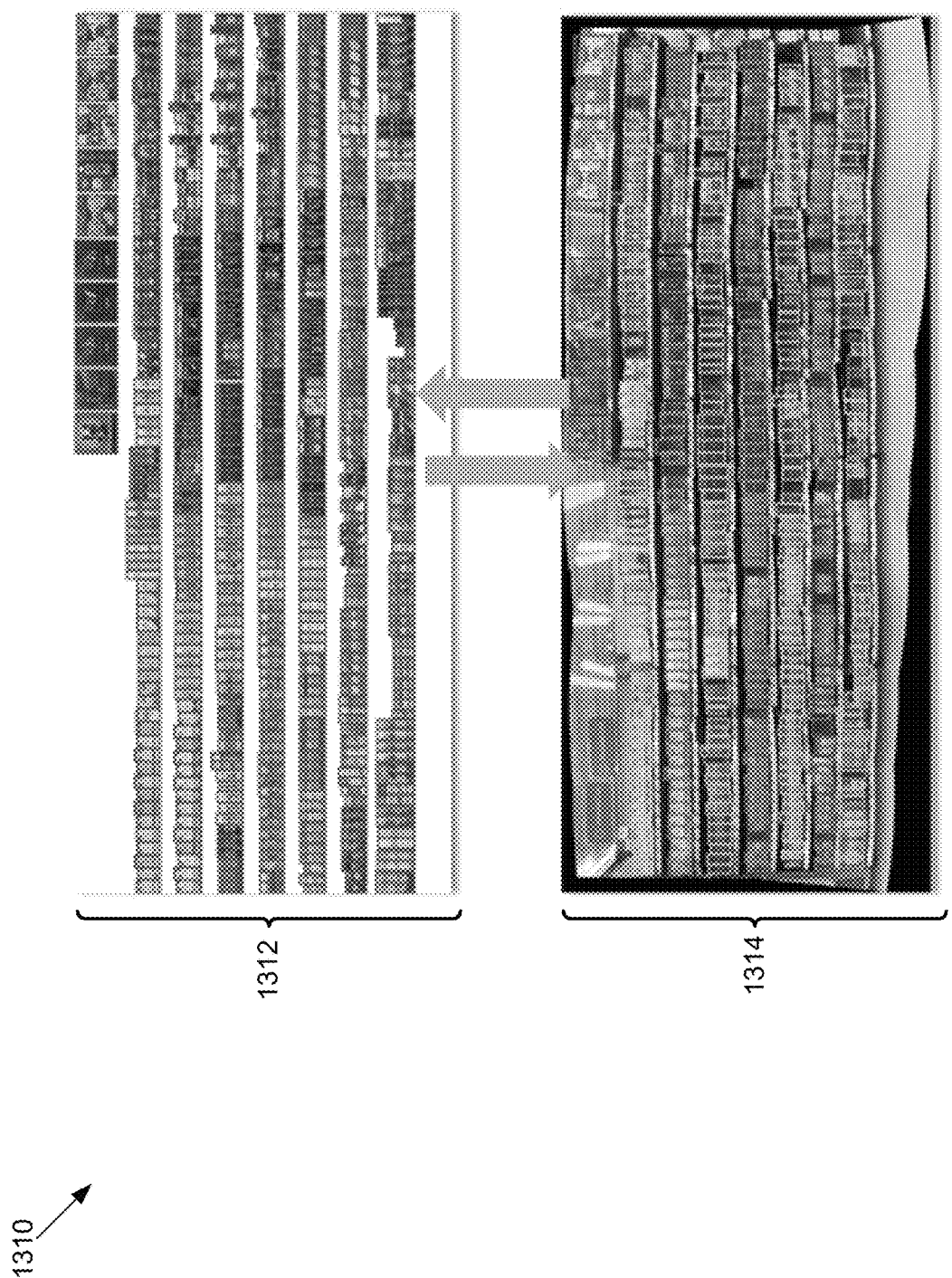

FIG. 13B is a graphical representation 1310 of another example of a comparison of a planogram 1312 to an image 1314. The image 1314 may include an image of a full shelf space of products. The planogram 1312 includes a mapping of sample products, as they should appear on a full shelf space. In some embodiments, the products in the planogram may be highlighted or bracketed to differentiate individual products. The highlighting may include different indicators to denote characteristics of the products such as brand, type, costs, facings, etc. The image 1314 may display indicators of recognized products based on image processing performed by the image processing module 203. The comparison between the planogram 1312 and the image 1314 may include changing a highlighting of a product recognized on the image 1314 based on if the products were recognized and identified in a database of products. After the comparison, the image 1314 may have highlighting or callouts added to indicate areas where the products and gaps included in the image 1314 differ from the mapping of products in the planogram 1312.

Figure 14A:
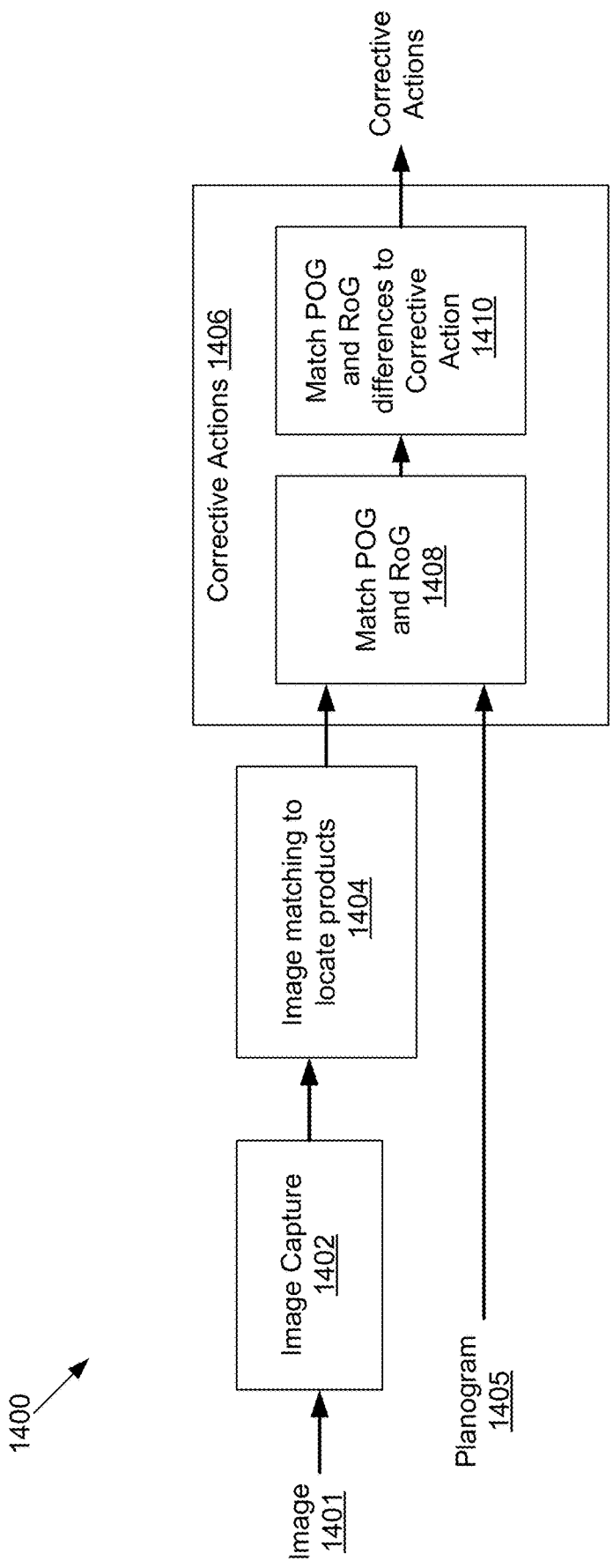

FIG. 14A is a flow diagram of an example method 1400 for comparing an image 1401 of a scene (e.g. of a store shelf) and a planogram 1405 to generate corrective actions. At block 1402, an image 1401 of a scene is captured. The image 1401 may be captured by a camera and sent to the image recognition application 103. In some embodiments, multiple images are captured, combined and then used for further processing. In some embodiments, the image 1401 of the scene may be referred to as a "realogram" representing a real image of a shelf that may be further processed for comparison with a planogram 1405. The image 1401 of the scene may include multiple images of the scene that may be stitched together into a linear panoramic image. At block 1404, the image processing module 203 processes the image 1401 to locate products in the scene 1401 by matching potential products to a database of product images. At block 1406, the corrective action module 215 determines a corrective action for presentation to a user. Block 1406 may include match POG and ROG block 1408 that receives the planogram 1405 and the products identified from the image from block 1404. In the match POG and ROG block 1408, the inputs are compared by the alignment module 219 to identify matches between the image and the planogram 1405. Once the matches are identified in the match POG and ROG block 1408 that information is provided to block 1410 (also included in block 1406) where the corrective action module 215 determines differences between the image and planogram 1405, identifies corrective action corresponding to those differences, and presents one or more differences as one or more corrective actions. In some embodiments, corrective action module 215 determines corrective actions based on processing by classification module 207, suggestion module 209, action module 211 and gap detector module 217.

FIG. 14B is an example data flow 1411 for comparing a planogram 1405 and an image 1401 to identify visually similar products and generate real world ground truths. At match POG and ROG block 1408, the image processing module 203 may receive the image 1401 and the planogram 1405 and perform a comparison to find the expected product 1416 at each location. In some embodiments, at match POG and ROG block 1408, the alignment module 209 of the image processing module 203 may find the expected product 1416 using imperfect recognition results by aligning the image 1401 and the planogram 1405. The imperfect recognition results may not identify every product in the image 1401. In some embodiments, the expected product 1416 may include a symbolic identifier, such as a UPC. For example, in the data flow 1411 of FIG. 14B, the expected product 1416 includes the UPC: 00035000765529.

The match POG and ROG block 1408 may also provide an image region 1417 to the comparison block 1414 as will be described in more detail below. In some embodiments, the match POG and ROG block 1408 may also provide the expected product 1416 (e.g., the symbolic identifier like the UPC) to the similar product graph model 1412. The similar product graph model 1412 may use the expected product 1416 to identify products included in the similar product graph model 1412 that are similar to the expected product 1416. In some embodiments, the similar product graph model 1412 may identify similar products based on the symbolic identifier. In other embodiments, the similar product graph model 1412 may identify similar products based on features of the expected product 1416, such as a brand, a shape, a color, a feature, etc. In the data flow 1411, the similar product graph model 1412 identifies similar products 1418*a*-1418*d*. The similar products 1418*a*-1418*d* share similar features to the expected product 1416. In one embodiment, the graph model is a graph (i.e. a discrete mathematical data structure) where the vertices (or nodes) are symbolic identifiers and edges between vertices indicate that the corresponding products are visually similar. In other embodiments, other model or data structures that store information about visually similar products may be used.

The comparison block 1414 may identify the similar product 1418 that is the same as the image region 1417. In some embodiments, the comparison block 1414 may be a manual comparison by a user for ground truth generation. The user may receive the similar products 1418*a*-1418*d* and identify which one of the similar products 1418*d* is the same as the image region 1417, even though the symbolic identifiers are different. The comparison block 1414 may then provide the correct similar product 1418*d* that was selected as a match to the expected product 1416. In the example data flow 1411, the correct similar product 1418*d* includes the UPC 00035000765536, which is different from the UPC of the expected product 1416.

In some embodiments, the image recognition application 103 may generate real world ground truth results of matching the planogram 1405 and the image 1401 to identify products. (Real world ground truth data is images with corresponding labels such as product locations and UPCs that are used for algorithm performance evaluation, system validation and testing and training of matching learning algorithms. For real world ground truth data, the images are actual scenes where the labels must be determined. While algorithms may assist in generating ground truth data, humans make final decisions about what the true labels are. In contrast to real world ground truth, for synthetic ground truth created using models and computer graphics, the true labels are known as part of the creation process.) In some embodiments, the image recognition application 103 may provide the real world ground truth generation with assistance from a user for the user to identify products when a symbolic identifier, UPC, is not known to the user or products are very similar visually (for example, in the comparison block 1414). The image recognition application 103 finds an expected product 1416 at each location, and with further processing, finds similar products 1418 to create a set of choices for human comparison at comparison block 1414. In further embodiments, the image recognition application 103 may generate real world ground truth results by matching the planogram 1405 to the image 1401 at each location using imperfect recognition results to identify the expected product 1416 at each location. Then the image recognition application 103 uses an expected product 1416 to find products 1418 with similar appearance in a similar product graph model 1412. A similar product graph model is a data-structure where nodes are products and edges connect visually similar products. In one embodiment, the graph model 1412 is created by creating edges between product nodes where products are in the same confusion set and have similar aspect ratio (i.e. similar ratio between width and height, possibly considering different combinations of faces such as front view and side view). In some embodiments, the visually similar recommendations may then be provided to a human for further manual comparison at comparison block 1414. In other embodiments, the visually similar recommendations 1418 may be automatically processed by a computer to identify likely matches.

Figure 14C:
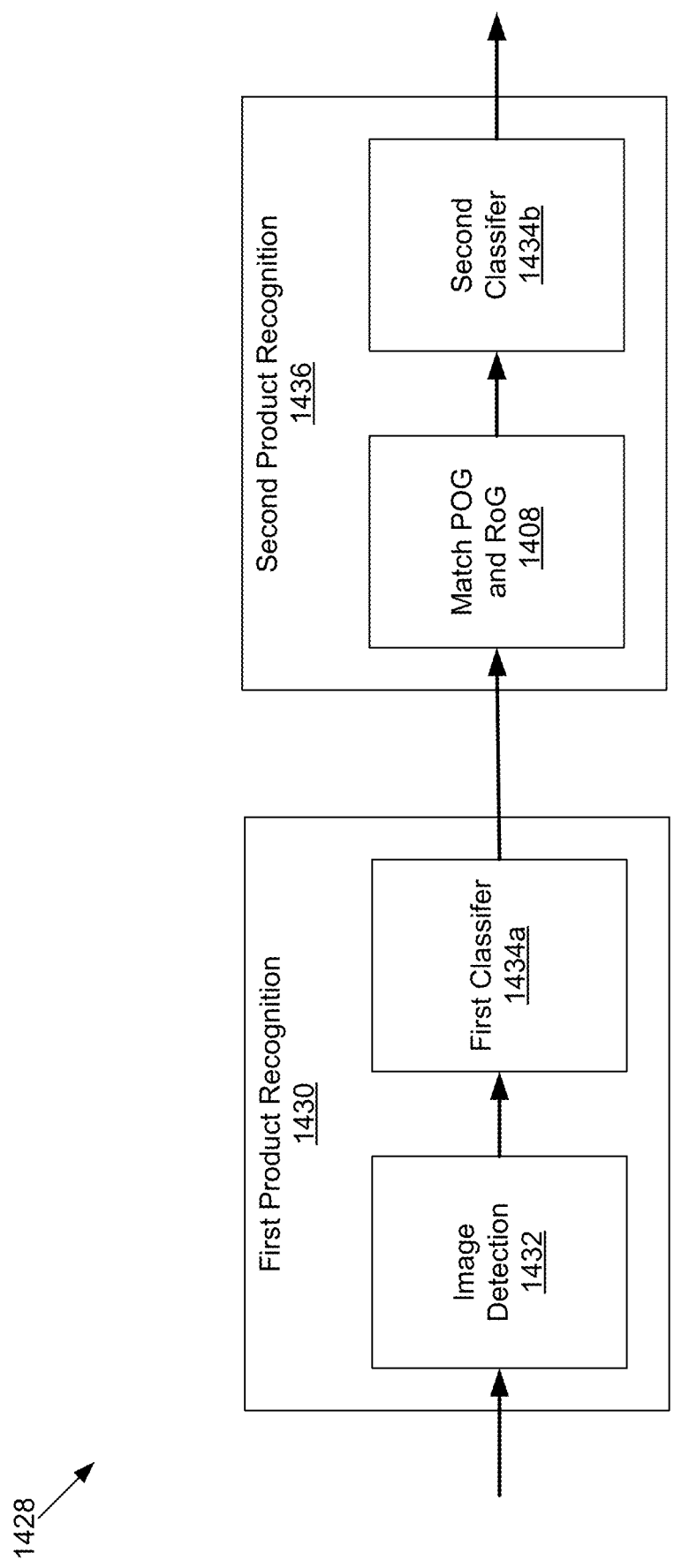

FIG. 14C is a data flow 1428 for product recognition. The data flow 1428 illustrates how the image processing module 203 and classification module 207 may identify where products are located and what the products are once the products are located. Product recognition includes product detection followed by product classification. The image processing module 203 may include a first product recognition block 1430 for product detection and a second product recognition block 1436 for product classification as will be described in more detail below. The first product recognition block 1430 includes an image detection block 1432 to perform product detection in an image or scene. In some embodiments, the image processing module 203 may perform the image detection 1432 by finding locations for products in an image. For example, the image detection 1432 may output bounding boxes or bounding polygons indicating locations of products. The classification module 207 may classify at the first classifier 1434a the products identified by image detection block 1432 in an image (e.g., identify a UPC or multiple possible UPCs for the products). In some embodiments, the classification module 207 may perform the first classifier 1434a operations. In some embodiments, the regions may be classified using a Convolutional Neural Network (CNN) classifier.

The image processing module 203 may compare at the match POG and ROG block 1408 as part of second product recognition block 1436. The match POG and ROG block 1408 finds locations where products are expected based on a planogram and where no product was found in the image by first product recognition block 1430. The image processing module 203 may match at match POG and ROG block 1408 by comparing the planogram to identified products in the image from product detection block 1430 and mapping the planogram products to the identified products. The match POG and ROG block 1408 may then identify products in the planogram that were not mapped to identified products and identify the locations of where those planogram products should have been mapped in the image. The classification module 207 may perform the operations of a second classifier 1434b to determine the location of where planogram products should have been mapped in the image. The classifications may be identified as gaps, as unknown products, or as specific products found at those locations as discussed elsewhere herein. The second classifier 1434b may have a similar form and function to the first classifier 1434a so like number are used to reference these blocks.

Figure 15A:
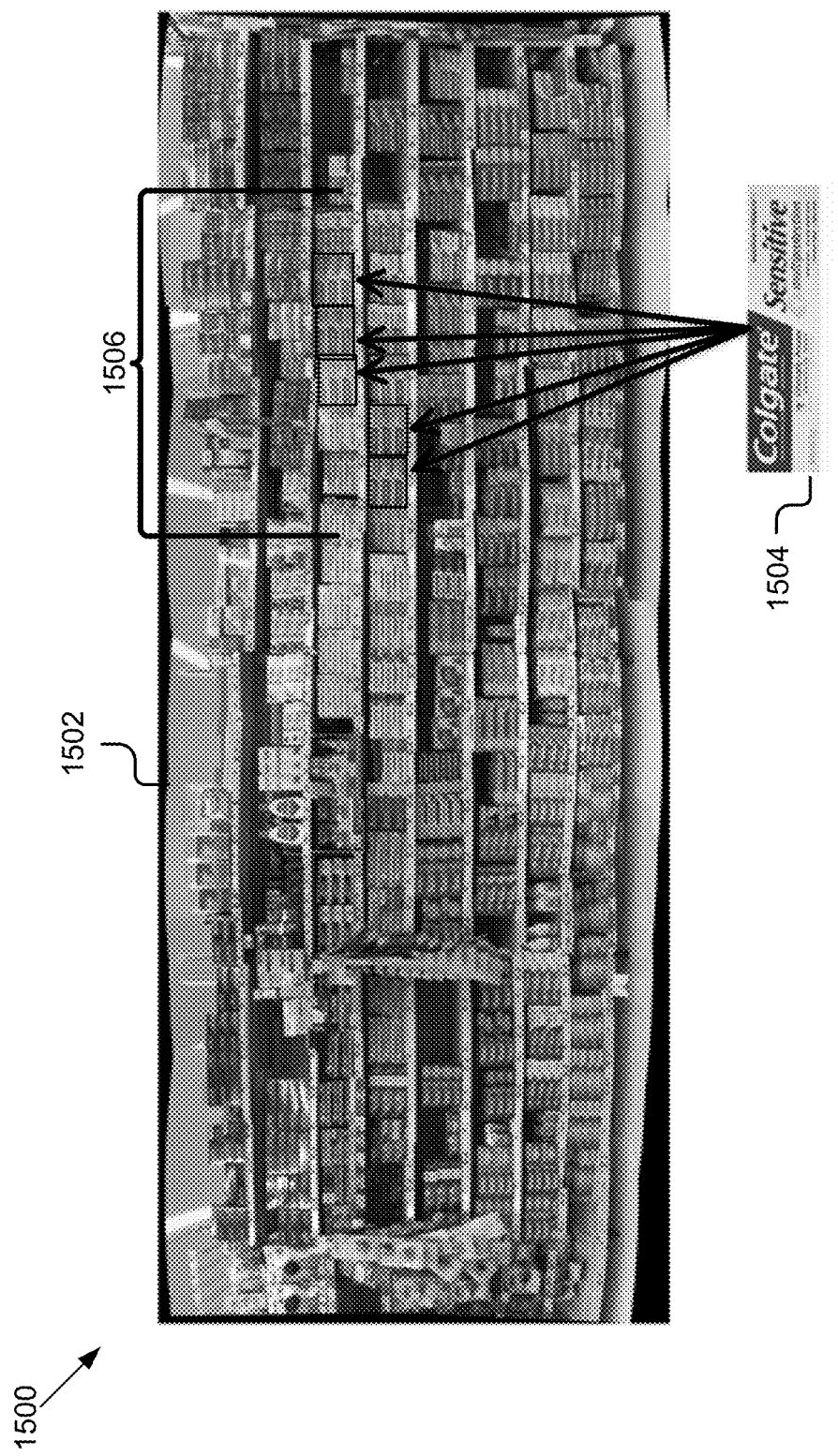
FIGS. 15A-15C are graphical representations of example comparisons of a planogram and image.

FIG. 15A is a graphical representation 1500 of an image 1502. The image 1502 may be processed by the image processing module 203 to identify objects based on a symbolic identifier. In this example, a product 1504 from a planogram has been identified in multiple products 1506 on a shelf in the image 1502. The product 1504 from the planogram and the identified products 1506 include a similar symbolic identifier. The symbolic identifier may be any characteristic that identifies a product, such as a Universal Product Code (UPC), product name, brand, packaging characteristic, etc. The image processing module 203 may find facings of products in the image and identify products based on those facings. For some products, the identification from image processing module 203 may be incorrect (i.e. a recognition error may have occurred). The image processing module 203 may provide one or more identifications for an object such as providing the top five candidates (i.e. the best five recognition results). When a recognition error occurs or more than one identification is provided, a single product such as 1504 in the planogram may have multiple matches in the image 1502. A confusion set (of identifiers) are identifiers for products that are similar in appearance such that image processing module 203 is known to either return the identifiers together when more than one identification is provided and/or when a recognition error occurs the image processor may return an incorrect identifier in the set instead of the correct identifier. Also, in the planogram, only one product may be present, such as product 1504, while in the image 1502, multiple products 1506 that are the same may appear in the portion of the shelf that the planogram maps a product to. For example, the multiple products 1506 are stacked on the shelf so that the shelf space may be more efficiently utilized. In some embodiments, the locations of objects found are used by alignment module 219 in comparing an image to a planogram as described in relation 1704 of FIG. 17.

Figure 15B:
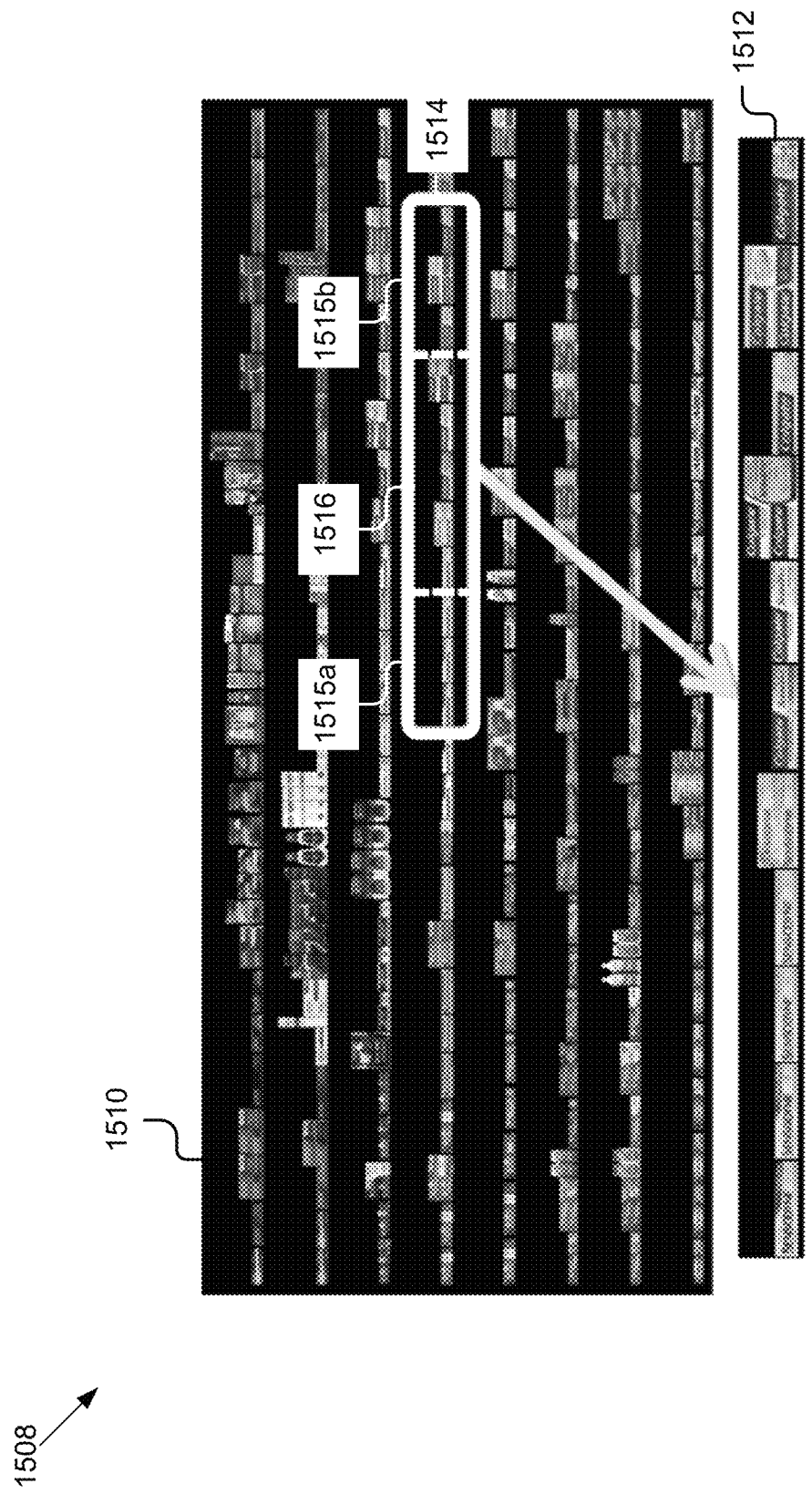

FIG. 15B is a graphical representation 1508 of a planogram 1510. The planogram 1510 includes mappings of linear groupings of product facings. A local region 1514 of a linear group of the planogram 1510 may be selected for matching. The local region 1514 may include a matching region 1516. In some embodiments, the local region 1514 may also include neighboring regions 1515. The local region 1514 is extracted as a region of a planogram 1512 to be used in image matching. The size of the local region 1514 may be chosen such that it has sufficient information for matching. Matching a region typically may be more accurate than matching a single product alone. In one embodiment, the size of the region is chosen such that there are three overlapping regions that each include half the products in the whole linear group (e.g., the left-most half, center-most half and right-most half). In one embodiment, the size of the region is based on the size of the individual images used to capture the scene. In one embodiment, the size of the region is based on the size of slices used for a grouping. In one embodiment, the slices used for a grouping are from vertical divisions of an image. For example, the slices may include a portion of a shelving unit divided into five slices. In one embodiment, where the recognition error rate is P, the region size is chosen such that it contains N products where $1-P^N>=T$ where T is a threshold such as 0.9999. In one embodiment, the regions size chosen such that it contains N products where N−1 is the number of products in a brand chunk (where brand chunk is described in relation to FIG. 22). In one embodiment, the region is chosen such that the products the region meets the criteria that there is at least K (e.g., K=2) pairs of products in the region that have identifiers that are not in the same confusion set. The alignment module 219 may perform the matching between the matching region 1516 and a region of an image. In FIG. 15B, only one matching region 1516 is shown; the alignment module 219 may perform matching with a plurality of matching regions such that every planogram product is in one or more matching regions. In one embodiment, the alignment module 219 performs matching with a plurality of matching regions such that every planogram product is in exactly one matching region.

Figure 15C:
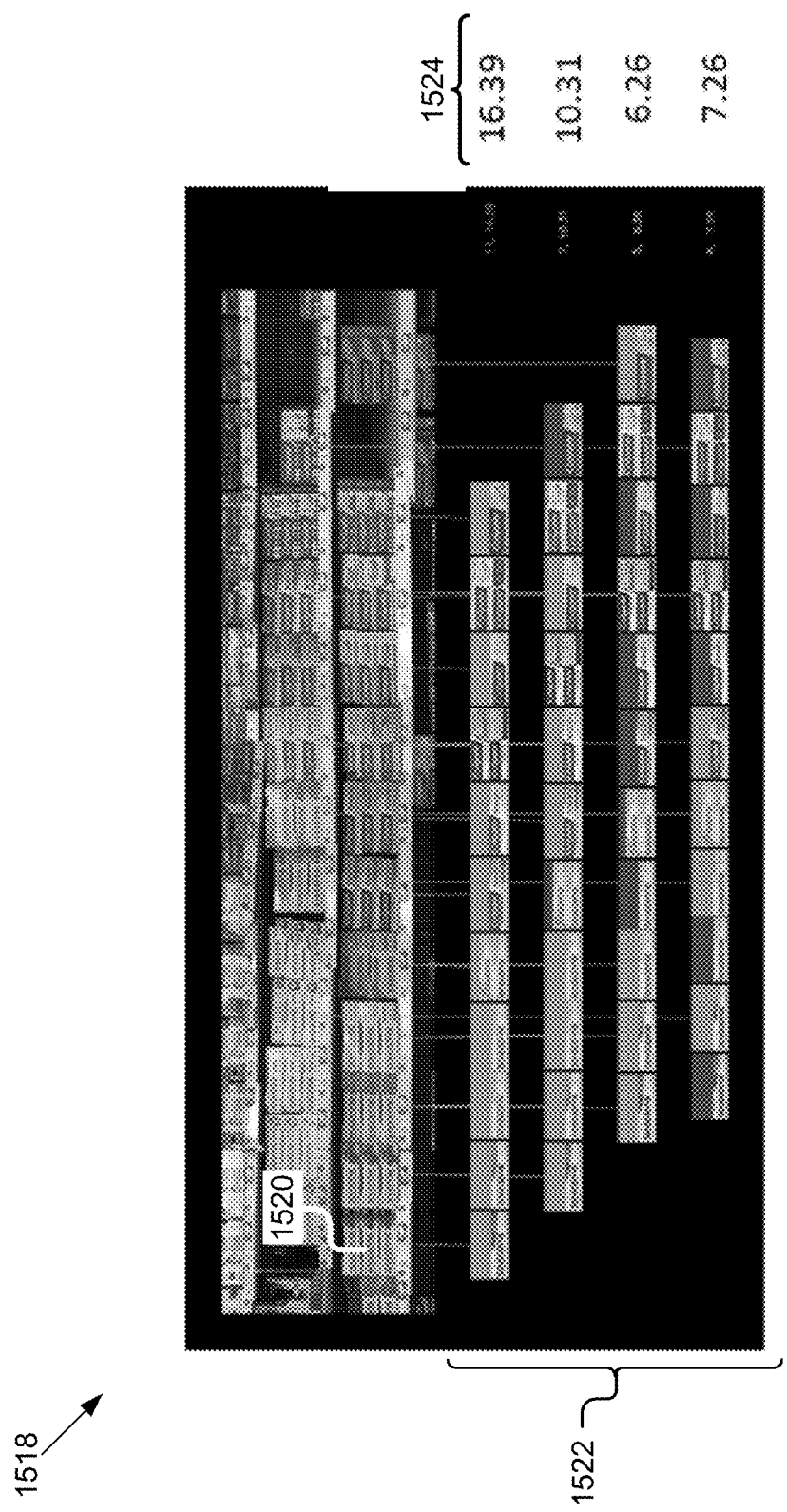

FIG. 15C is a graphical representation 1518 of a matching result. A shelf region 1520 of a processed image may include recognized products. Planogram region 1512 may be compared to shelf region 1520 at multiple alignments 1522. Each alignment 1512 is a location in shelf region 1520 that may be a possible match for planogram region 1512. In this example, four alignments 1522 based on four different seeds of planogram shelves have been selected for a comparison to the shelf region 1520. A seed is a pair of one sample product and one recognized product, one product 1504 from the planogram region 1522 and one corresponding product from products 1506 from the shelf region 1520. Different seeds use different pairs of product 1504 and product from products 1506. For one seed, inliers are a plurality of pairs of neighboring products that have similar alignment. For two pairs, either they both have similar alignment and both are inliers for either as a seed, or they have dissimilar alignment and are seeds for two distinct alignments. The comparison between Planogram region 1512 and shelf region 1520 may be done by picking a product 1504 from the planogram region 1522 (and a corresponding product from products 1506) to be a seed, determining an alignment and inliers based on the seed, and determining a matching score 1524 based on the matches detected between the shelf 1508 and the alignment 1522. The determination of the alignment and inliers based on a seed may be a linear fit of the X coordinates, may start with the X coordinates for the seed and may be done iteratively for each product within the planogram region 1512. To illustrate the matching scores 1524 for the alignments 1522, colored, highlighted boxes (e.g., red and green boxes) in FIG. 15C may be used to indicate how many products of the shelf 1520 matched products of the alignment 1522. A green box shows products that matched and a red box shows products that did not match in the comparison. The matching score may be calculated based on those products matched. The matching scores 1524 may be used to determine which alignment 1522 of the planogram corresponds to the shelf 1520 and in one embodiment, the alignment 1522 with the highest matching score may be selected for the shelf 1520 region. In one embodiment, the alignment with a matching score satisfying a threshold may be selected for corrective action analysis. In one embodiment, the alignment 1522 with the highest matching score that also has 2*K matches for K pairs of products (e.g. K=1) that have identifiers that are not in the same confusion set. In one embodiment, the alignment 1522 with the highest matching score also has $K_1$ and $K_2$ matches (e.g., $K_1=1$ and $K_2=1$) where for pairs of products that are not in the same confusion set, $K_1$ matches are for the first item in the pair and $K_2$ matches are for the second item in the pair given any consistent ordering for the pair such as left-to-right (e.g., if there are pairs A,B and C,D, A and C contribute to $K_1$ and B and D contribute to $K_2$ so that in addition to matching A and B or C and D being sufficient, matching A and D or B and C is also sufficient). The alignment 1522 may be used in the comparison with the shelf 1520 to determine a corrective action for the shelf 1520 based on differences between the alignment 1522 and the shelf 1520.

In one embodiment, by matching the alignment 1522 to the shelf 1520, geometrically consistent matches of the local region may be identified through an exhaustive search with branches and bounds. In some embodiments, the seeds for alignments 1522 (e.g., each product 1504 in planogram region 1512) may be sorted in order based on a recognition score of the recognition results from image processing module 203 (e.g., the image processing module 203 may provide confidence values, probability values or other metrics such as a values where a larger value indicates a better recognition result). In one implementation, once a product has been used as an inlier for comparison with the seeds 1522, that product will not be used as a seed for future comparisons of the image, meaning each iteration tends to reduce the possible seeds for future iterations. In one implementation, a product may be chosen to be an inlier by one criterion (e.g., based on the product's center location) and only not used for future iterations if it meets additional criteria (e.g. based on the product's left and right edge location). In some embodiments, the maximum possible matching score 1524 and maximum possible number of inliers is determined at each iteration step. In some embodiments, the search terminates when these maximums are worse than results found in previous iterations.

In some embodiments, inliers may be chosen for the comparison by fitting X-axis coordinates between an image and a planogram. An initial linear fit for scale and offset is determined by using the left and right edges of a seed. Then matching based on an identifier (e.g., UPC) and the fit (e.g., comparing the image coordinates mapped by the fit to the planogram coordinates) is performed to find products that are inliers. Matching starts by using the initial fit. Choosing inliers is performed with the products ordered from closest to the seed to farthest from the seed (based on X coordinates). When a new inlier is then identified, a new linear fit is computed for use for choosing inliers from the ordered products that have not yet been considered. Alternatively, if a product is not an inlier, further processing only chooses inliers that have X coordinates that leave a gap for the product that was not an inlier. In some embodiments, the matching may use the left and right (or centers) of multiple inliers for linear fit for scale and offset. Then a final matching may be performed to re-check for final inliers. If there are many inliers (e.g. greater than or equal to 6) then the matching may perform a higher polynomial fit (e.g. offset $x^0$, scale $x^1$ and $x^2$) or multiple linear matches for different parallax for image products from images taken from different viewpoints. Inliers meet criteria for both the x-axis coordinates and y-axis coordinates. For x-axis coordinates, in one embodiment, the criteria include using mapped image coordinates and planogram coordinates to make parameters for Gaussian functions. In other embodiments the x-axis coordinate criteria includes fitting the image x-coordinates to planogram x-coordinates and performing a hard threshold (for example, if the center of mapped planogram product inside of image portion to the left and the right.) In one embodiment, the y-axis coordinates criteria includes a hard threshold based on if there is any overlap in the y-axis between the item (e.g. product) and the seed (e.g. overlap of the facings.) In another embodiment, the y-axis coordinates criteria includes determining if the item and seed are in the same linear group.

In some embodiments, image processing module 203 provides multiple recognition candidates for each item and a recognition score for each candidates ($S_{i,j}$ where i enumerates the items, j enumerates the candidates for item i, and the candidates for each item are sorted such that $S_{i,j}>=S_{i,j+1}$) that relates to the candidates, but is not comparable between candidates for different items. Determining the matching score 1524 for a group of facings may use these recognition scores for candidates. The recognition score for the candidate with matching symbolic identifier ($S_{i,m}$ where m indicates the value of j for the candidate that matches, e.g., the candidate in the recognition results for item i with the UPC that matches the UPC in the planogram for item i) is normalized by dividing by the maximum recognition score for all candidates for that item to determine a normalized matching score for the item (i.e. $S_i'=S_{i,m}/S_{i,1}$). If there is no match for item i, $S_i'$ is zero.

In some embodiments, the matching score 1524 for a group of facings may be determined by taking advantage of multiple image matches for a stack of products in the same facing. The algorithm may include taking the weight of the matches with exponential decay and sum (e.g., $S_{facing}=\tau S_i'*2^{-(i-1)}$). For the case where facings include a single item, this processing reduces to the sum of the matching scores for each item.

In some embodiments, the selected alignments for all regions in the image are further processed to find consistent alignments for the image. Alignments are compared based on criteria. Criteria may be based on a number of inliers, a matching score, the number of pairs of products in the region that have identifiers that are not in the same confusion set, and/or other similar values. For example, an alignment might be considered a high confidence alignment if it has at least three inliers and at least two pairs of products that are not in the same confusion set. An average of high confidence alignments can be determined as a global or average alignment for use in further processing. For alignments with only one inlier, scale from average or scale from neighbors is used if the offset of the alignment is consistent with average or neighbors. Alignments with a scale or offset that is much different (e.g. matches where the mapping of X coordinates differs by more than α*average product width, e.g. α=1.0) from average or neighbors with higher confidence can be rejected. For regions with rejected alignment, average alignment or alignment from not rejected alignment, high confidence neighbors (e.g. a piecewise linear estimate from neighbors) can be used. Alignments for overlapping regions can be processed to find inconsistent locations for individual products (e.g. the same recognition result is mapped to two different planogram facings in two overlapping alignments, or different recognition results are mapped to the same planogram facing in two overlapping alignments) to determine where there may be an extra facing (product) or a missing facing (product).

In some embodiments, the average alignment, consistent alignment for each region and alignment for individual products is provided for use in further processing. This alignment information may be provided in JSON format. The average alignment may comprise an offset and scale that maps planogram coordinates to image coordinates. The consistent alignments for each region may comprise indices that identify the region in the planogram, indices that identify the region in the realogram, an offset and scale that maps planogram coordinates to image coordinates for the region (or equivalently image coordinates for two reference coordinates in the planogram) and/or an offset and scale the maps image coordinates to planogram coordinates (or equivalently planogram coordinates for two reference coordinates in the image). Regions may be chosen such that region boundaries (when not at the ends of a linear group) are between pairs of products that are not in the same confusion set and at least one product in the pair is an inlier for the alignment. The consistent alignments for each region may additionally comprise information about missing or extra facings (products). The consistent alignments may future comprise information about which facings are not inliers for the match and which have a detected product that does not match (e.g. a recognition result that does not have the expected symbolic identifier.) The alignment information for individual products may comprise image coordinates corresponding to each product or facing in the planogram and a reference (e.g. indices) into the recognition results, if any, corresponding to that product or facing. In some embodiments, corresponding recognition results may inliers. In further embodiments, corresponding recognition results may be labeled as being inliers or labeled as not being inliers.

In one example, products may be missed by a first recognition because the products are pushed farther back on the shelf, are on the edges of the image, or include light distortion or glare. These missed products may be referred to as unknown products that will require further processing for identification, as discussed elsewhere herein. In other embodiments, the missed products may actually be empty spots on the shelf that the image processor may identify as "gaps." For example, the planogram and image may be compared and products identified, but a region of the image may not include matching results because no product was identified in the region. By performing a second matching to determine if products are included in the unknown region, a more accurate analysis may be accomplished, as discussed elsewhere herein.

Figure 16:
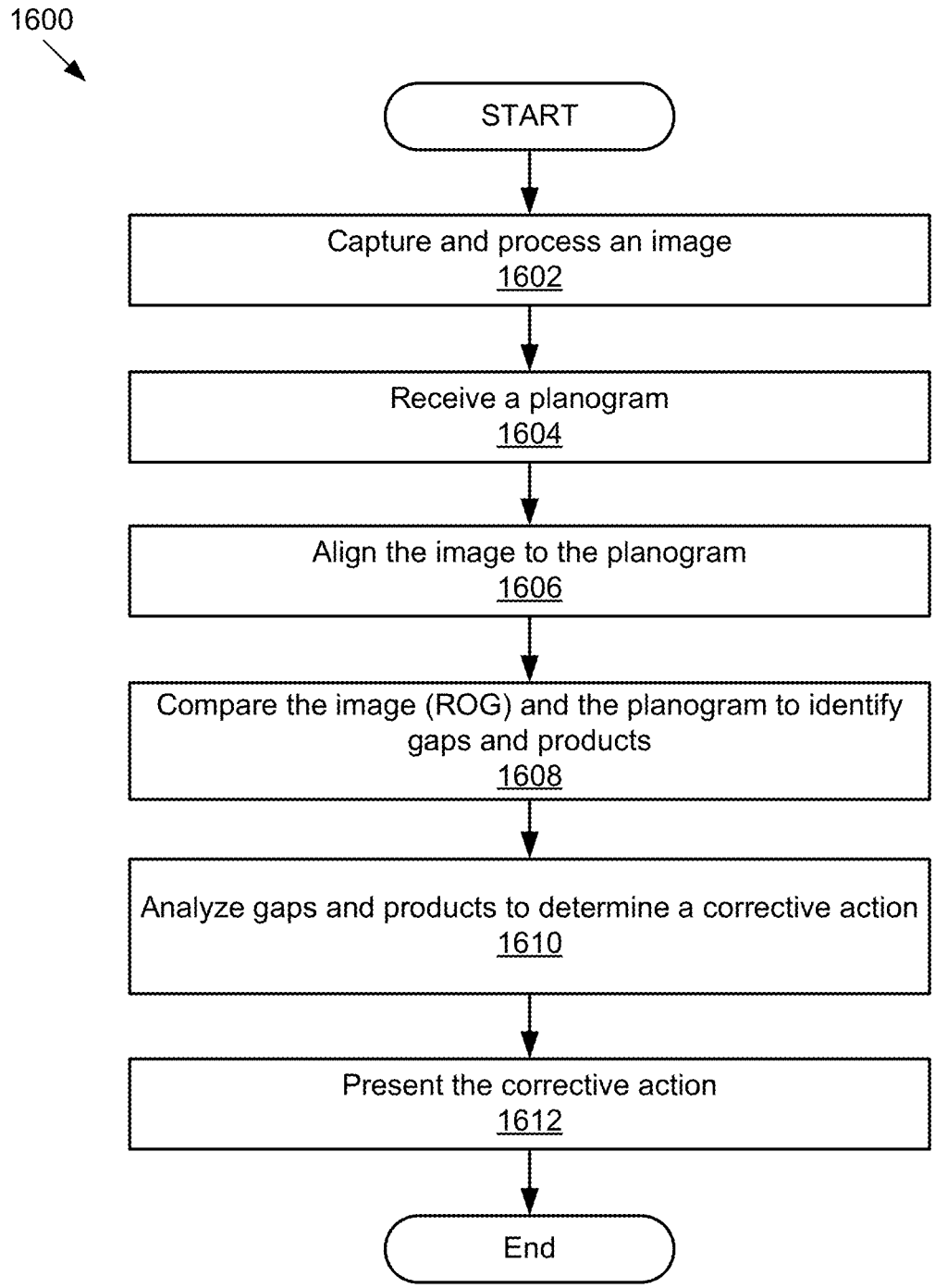
FIG. 16 is a flow diagram illustrating one embodiment of a method for comparing an image to a planogram to generate a suggestion or corrective action.

FIG. 16 is a flow diagram of one embodiment of a method 1600 for comparing a planogram and an image. At block 1602 the image recognition application 103 may capture and process an image (or a scene with multiple images). The image recognition application 103 may capture the image using a camera or other capture device coupled to the image recognition application 103. In other embodiments, the image recognition application 103 may receive a previously captured image from a network 105 or retrieve a previously captured image from memory 237. The image processing module 203 may process the image (e.g., stitch multiple images into one), or in alternative embodiments, the image may have been previously processed and is received by the image recognition application 103 after processing has occurred. At block 1604 the alignment module 219 receives a planogram. The planogram may have been stored in data storage 243 on the image recognition application 103 or the planogram may have been received from a network 105. At block 1606, the alignment module 219 aligns the image to the planogram. In some embodiments, the alignment may occur as described above by iteratively matching seeds and inliers of different facings of the image with the planogram. At block 1608, the gap detector module 217 compares the image and the planogram to identify gaps and products. At block 1610, the gap detector module 217 may analyze the identified gaps and products to determine a corrective action. In some embodiments, the identified gaps and products information may be sent to the corrective action module 215 and the corrective action module 215 may determine a corrective action. At block 1612, the corrective action module 215 presents the corrective action. The corrective action module 215 may present the corrective action in a user interface and the corrective action may appear as text, or alternatively the corrective action may be an indicator highlighting a portion of an image where a difference exists.

Figure 17A:
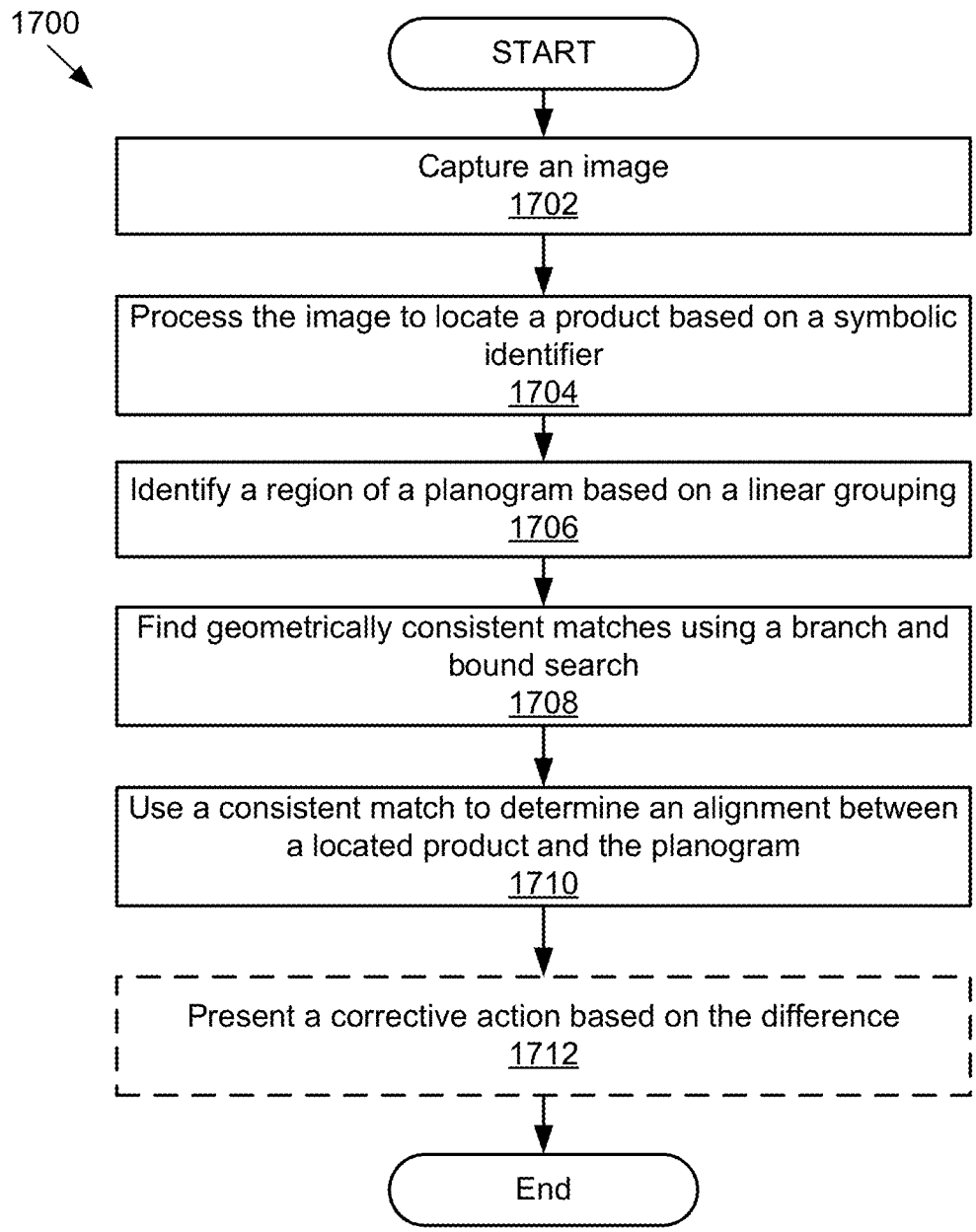
FIG. 17A a flow diagram illustrating another embodiment of the method for comparing an image to a planogram to generate a suggestion or corrective action.

FIG. 17A is a flow diagram of another embodiment of the method 1700 of comparing a planogram and an image to determine matches. At block 1702, the image recognition application 103 captures an image (or a scene with multiple images), the image or images may be an image or images of a product shelf. At block 1704, the image processing module 203 processes the image to locate a product in the image based on a symbolic identifier. In some embodiments, the symbolic identifier may be a UPC or other characteristic of the product. Locating a product may be done as described above with reference to FIG. 15A. At block 1706, the alignment module 219 may identify a region of a planogram based on a linear grouping. The region of the planogram may be a portion of the planogram that may be used to match inliers/seeds. Identifying a region of a planogram may be done as described above with reference to FIG. 15B. At block 1708, the alignment module 219 may find geometrically consistent matches using a branch and bound search as described above with reference to FIG. 15C. At block 1710, the corrective action module 215 may use a consistent match to determine a difference between a located product and the planogram. The difference may include incorrectly stocked items (e.g. hidden out of stock) or empty portions of the shelf that need to be re-stocked. At block 1712, the corrective action module 215 may present a corrective action based on the difference. The corrective action may include re-stocking the shelf, switching out an incorrectly stocked product, removing a recalled product, or other actions based on the difference.

Figure 17B:
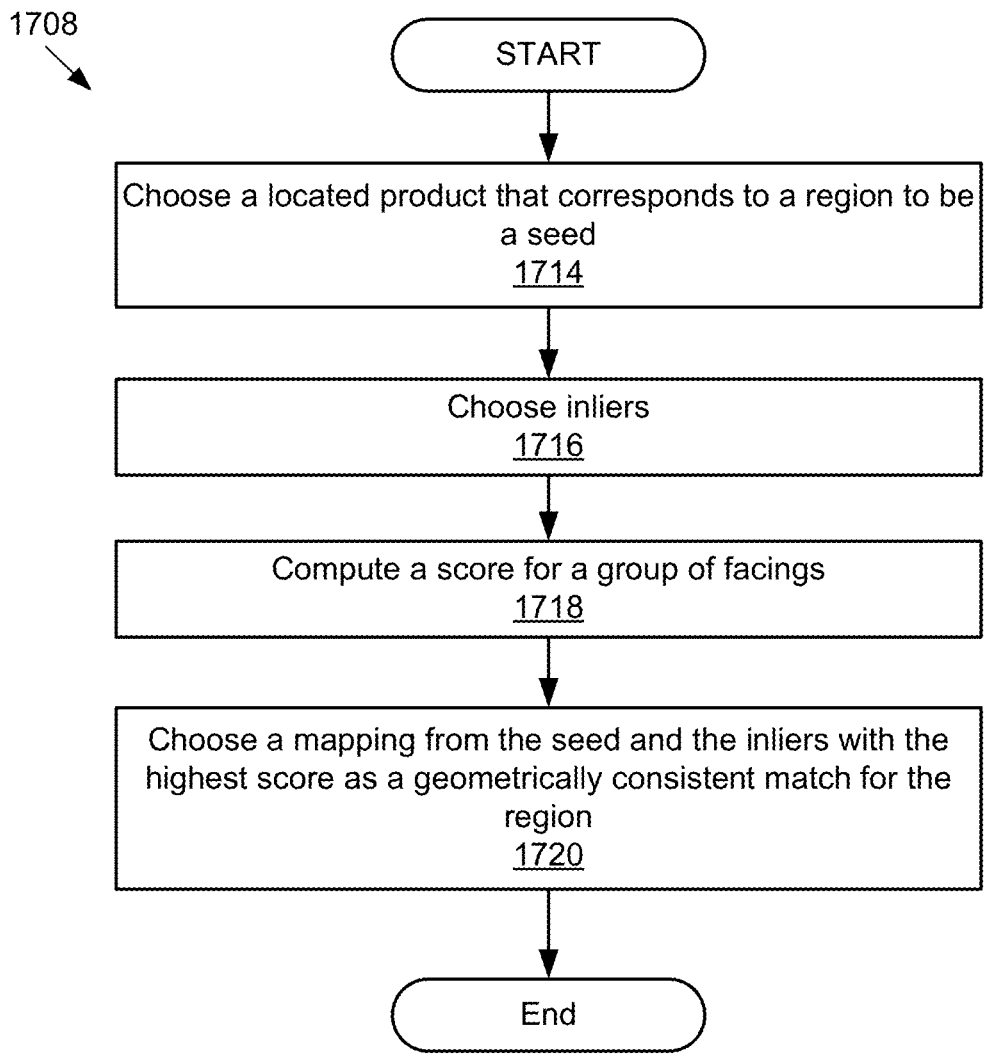
FIG. 17B a flow diagram illustrating one embodiment of a method for finding geometrically consistent matches.

FIG. 17B is a flow diagram of one embodiment of a method 1708 for finding geometrically consistent matches. At block 1714, the alignment module 219 may choose a located product that corresponds to a region to be a seed. At block 1716, the alignment module 219 may choose inliers that will be used for a matching comparison between the seed and regions of a planogram. At block 1718, the alignment module 219 computes a matching score for a group of facings as described above with reference to FIG. 15C. The alignment may be determined based on an iterative matching between different recognized products based on the seed/inlier matching. At block 1720, the alignment module 219 chooses a mapping from the seed and the inliers based on a condition for discriminating a correct match. In one embodiment, the condition may be to choose the mapping from the seed and the inliers with the highest matching score as a geometrically consistent match for the region. In another embodiment, at block 1720, the condition may be to choose the mapping with the highest score with at least three inliers and at least two pairs of products that are not in the same confusion set is chosen. In other embodiments, the method 1708 selects one or more mappings that satisfy a matching score threshold.

Figure 18A:
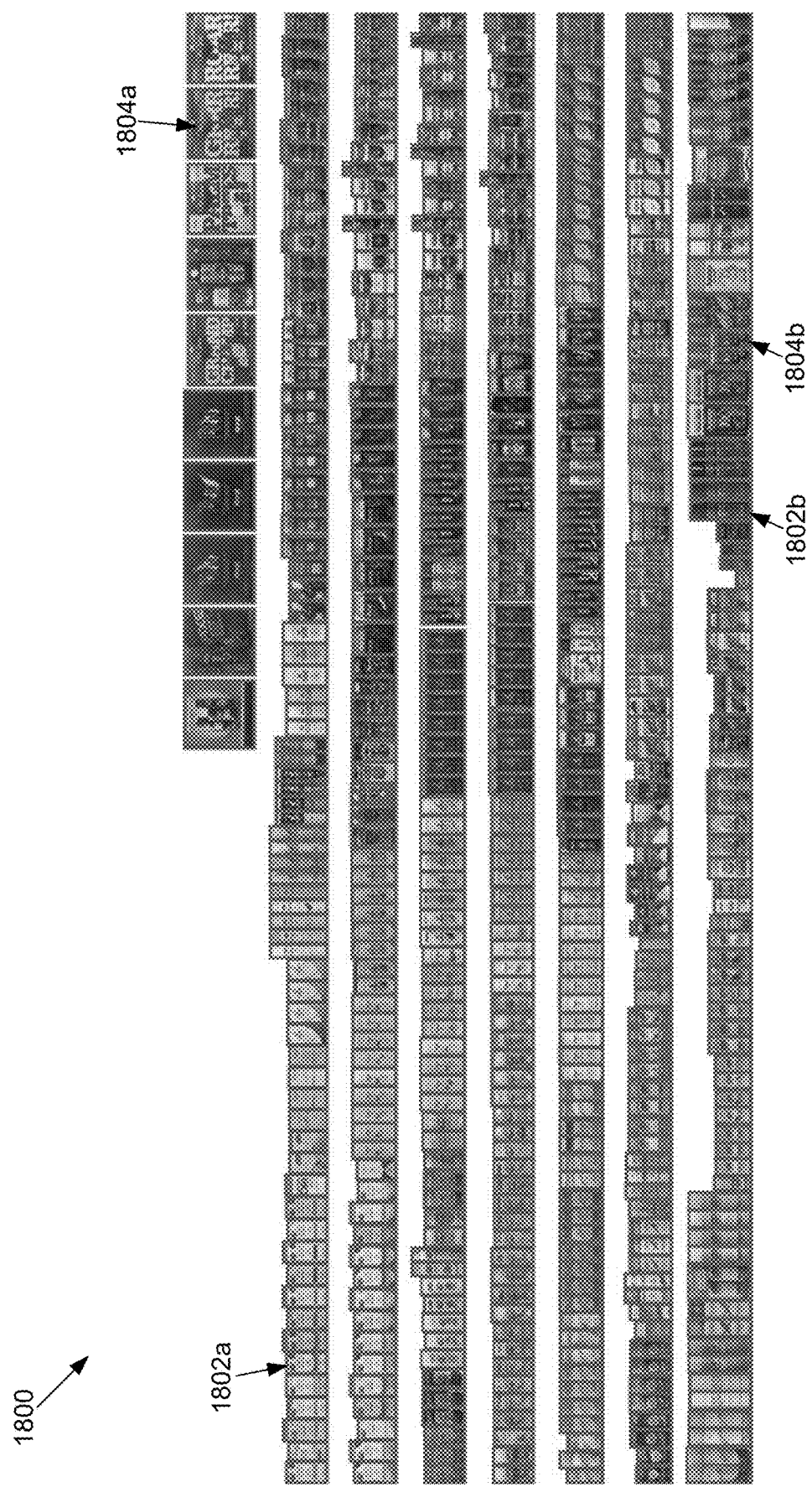
FIGS. 18A-18B and 19A-19D are graphical representations of example visualizations of recognized products.
Figure 18B:
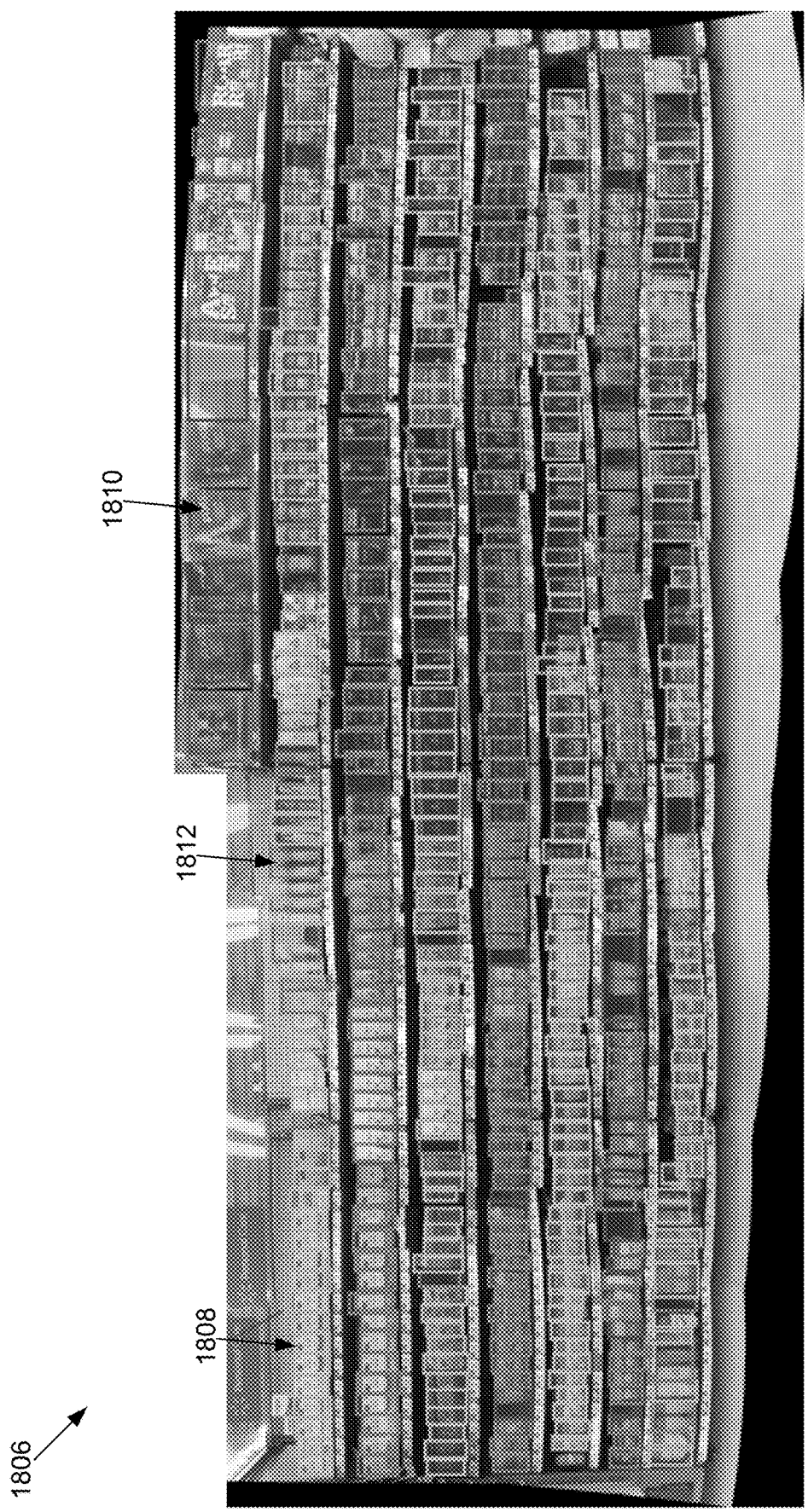

FIG. 18A is a graphical representation 1800 of recognized products. The alignment module 219 may perform a matching between the image and a planogram and determine matching products found on the planogram and the image. The alignment module 219 may create indicators for each product identified in the image; the indicators may include an indicator of a match or an indicator of no match. For example, in the graphical representation 1800, green indicators 1802 indicate example products that are matched to a corresponding product in the planogram and red indicators 1804 shows that there was no match for the product on the planogram. In further embodiments, the indicators may be boxes that surround the products on the planogram. The boxes may be different colors or other means of visual differentiation indicating which products in the planogram were matched to a corresponding product in the realogram. The alignment module 219 may also calculate how many of the products in the image were matched to the planogram and display a percentage of the total matched products. In FIG. 18B, a graphical representation 1806 displays linear groupings of recognized products. For each linear grouping in the image, the matching of the alignment module 219 may include the steps of determining if a top candidate is present anywhere in a planogram linear grouping, then associating the linear grouping with the product position to indicate a normal match. If a normal match is not found, then the image linear groupings are iteratively compared to a candidate list and if a match is found, associate that match as a candidate match. The alignment module 219 may display indicators for each recognized product included in a linear grouping to differentiate linear grouping results. In the graphical representation, 1806 the indicators 1808 are an orange color bracketing each product included within a first linear grouping. The indicators 1808 and 1810 are example indicators to show different linear groupings to the user. In the image, the linear groupings alternate colors so that a user can easily differentiate which linear groupings of shelf products are grouped together. The indicators 1810 are a blue color bracketing each product included within a second linear grouping. The image may include various colors groups bracketing individual products in different linear groupings. The indicator 1812 is a red color bracketing a product and/or area of the image that was not recognized in the comparison with the planogram.

Figure 19A:
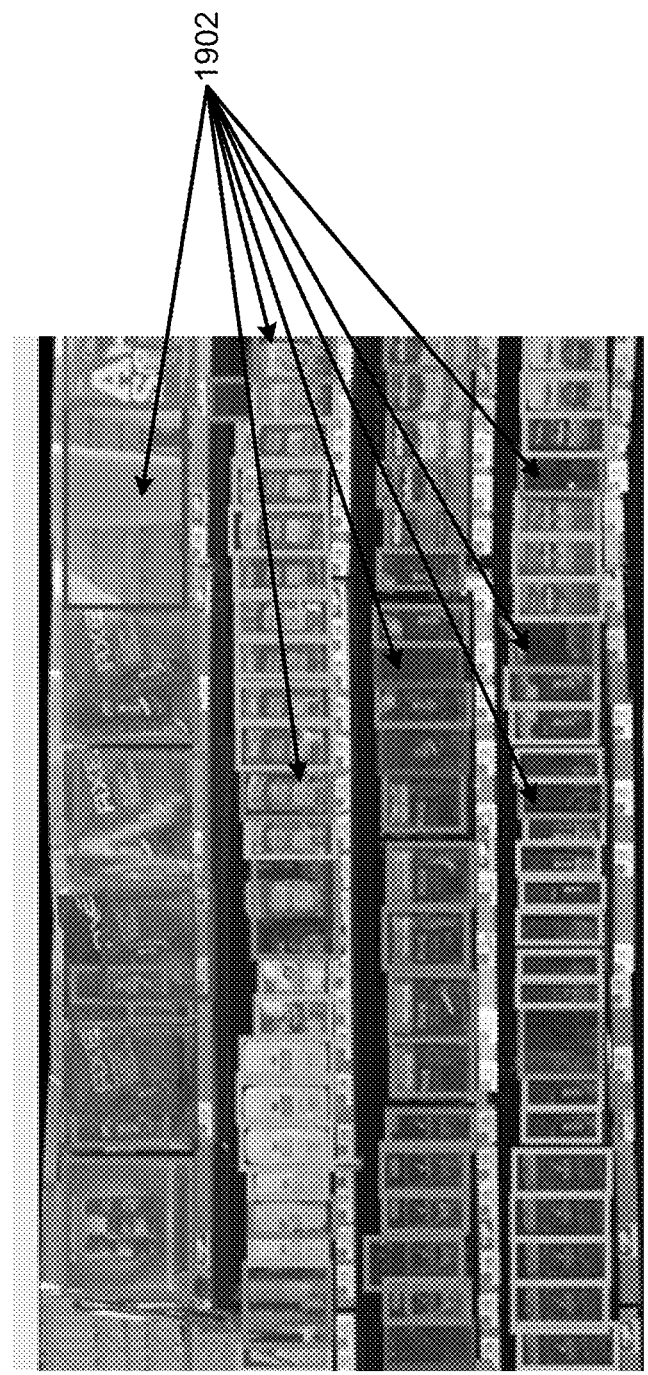
Figure 19B:
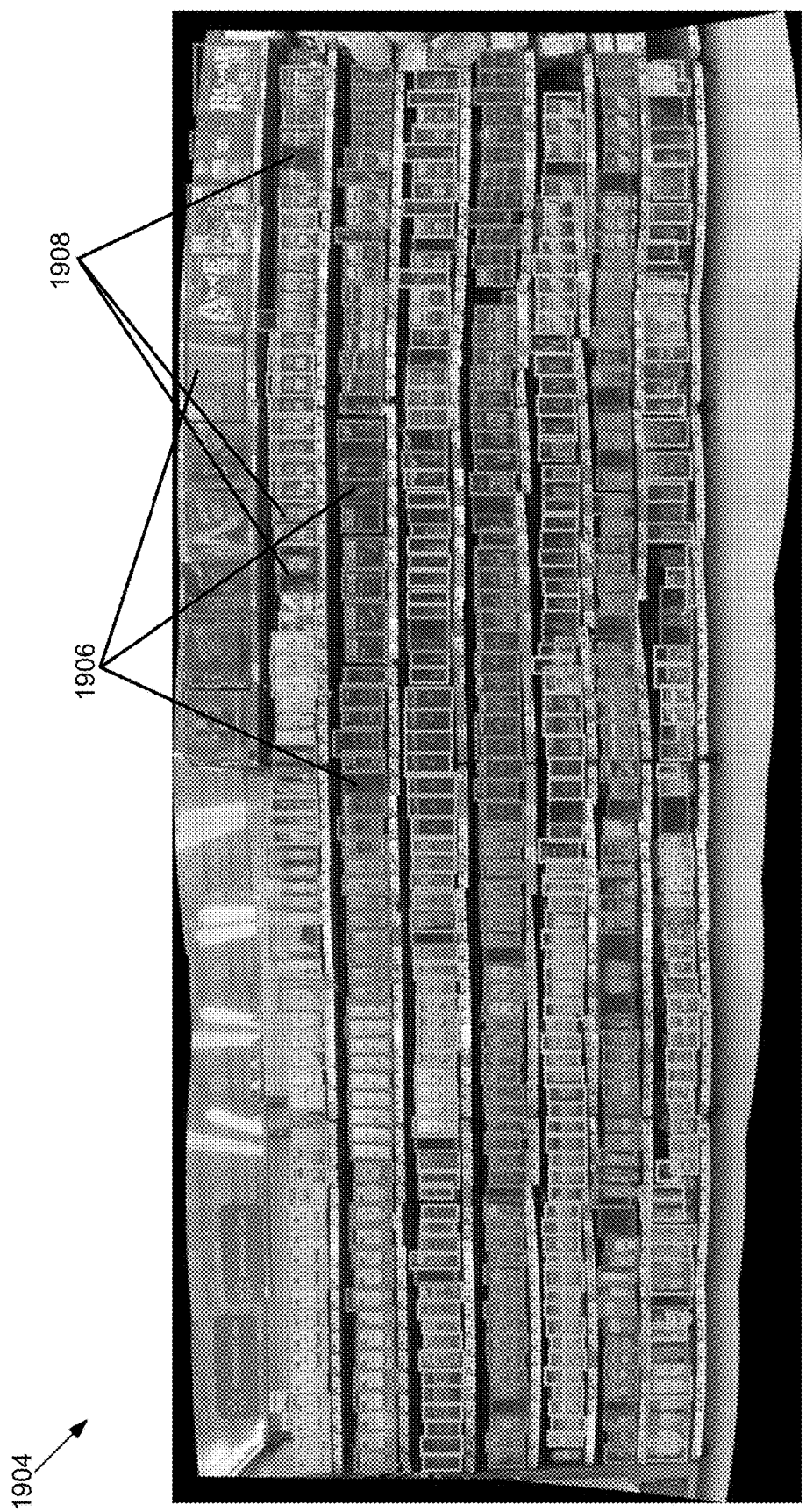
Figure 19C:
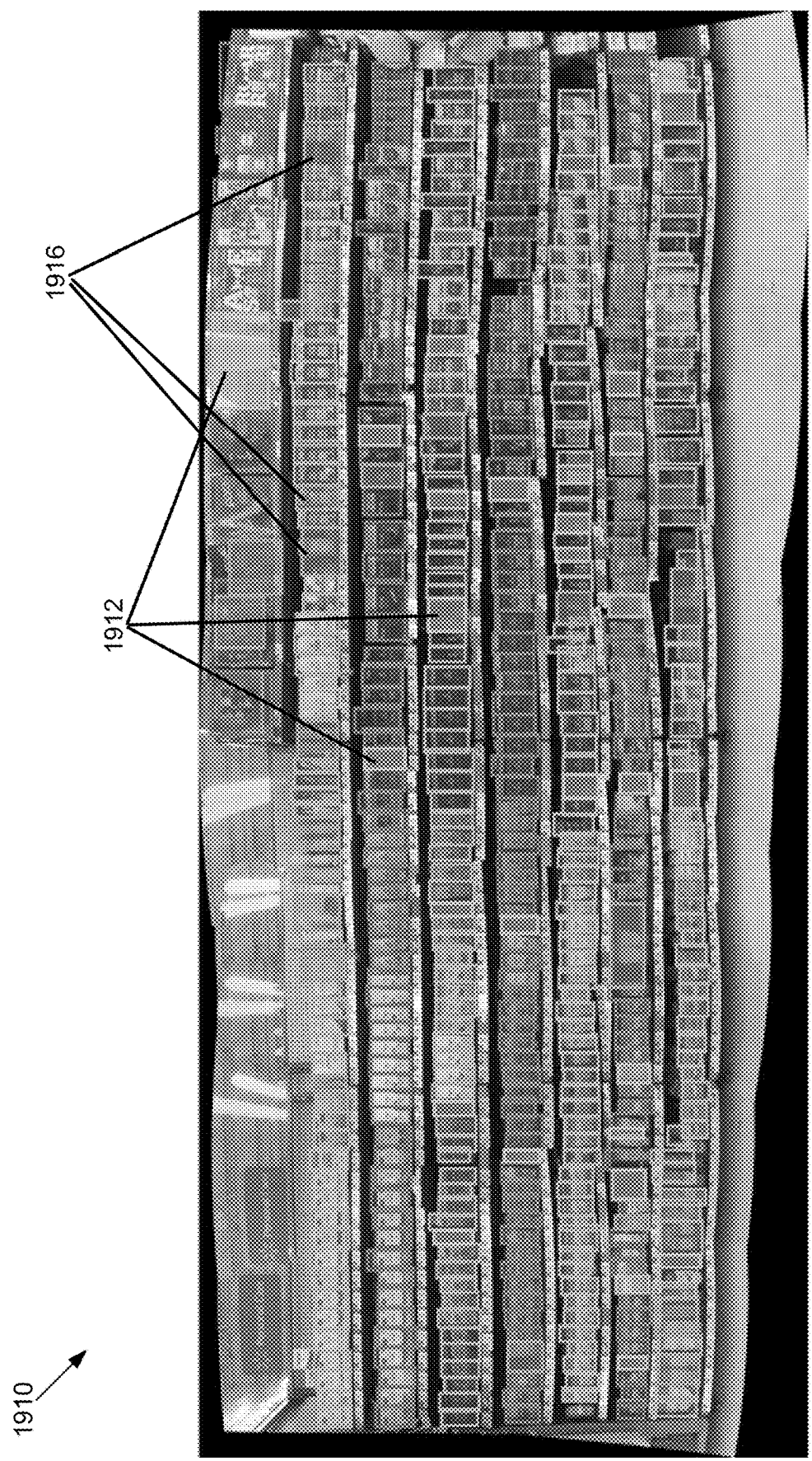
Figure 19D:
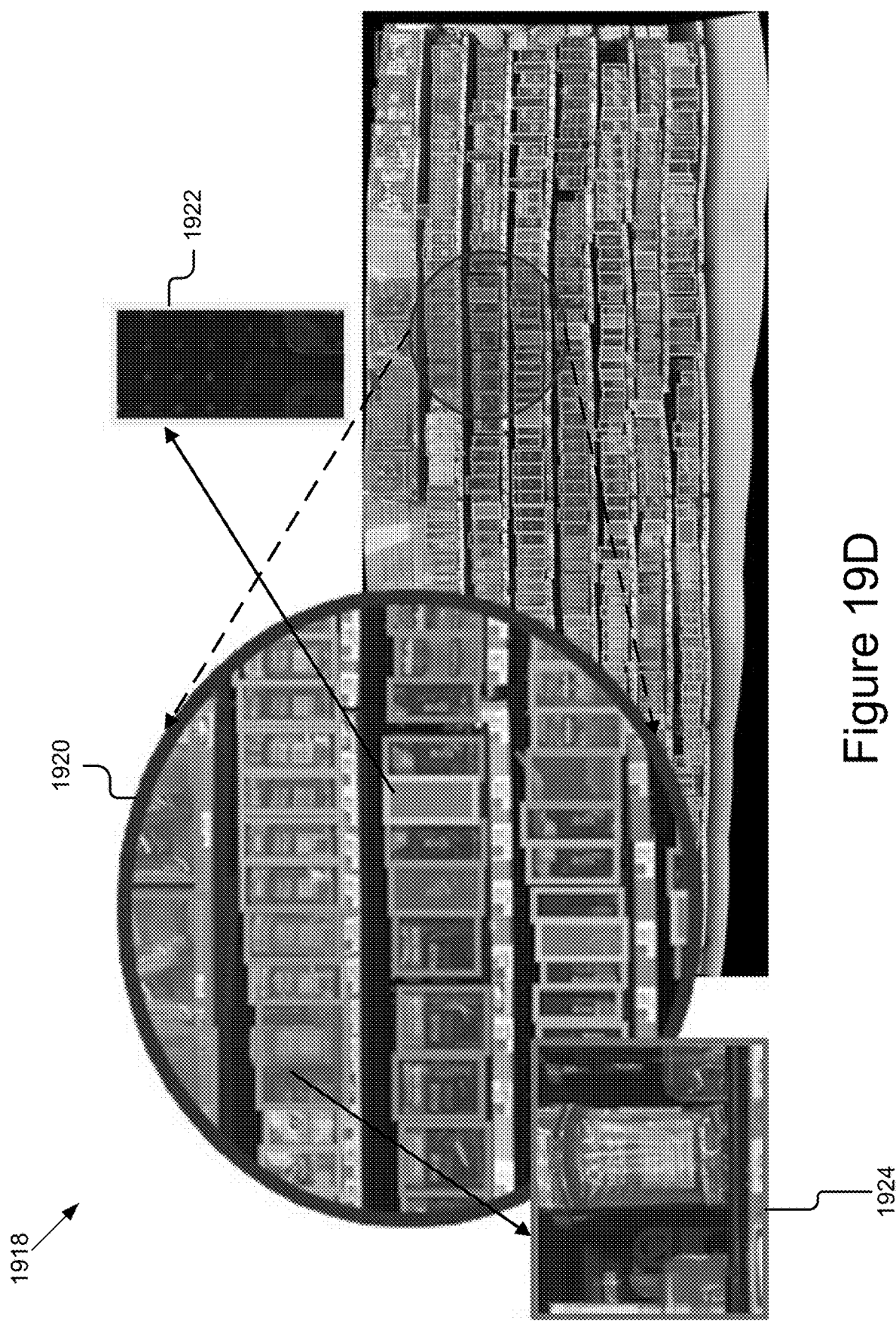

FIG. 19A is a graphical representation 1900 of a processed image that displays identified products and potential gaps 1902 in the processed image. A gap is an area in which during processing no recognition occurred. The processing may be performed by the image processing module 203 or another module in the image recognition application 103. Gaps 1902 may be empty spots on the shelf (holes) where no products are on display (e.g. an out of stock situation), or spots on the shelf containing unrecognized products. Identifying gaps 1902 may allow further processing by the gap detector module 217 to determine which gaps 1902 represent actual out of stock situations by analyzing the gaps and tagging each as either a hole or a potential product. FIG. 19B is a graphical representation 1904 displaying examples of detected gap areas 1906 and 1908 on a processed image. The gap areas 1906 and 1908 may include holes 1906 or potential products 1908. FIG. 19C is a graphical representation 1910 of an image where gaps have been determined to be either holes or potential products. The processing, performed by the gap detector module 217, may include three different processing filters, a color evaluation, an edge/line detector, or an image feature corner detector. In some embodiments, if two of the three processing filters product results indicate a potential product is present in the gap, then the gap detector module 217 may highlight that product as containing a potential product. Potential products 1916 are gaps that the gap detector module 217 determined included a potential product. In some embodiments, the potential product 1916 may be highlighted in a purple color bracketed around the product to indicate the potential products 1916. Non-products 1912 were determined not to include products by the gap detector module 217 and were highlighted as holes. The non-products 1912 may be highlighted in yellow bracketed around the product to indicate holes. The holes may indicate places on the shelf where an item is out of stock or a corrective action may be necessary. FIG. 19D is another graphical representation 1918 of determining gaps. A portion 1920 of a shelf is shown that include products and gaps. The gap detector module 217 may process the portion 1920 to determine which gaps include a potential product 1924 and which gaps are holes 1922.

Figure 20A:
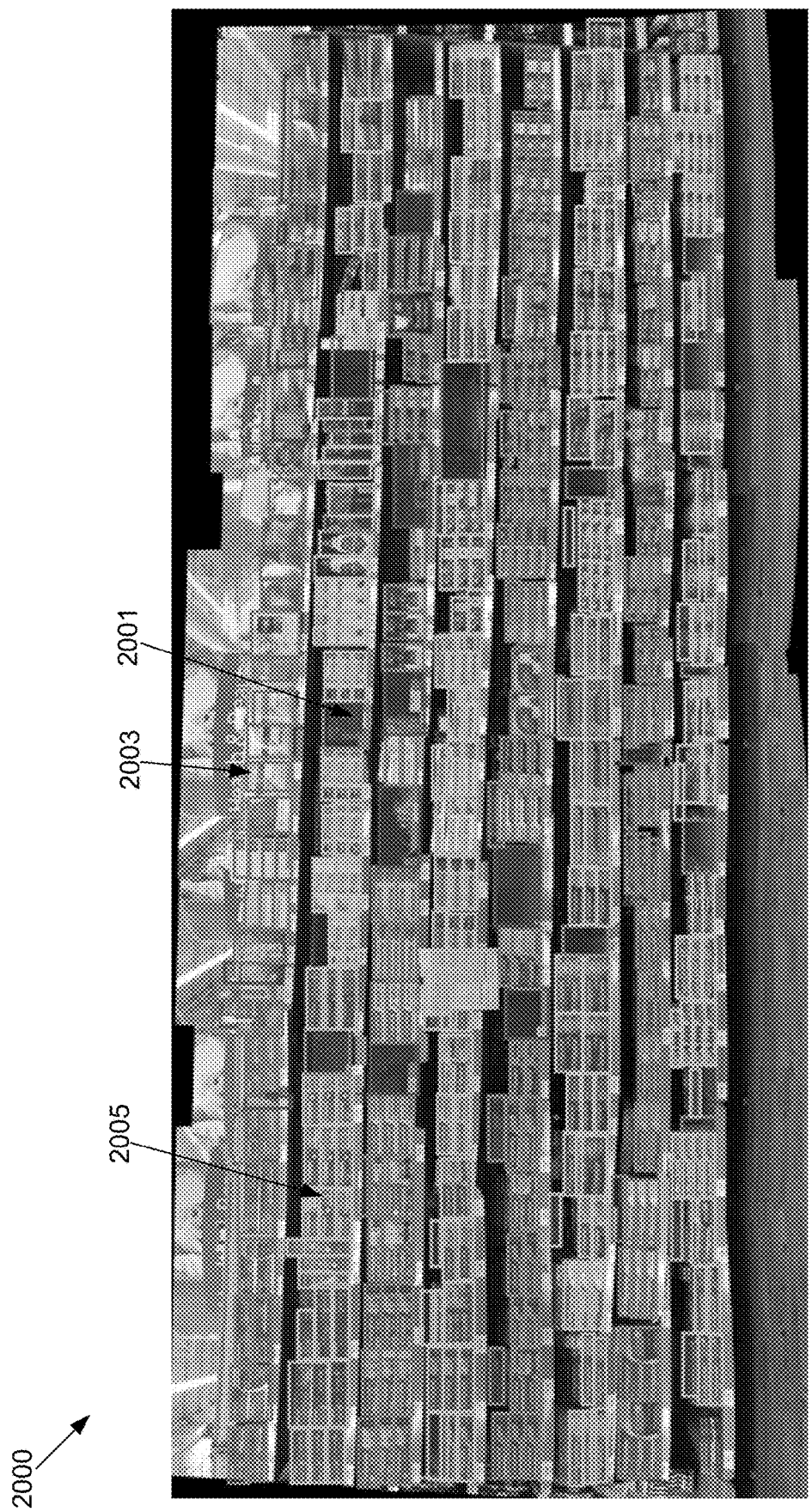
FIGS. 20A-20B and 21 are graphical representations of example visualizations showing recognized products and gaps.
Figure 20B:
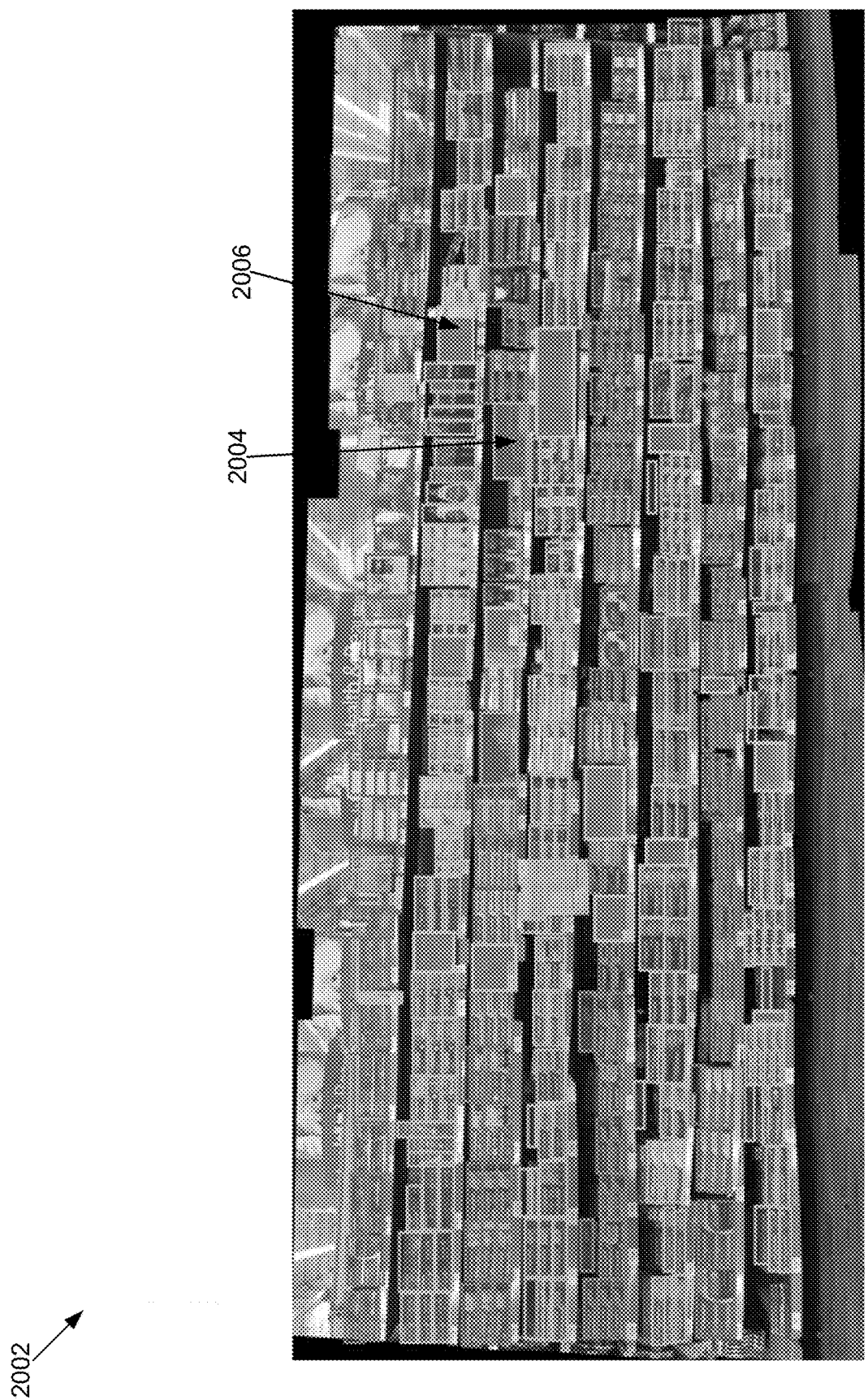
Figure 21:
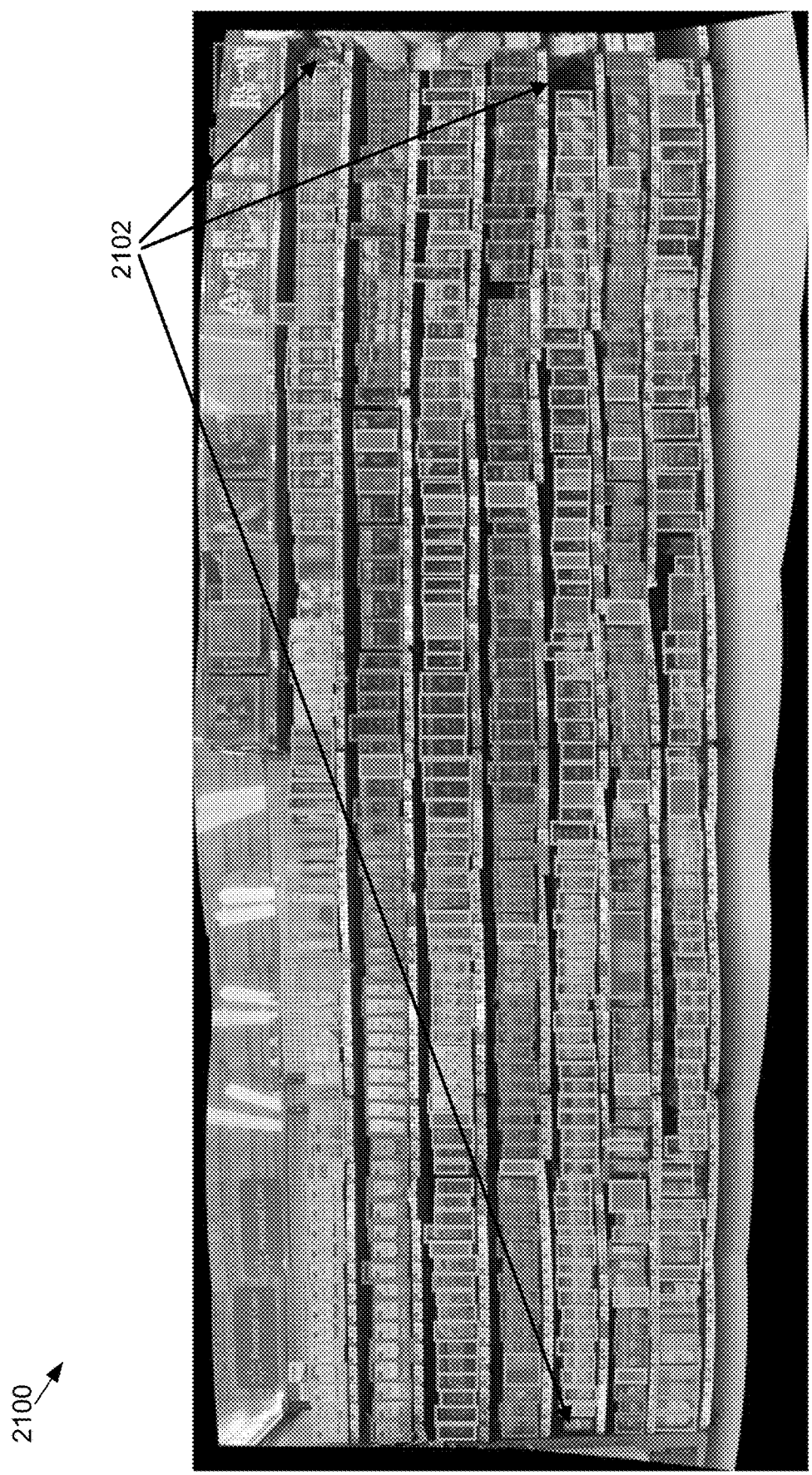

FIG. 20A is a graphical representation 2000 of a visualization showing gaps in an image. FIG. 20A includes a product shelf with indicators 2003 and 2005 around linear groupings of recognized products and potential gaps 2001. Indicator 2003 is a blue indicator bracketing a product included as part of a linear grouping, the linear grouping all including blue brackets around the products. Indicator 2005 is an orange indicator bracketing around a product included as part of a different linear grouping from the indicator 2003. The different linear grouping may be alternating colors as shown by indicators 2003 and 2005. Indicator 2001 is a red bracket around a portion of the image that was not recognized as a product. FIG. 20B is a graphical representation 2002 of the shelf from FIG. 20A after the gap detector module 217 has performed further processing. In FIG. 20B, the gaps have been processed to determine which gaps include a potential product (highlighted in pink with an indicator 2004) and which gaps are holes (highlighted in yellow with a different indicator 2006). FIG. 21 is a graphical representation 2100 of the visualization showing gaps 2102 that were not able to be determined by the gap detector module 217 along the edges of the image.

Figure 22A:
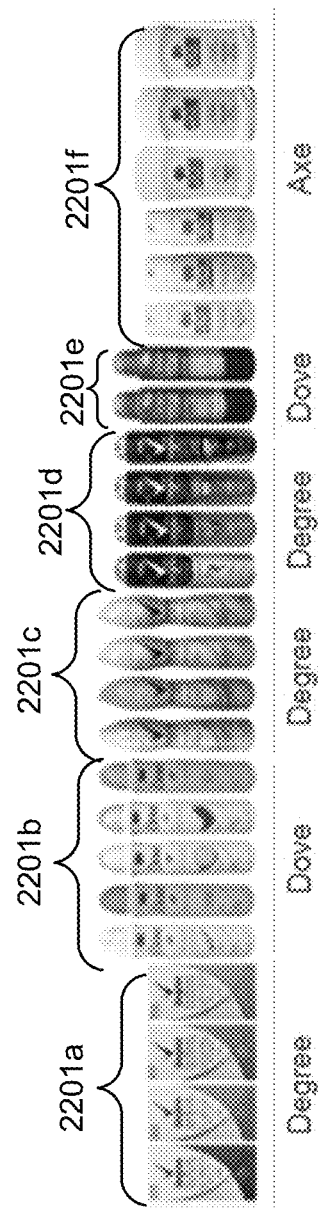
FIGS. 22A-22D are block diagrams showing example graphical representations of brand chunking.
Figure 22B:
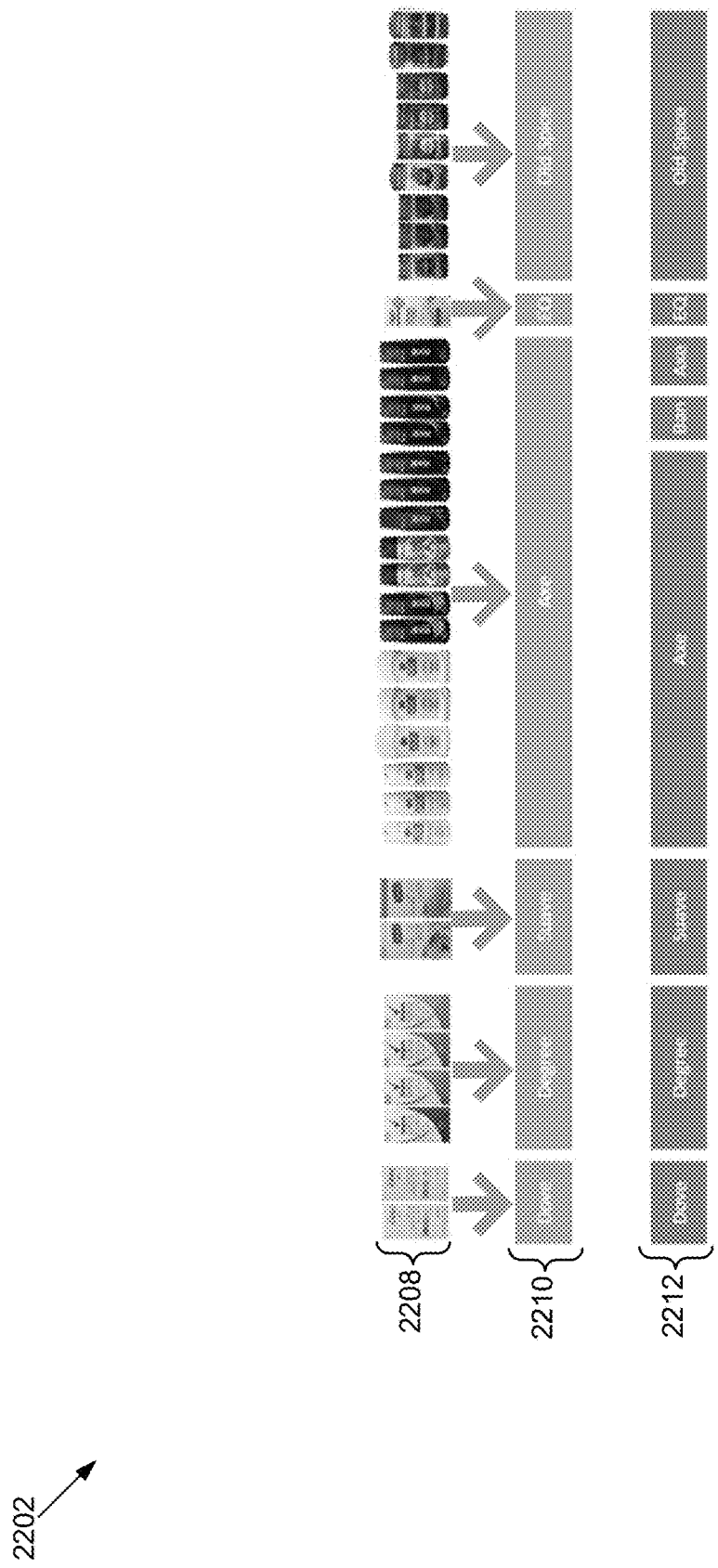
Figure 22C:
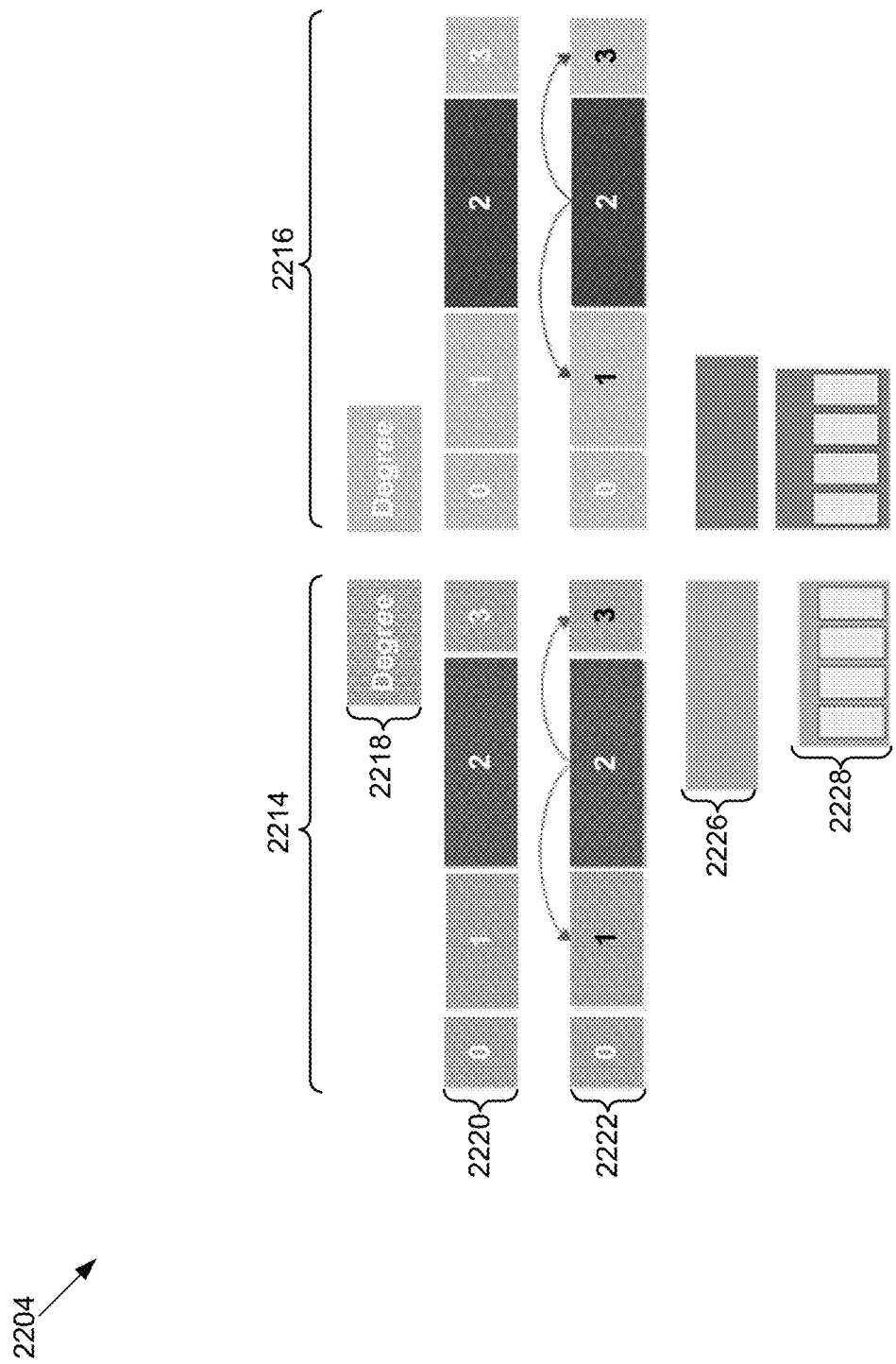
Figure 22D:
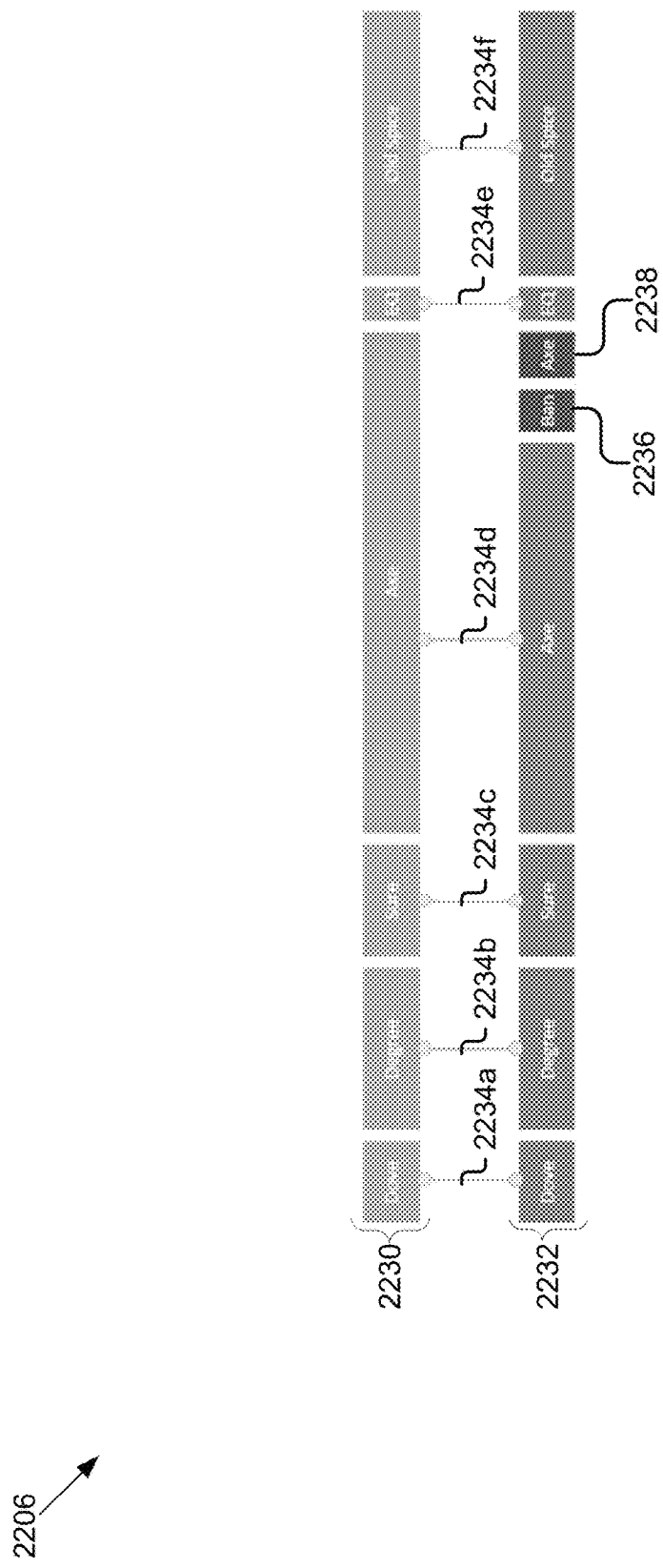

FIG. 22A is a block diagram 2200 showing an example of brand chunking. FIG. 22A displays different groups 2201 of products that are grouped by brand. Group 1 2201*a* represents a type of Degree brand products. Group 2 2201*b* represents a type of Dove brand products. Group 3 2201*c* represents a different type of Degree brand products. Group 4 2201*d* represents a different type of Degree brand products. Group 5 2201*e* represents a different type of Dove brand products. Group 6 2201*f* represents a type of AXE brand products. The analytics module 221 may process the image of the shelf and identify different brand chunks based on the brands. In some embodiments, the analytics module 221 may use the brand chunks to divide an image or a linear group based on the brand chunks. FIG. 22B is a block diagram 2202 showing the association between the planogram facings 2208, the brand chunks 2212 identified in the image/realogram and their correspondence to brand chunks 2210 in the planogram. The analytics module 221 may process a planogram to determine planogram facings and extract from the planogram facings, brand chunks. The analytics module 221 may compare the brand chunks of the planogram and image to determine if corresponding chunks match brands. Then the analytics module 221 may process an image to determine facings of the image and convert the facings into brand chunks. The analytics module 221 may then be able to compare the brand chunks of the planogram with the brand chunks of the image based on the index positions of each chunk to determine differences. FIG. 22C is a block diagram 2204 of a side-by-side comparison by the analytics module 221 of brand chunks from a planogram 2214 compared to brand chunks of an image 2216. The analytics module 221 may compare different brand chunks 2218, for example a brank chunk related to Degree products, as well as neighboring brand chunks to identify differences. An index 2220 of the brand chunk on the planogram 2214 and image 2216 may be used to identify different brand chunks. For example, the index 2220 value "2" may be related to a Degree brand chunk. The analytics module 221 may determine neighbors 2222 using the index 2220. The analytics module 221 may also determine an aspect ratio 2226 of each brand chunk and each compared brand chunk should be similar between a planogram and an image. The analytics module 221 may also determine the number of facings 2228 within each brand chunk and compare the number of facings. FIG. 22D is a block diagram 2206 of brand chunks. The analytics module 221 may determine chunks of the image 2232 that are not connected to corresponding chunks of the planogram 2230. A connector 2234 may connect matching chunks between the image 2232 and the planogram 2230. Unconnected products 2236 and 2238 are brand chunks in the image 2232 that do not match a brand chunk in the planogram 2230. Unconnected chunks may be areas where corrective actions may be implemented. The brand chunks may also be used for a share of shelf computation.

Figure 23A:
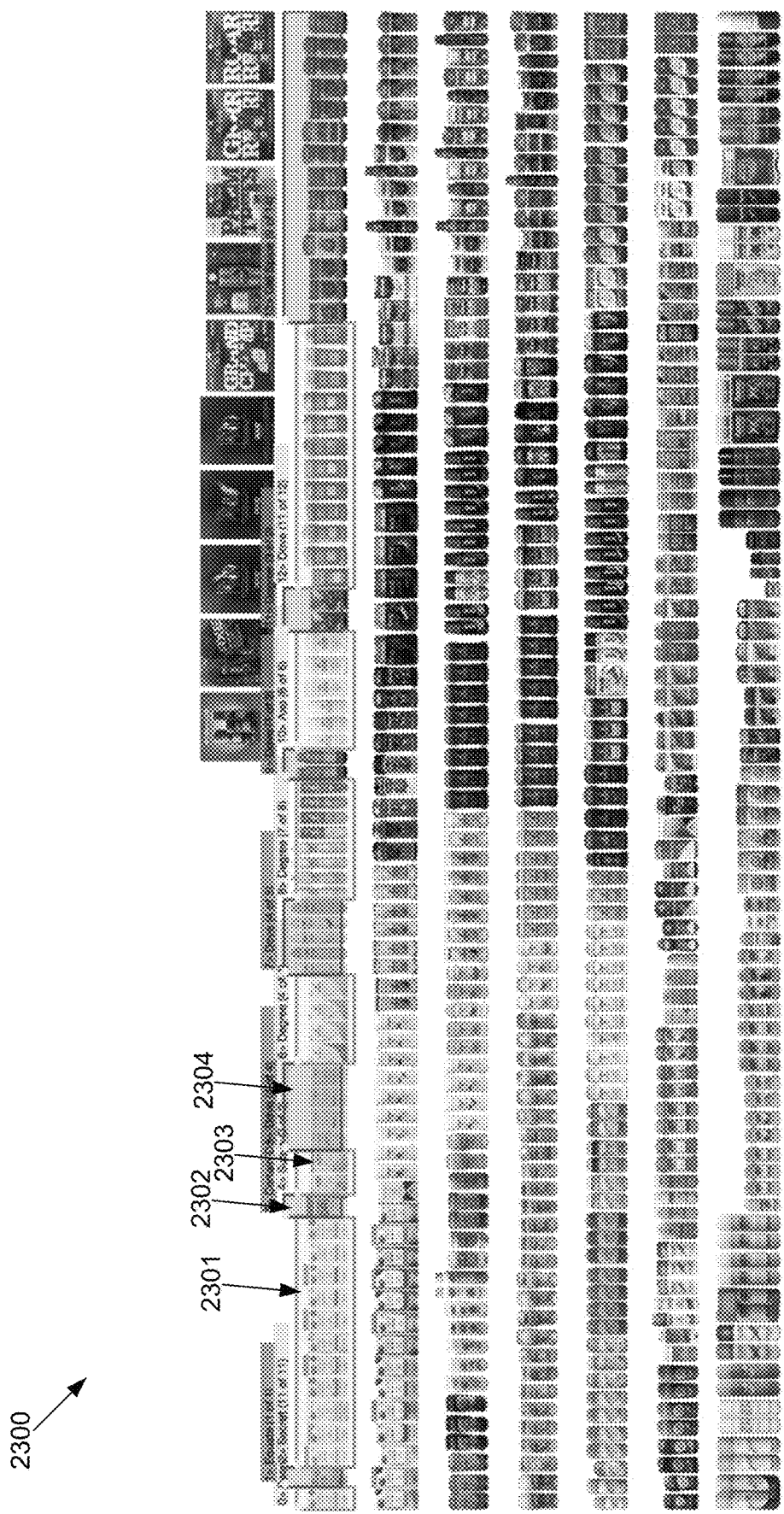
FIGS. 23A-23B are graphical representations of examples of linear groupings.
Figure 23B:
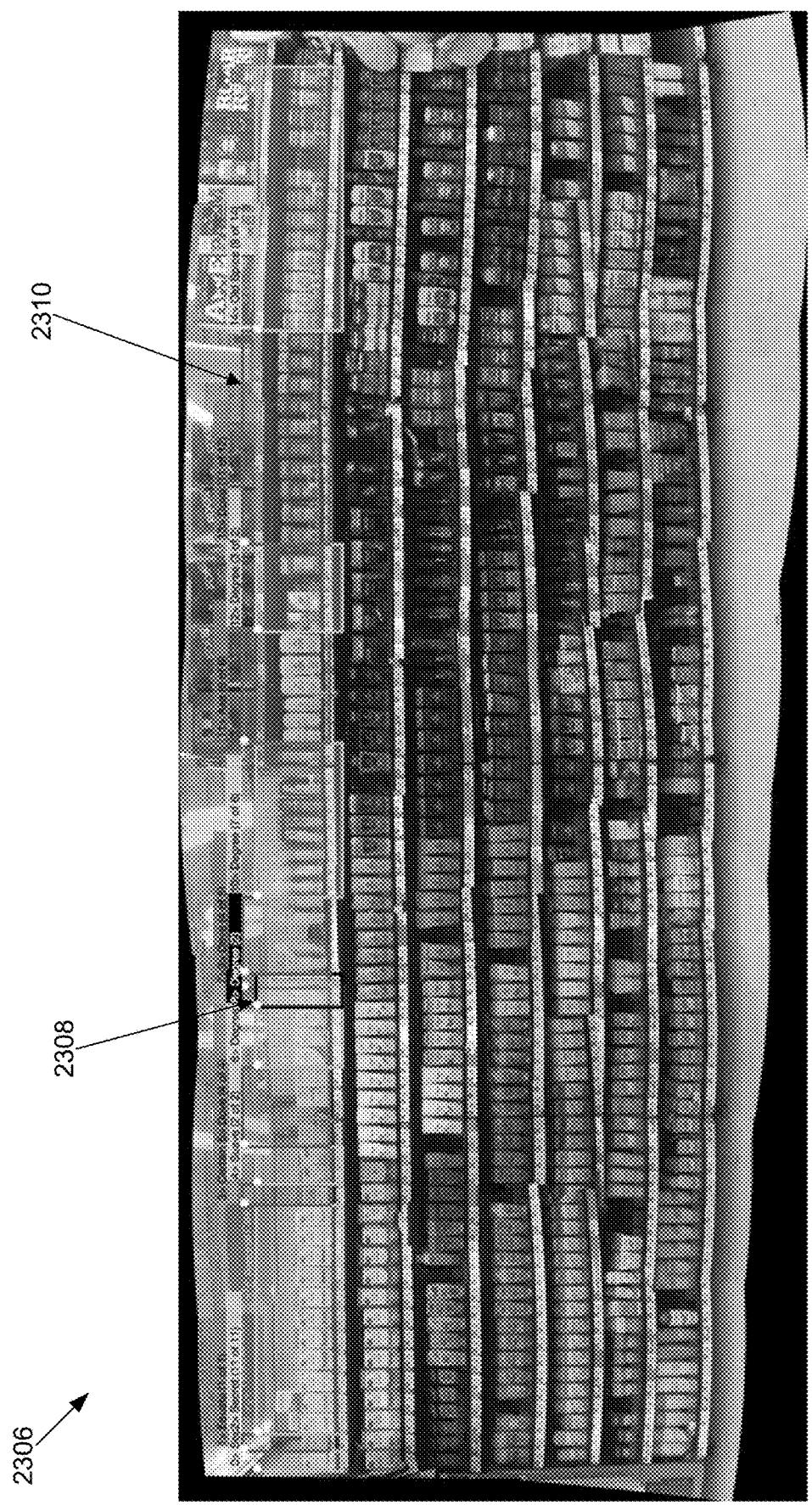

FIG. 23A is a graphical representation 2300 of a planogram with brand chunking. The planogram includes brand chunk(s) 2301, 2302, 2303, and 2304 of a linear grouping. Brand chunks 2301 and 2303 are green brand chunks; however, 2301 represents a different brand than 2303 even though both brand chunks are the same color. Brand chunks 2302 and 2304 are red brand chunks; however, 2302 represents a different brand than 2304 even though both brand chunks are the same color. In some embodiments, the brand chunks may also indicate the amount of products in the brand chunk that matched to product in the image brand chunk. The brand chunks may be displayed as alternating color to differentiate brand chunks. FIG. 23B is a graphical representation 2306 of a corresponding realogram image to which the planogram in FIG. 23A relates. The analytics module 221 may compare brand chunks in the image to the planogram and display indicators on the image where the brand chunks do not match. Indicator 2308 is an indicator where the image does not align with the planogram brand chunk. Indicator 2310 indicates that the realogram brand chunk has a valid planogram chunk partner. In some embodiments, the indicator 2310 may be a color indicating that the image brand chunk matches to a planogram brand chunk.

Figure 24A:
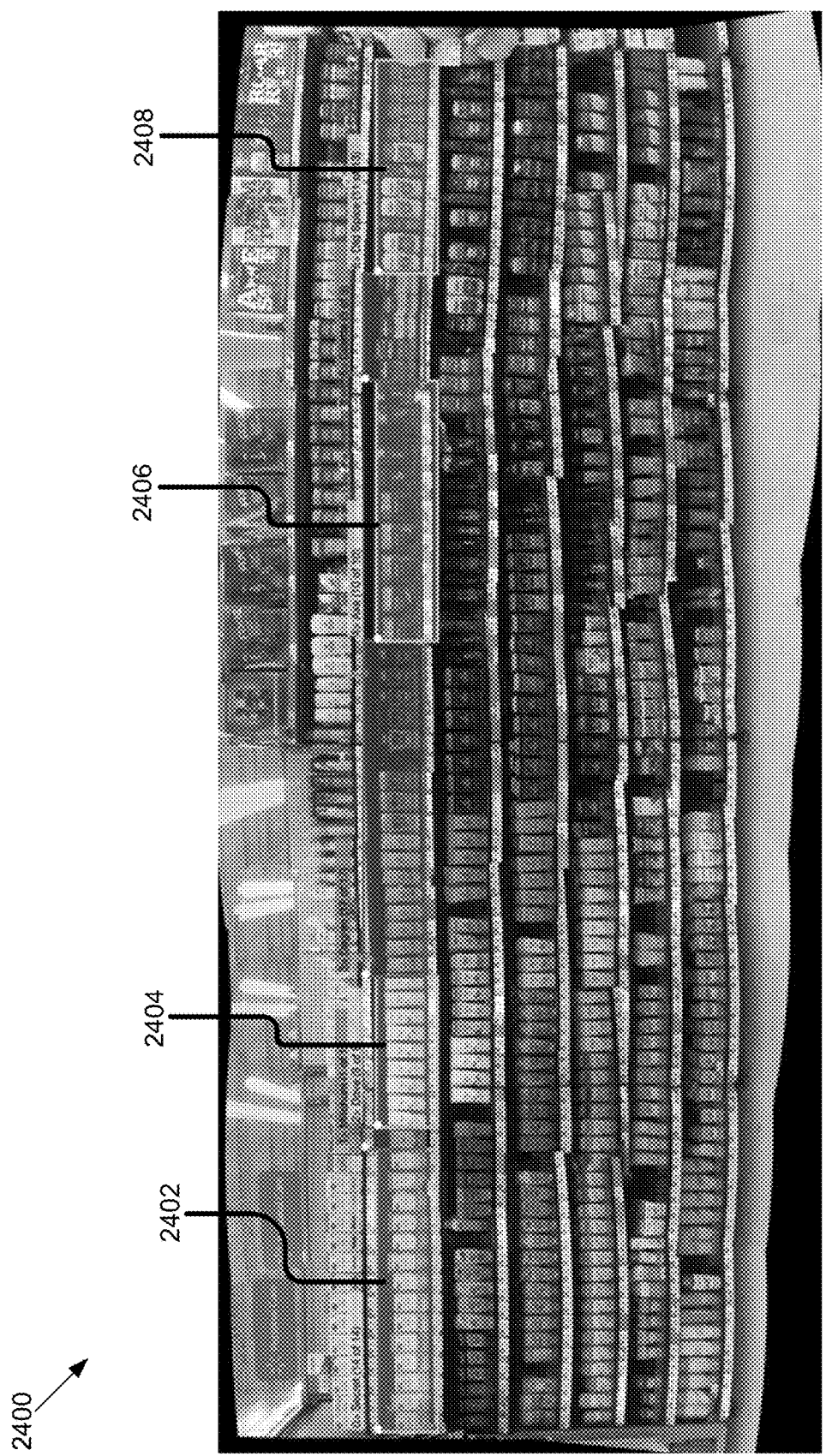
FIGS. 24A-24E are graphical representations of examples of linear grouping matching.
Figure 24B:
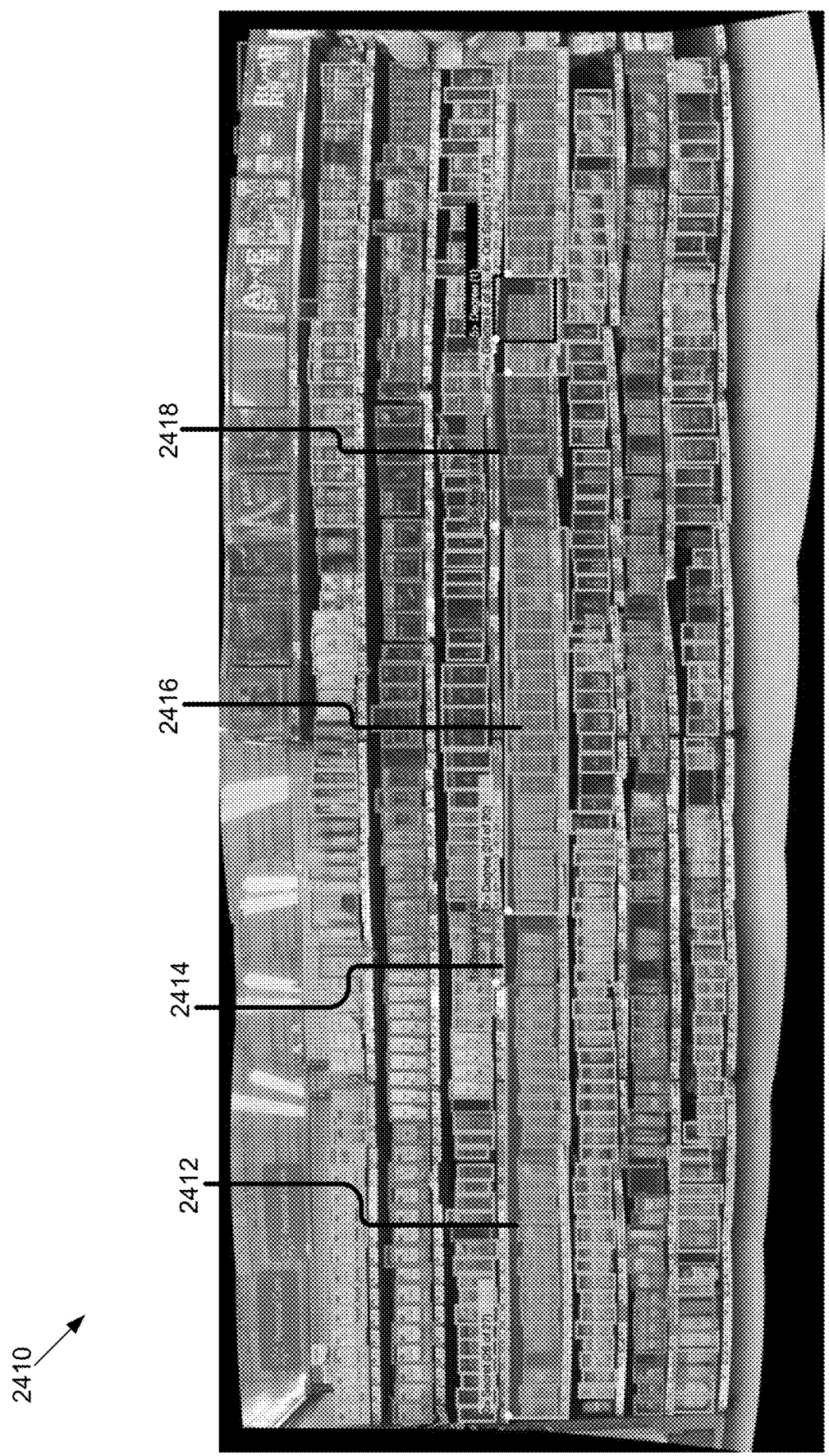
Figure 24C:
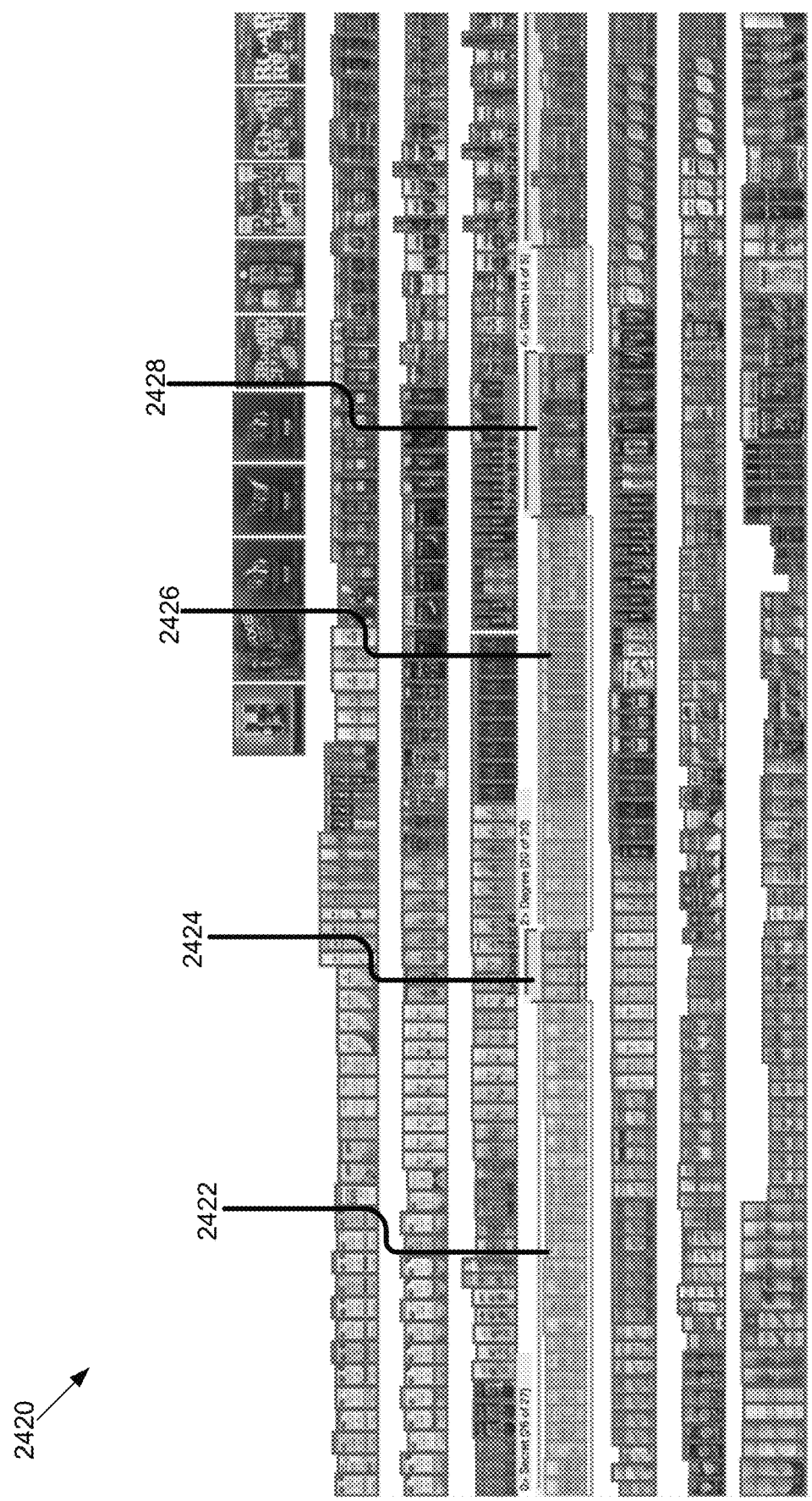
Figure 24D:
Figure 24E:
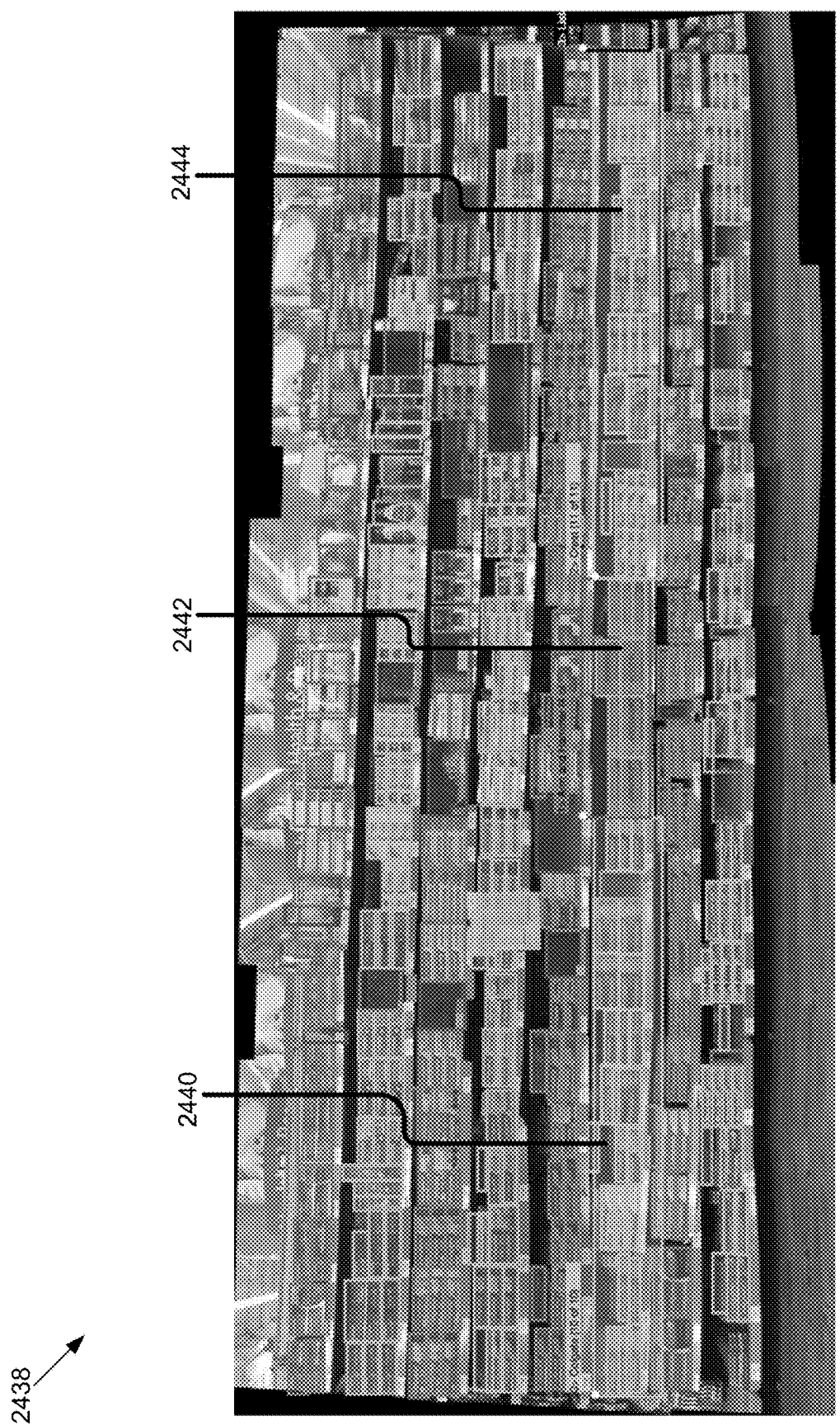

FIG. 24A is a graphical representation 2400 of an image with recognized brand chunks. Brand chunks Secret 2402, Dove 2404, AXE 2406, and Old Spice 2408 relate to different brands that the analytics module 221 detected in linear groupings. FIG. 24B is a graphical representation 2410 of an image with recognition results displayed. The analytics module 221 may display linear groupings, brand chunks, and recognized products all on the same image. The analytics module 221 may display the brand chunks by labeling the brand chunks with an indicator 2412, 2414, 2416, or 2418 of the brands the brand chunks represent. Indicator 2412 represents the secret brand, showing that 26 of the 27 products were recognized and the linear grouping is highlighted in turquoise. Indicator 2414 represents the Dove brand, showing that 4 of the 4 products were recognized and the linear grouping is highlighted in purple. Indicator 2416 represents the Degree brand, showing that 20 of the 20 products were recognized and the linear grouping is highlighted in purple. Indicator 2418 represents the AXE brand, showing that 8 of the 8 products were recognized and the linear grouping is highlighted in purple. FIG. 24C is a graphical representation 2420 of a planogram with brand chunks and other indicators. The brand chunks include indicators 2422, 2424, 2426, and 2428 on the planogram may include an indicator of the brand the brand chunk represents or alternatively different colors or other indicators. Indicator 2422 represents the secret brand, showing that 26 of the 27 products were recognized and the linear grouping is highlighted in green. Indicator 2424 represents the Dove brand, showing that 4 of the 4 products were recognized and the linear grouping is highlighted in red. Indicator 2426 represents the Degree brand, showing that 20 of the 20 products were recognized and the linear grouping is highlighted in green. Indicator 2418 represents the AXE brand, showing that 8 of the 8 products were recognized and the linear grouping is highlighted in red. FIG. 24D is a graphical representation 2430 of a planogram with brand chunks as shown by indicators 2432, 2434, and 2436. Indicator 2432 represents a Colgate brand chunk and is highlighted in green. Indicator 2434 represents an arm and hammer brand chunk and is highlighted in red. Indicator 2436 represents a crest brand chunk and is highlighted in green. FIG. 24E is a graphical representation 2438 of a corresponding image related to the planogram shown in FIG. 24D with brand chunks displayed as shown by indicators 2440, 2442, and 2444. Indicator 2440 represents a Colgate brand chunk and is highlighted in orange. Indicator 2442 represents an arm and hammer brand chunk and is highlighted in red. Indicator 2444 represents a crest brand chunk and is highlighted in orange.

Figure 25A:
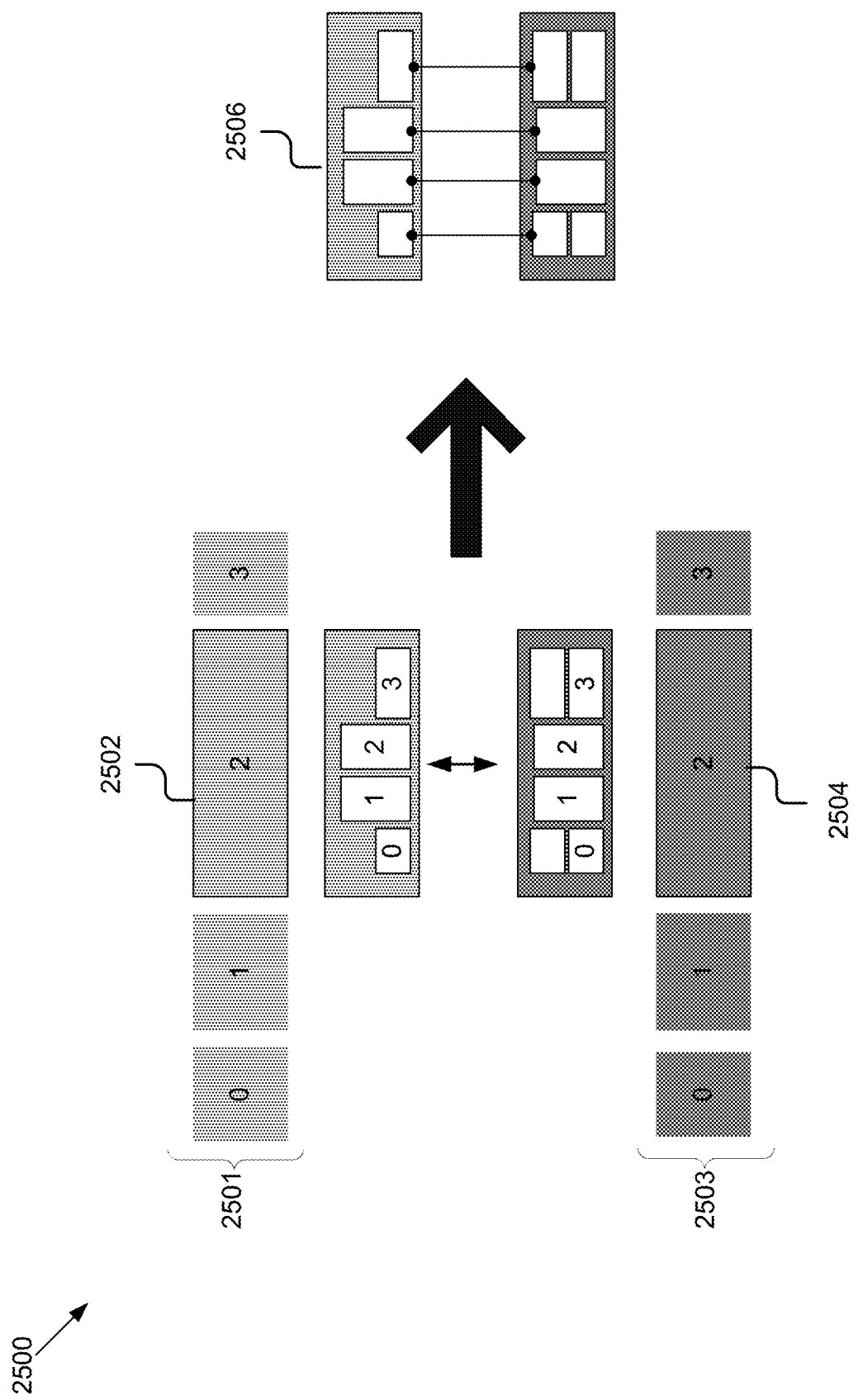
FIGS. 25A-25B are example block diagrams of aligning product facing chunks.

FIG. 25A is a block diagram 2500 of the process for aligning product facings. The analytics module 221 connects planogram facings 2502 from planogram chunks 2501 with image facings 2504 from image chunks 2503 by comparing the facings and determining matches with corresponding facings. The facings subdivide linear groupings into smaller parts, making it easier for the analytics module 221 to perform alignment of the image facings with the planogram. If the analytics module 221 aligns the facings successfully, then the final result of the alignment may be used to generate corrective actions for each linear grouping. The analytics module 221 may use a best fit algorithm to establish a connection from the planogram to the image facings. Connections 2506 show the products from the image facings 2504 and the products from the planogram facings 2503 with connecting lines between the facings that included corresponding matches. The comparison by the analytics module 221 may produce a list of candidate connections for each planogram facing and connect the top candidates to the image product facing.

Figure 25B:
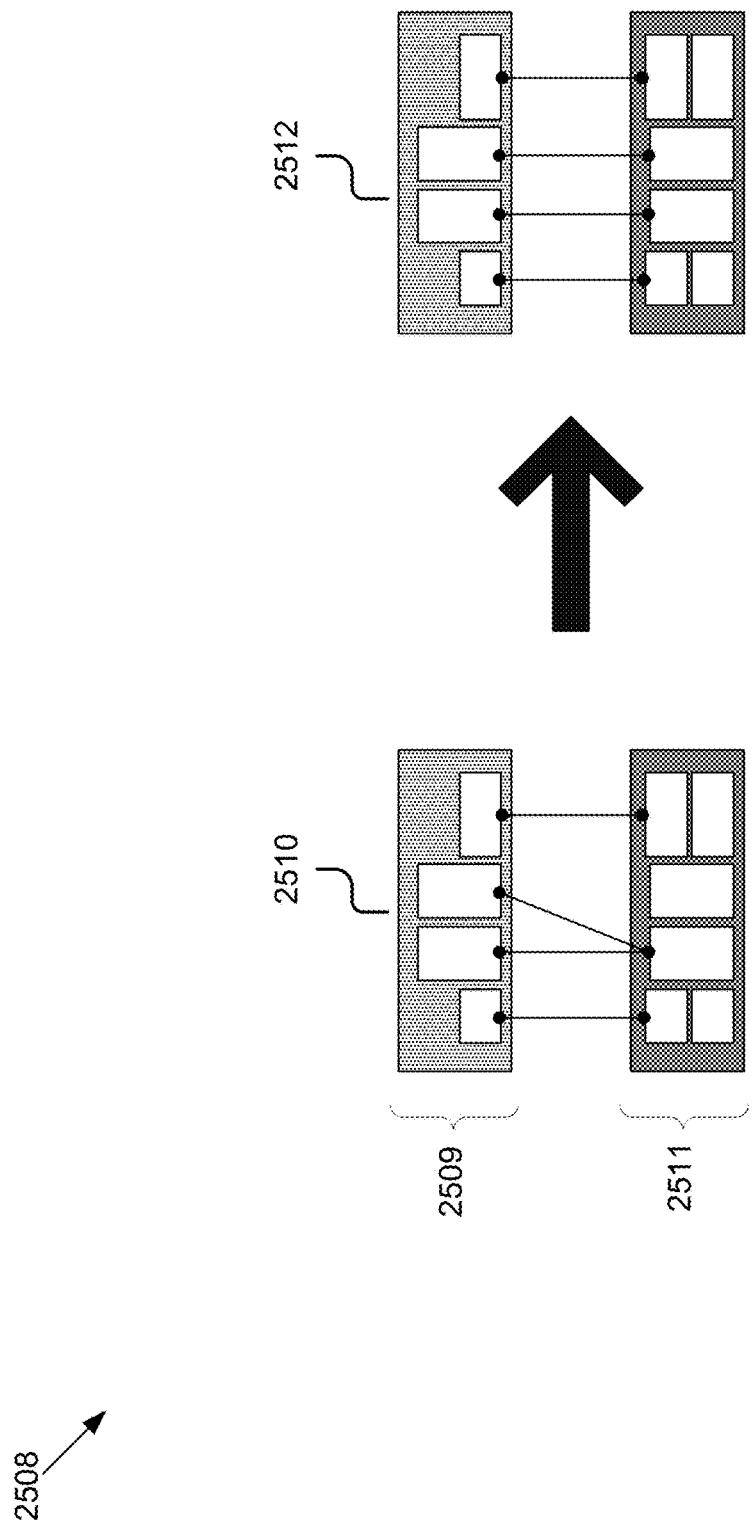

FIG. 25B is a block diagram 2508 of the process for connecting product facings and resolving collisions. The analytics module 221 during alignment may identify two or more product facings in a planogram chunk 2509 that connect with a single image facing 2510. The analytics module 221 may then compare the planogram chunk 2509 to an image chunk 2511. The analytics module 221 may then determine a best match based on a connection score and disconnect all but the highest scoring planogram facing (i.e. there should be a one-to-one relationship between planogram and image facings.) The analytics module 221 may then run the connection algorithm again allowing only unconnected planogram facings to be compared to unconnected image facings and creating a corrected matching 2512, where all of the product facings in the image are connected to a single product facing in the planogram.

In some embodiments, the analytics module 221 may perform a conflict resolution in cases where multiple connections point to the same image product facing. In some embodiments, the analytics module 221 may use a best fit comparison that includes matching a symbolic identifier in a top candidate position or in a candidate list (where the list is weighted so a top candidate match is better than a candidate match.) The best fit comparison may also include an aspect ratio test, where a match is indicated when shape of the product facings are similar. The best fit comparison may also include an index position test where a match is indicated when an image facing is in a similar position to a corresponding planogram facing in a planogram facing. The best fit comparison may include a neighbors test, where the comparison uses information from the planogram to determine which products are expected to border a current product under evaluation. In some embodiments, as part of the conflict resolution step, the analytics module 221 may try to align gaps that the gap detector module 217 identified as potential products with planogram product facings.

Figure 26A:
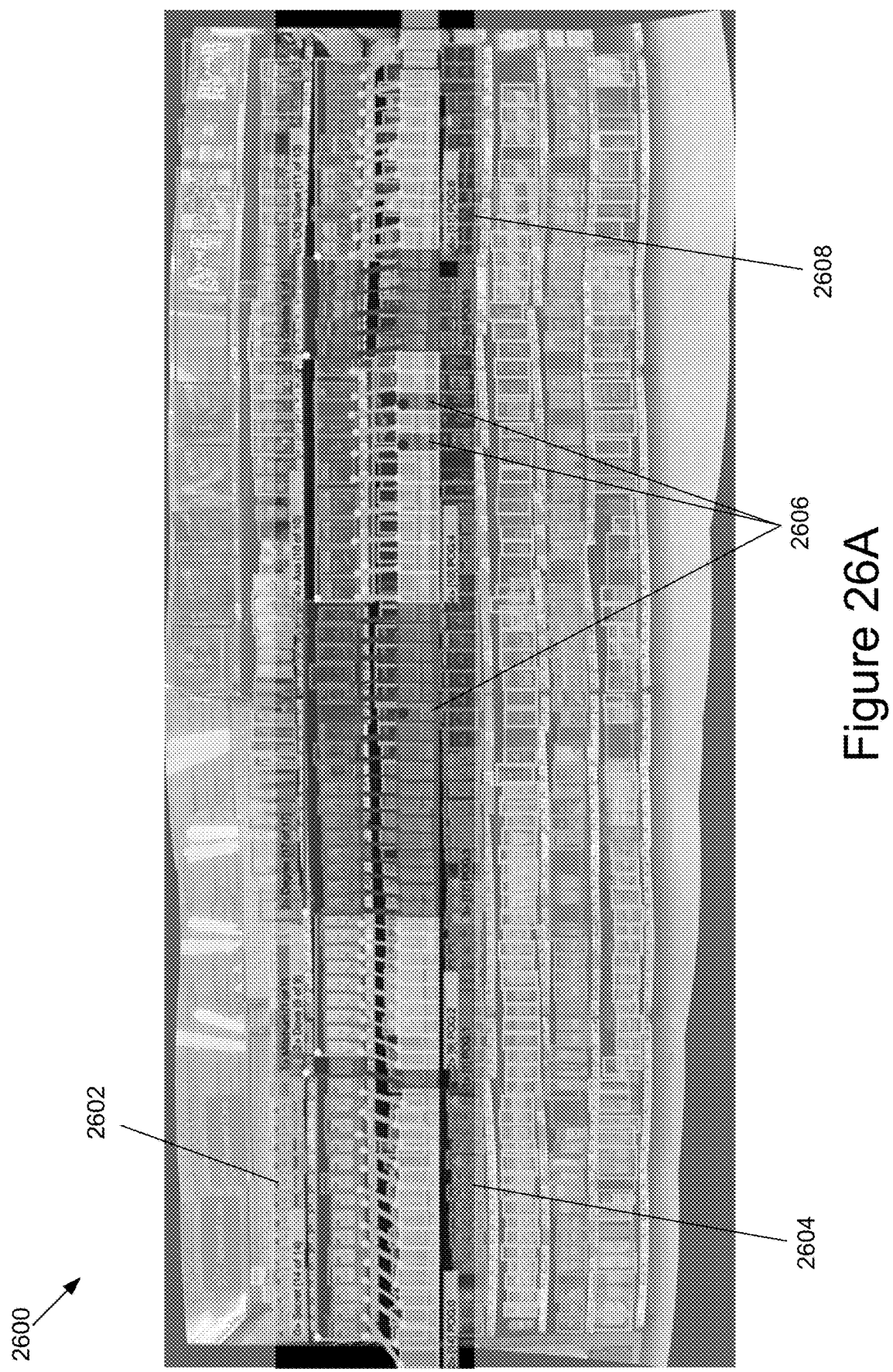
FIGS. 26A-26D are graphical representations of examples of connecting image results with a planogram.

FIG. 26A is a graphical representation 2600 showing a connected image showing relationships between image/realogram facings and planogram facings. An image of a product shelf displays linear grouping facings with connected planogram facings 2602. The connection visualization shows the relationship between the image facings and the planogram facings. In some embodiments, line width of the connections reflects the strength of the connection. The rectangle below the connection 2604 represents the planogram product facings that the products in the linear grouping facings of the image correspond. In some embodiments, an indicator 2606 may be used to indicate if an inferred planogram connection was detected. The indicator 2606 may be different colors to differentiate between brand chunks. In some embodiments, indicators may be included that show no connection, the indicators may be specific colors, or alternatively may display both the planogram facing and the image facing, but not include a connector between unmatched facings. In some embodiments, a number 2608 may be included that represents how many planogram items connect with the image items. In FIG. 26A, facing 2608 displays data that eleven out of thirteen of the facings of the image correspond with the facings of the planogram.

Figure 26B:
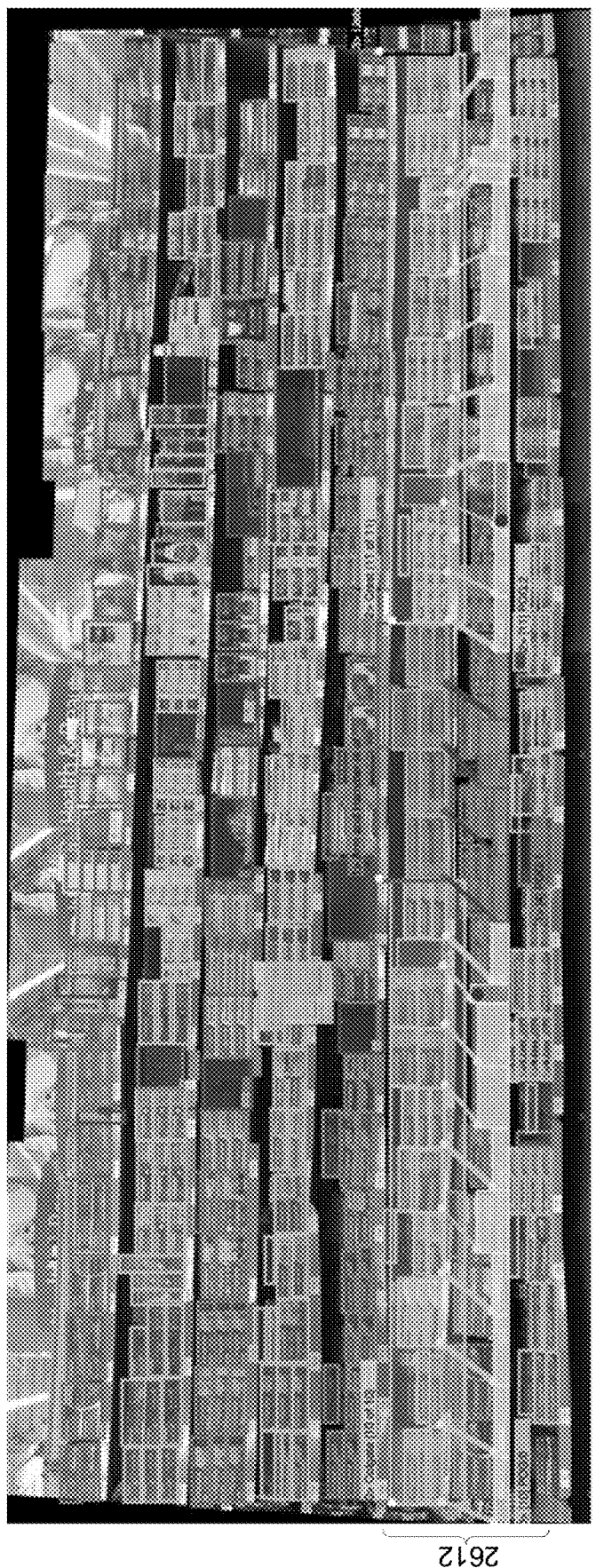
Figure 26C:
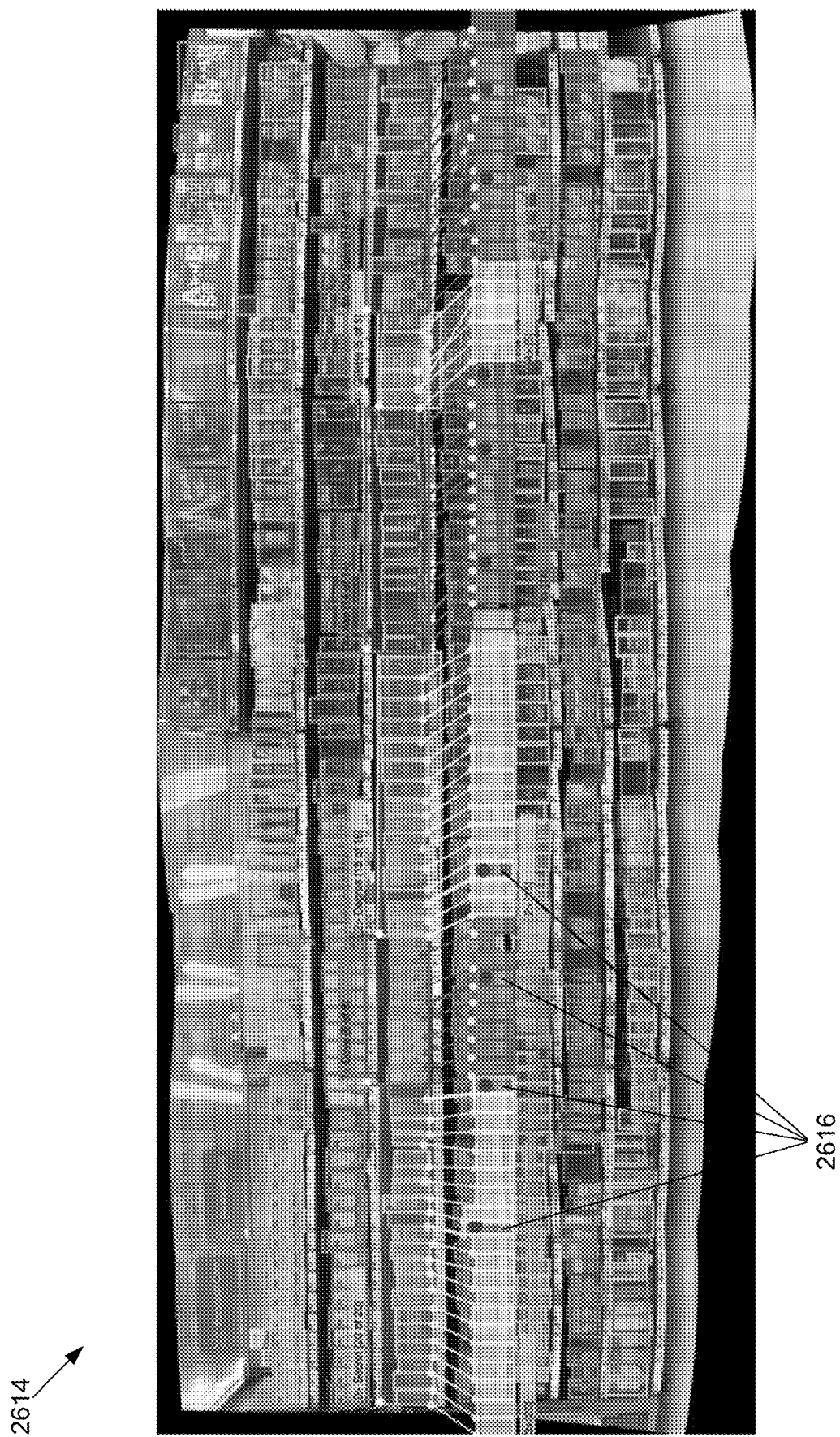
Figure 26D:
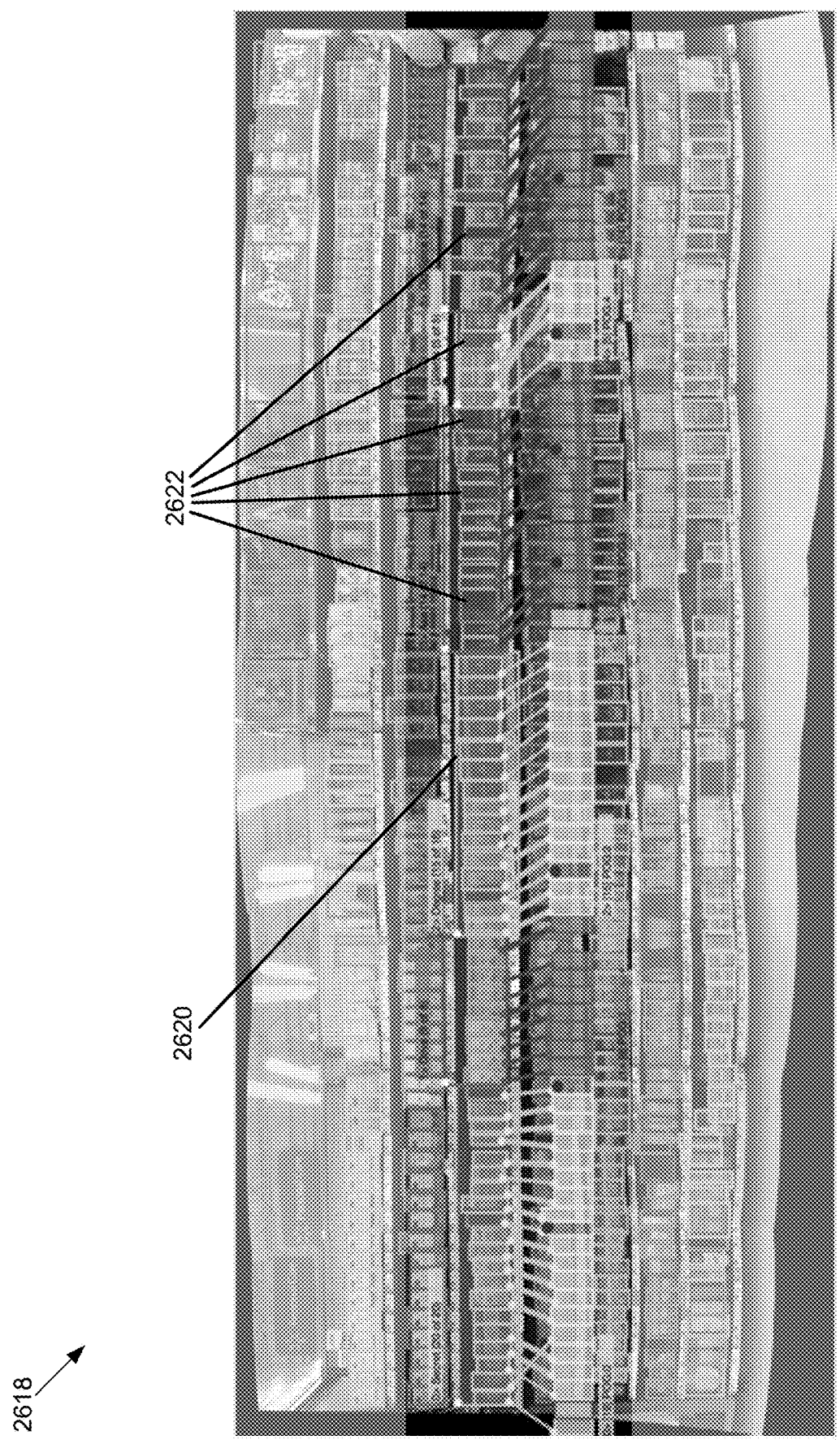

FIG. 26B is a graphical representation 2610 of another image with planogram connections 2612. The planogram connections 2612 are connected where a product of an image in the image linear grouping corresponds with a planogram facing. In some embodiments, the connections may be different colors to identify different linear groupings. FIG. 26C is a graphical representation 2614 of connections in an image. In some embodiments, the analytics module 221 may align detected gaps with planogram product facings. The connectors 2616 are green, indicating a connection between a planogram item and an image gap. In some embodiments, the connectors may be green if a gap was matched to a corresponding product in the planogram. In some embodiments, different colors or other indicators may be used to indicate that a gap was matched to a corresponding product in the planogram. FIG. 26D is a graphical representation 2618 of assigning planogram product facings to missing gaps. The indicator 2620 highlights products in the linear grouping of the image where all recognition results were incorrect including the candidates and the products were corrected during the product facing connection performed by the analytics module 221. Since products were contained in the region that was initially indicated as incorrect, the indicators 2620 are displayed as normal connections, rather than as inferred connections denoted by green boxes in the previous figures. Indicator 2622 is a red box indicating actual gaps (out-of-stock) assigned to the planogram facings.

Figure 27:
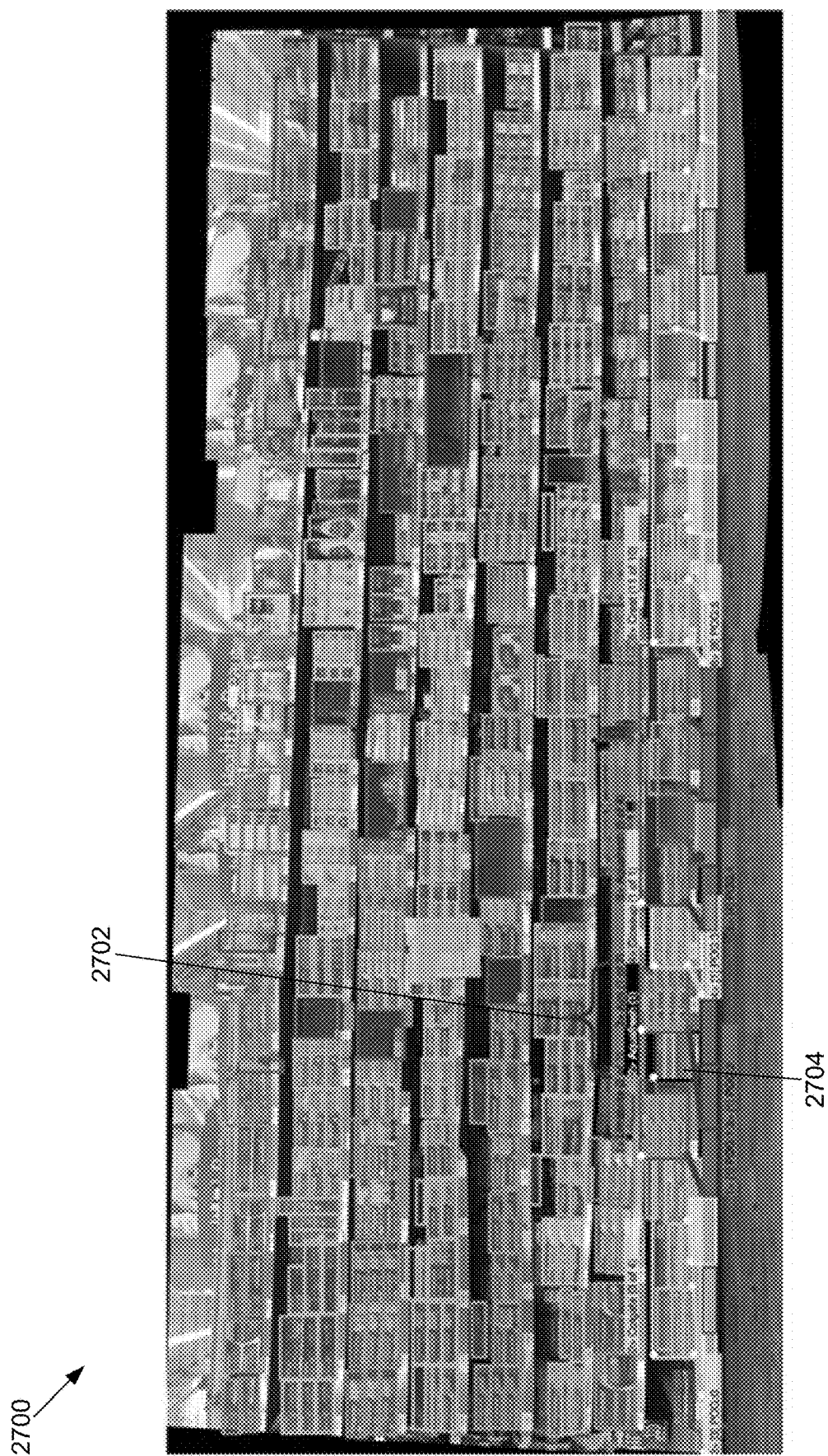
FIG. 27 is a graphical representation of an example of unconnected image result.

FIG. 27 is a graphical representation 2700 of an image with the identified products shown with callouts and showing an unconnected chunk. An unconnected facing 2702 is present in the image. The unconnected facing 2702 in some embodiments may also be an unconnected brand chunk. The unconnected facing 2702 did not have any corresponding facing in the planogram to which it could be connected. The corrective action module 215 may be able to determine based on this unconnected facing 2702 that an incorrect product 2704 was placed on that portion of the shelf. The corrective action module 215 may generate a corrective action for presentation to a user.

Figure 28A:
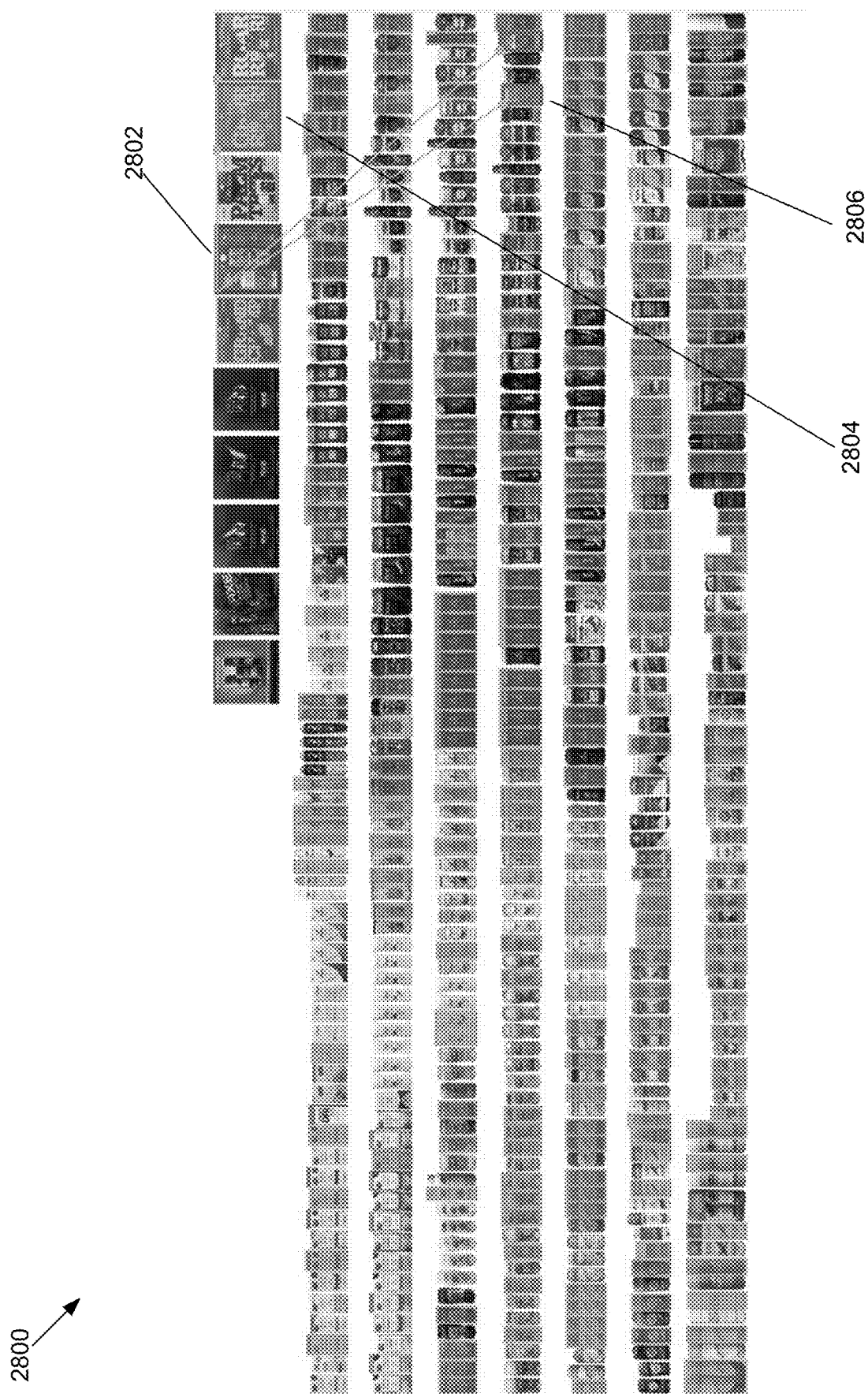
FIG. 28A-28B are graphical representations of examples of recognized products in linear groups.
Figure 28B:
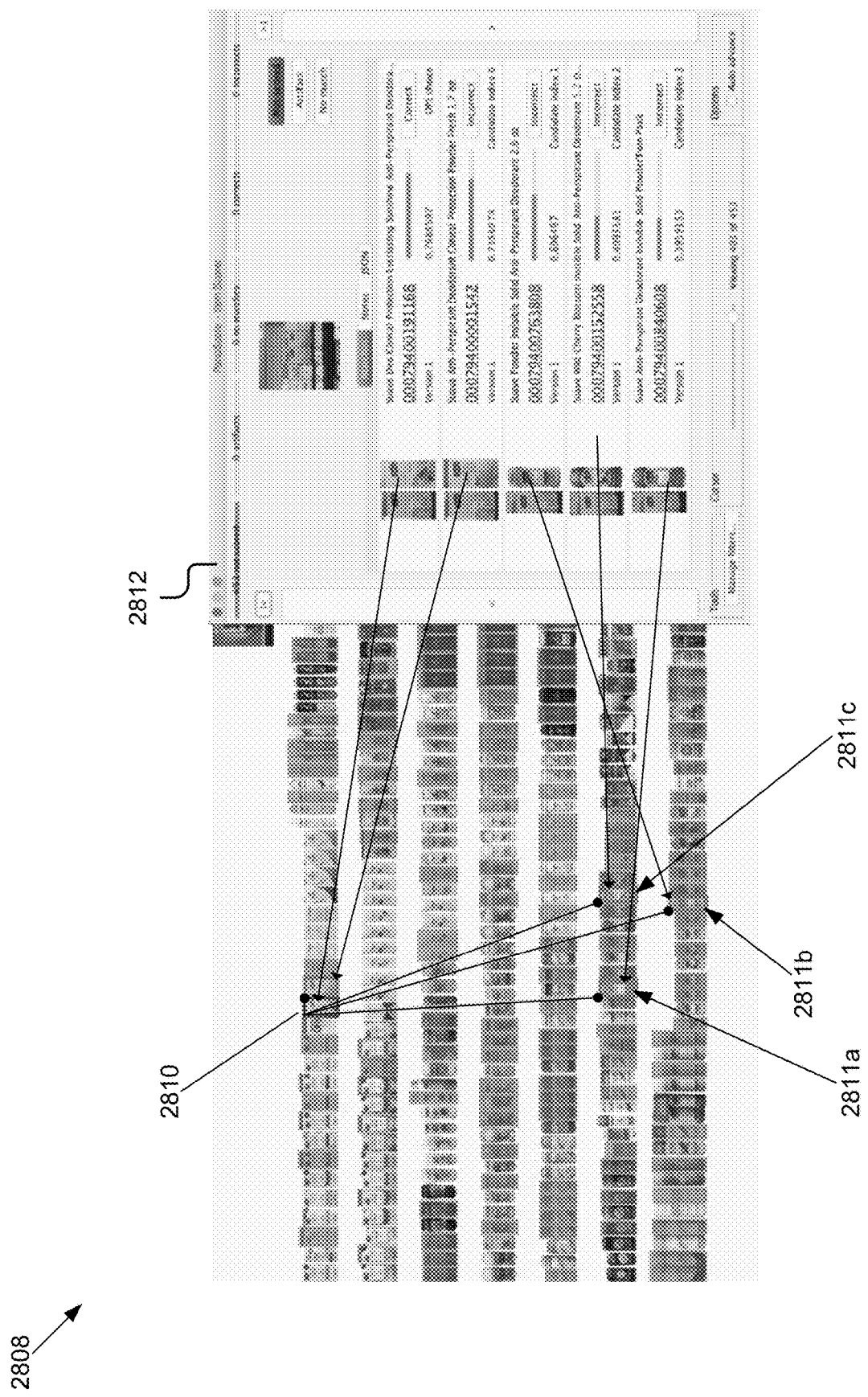

FIG. 28A is a graphical representation 2800 of a visualization showing recognition candidates spanning multiple linear groupings. The analytics module 221 may determine pruning candidates from image facings. The analytics module 221 may evaluate each recognition candidate list to determine where in the planogram each candidate 2802 is located. If the analytics module 221 determines the candidate product 2802 is located on a different shelf, then there is also a probability the candidate is invalid since it should not be presented on the shelf. If the analytics module 221 determines the candidate product 2802 is located on a different shelf, then there is also a probability the candidate is invalid, since the candidate product should not be present on the current shelf. The analytics module 221 uses this pruning process to remove candidates that do not exist in the current planogram and candidates, which occur outside the scope of the current linear grouping. A valid candidate 2804 may be a candidate from the same linear grouping. An invalid candidate 2806 may be a candidate from a different linear grouping. FIG. 28B is a graphical representation highlighting a candidate 2810 that may not be valid. A product recognition list 2812 with a recognition score for individual entries in the list may be used by the analytics module 221 to compare the candidate 2810 to each product of the product recognition list 2812. If the candidate 2810 matches the top candidates of the product recognition list 2812 then it is more likely to be valid, whereas if the candidate 2810 matches a product farther down the product recognition list 2812, the candidate 2810 is less likely to be valid. Products 2811 are examples of products included in the product recognition list 2812 that are not the candidate 2810 but were identified on the product recognition list 2812 as products farther down the list that are less likely to be the candidate 2810.

Figure 29A:
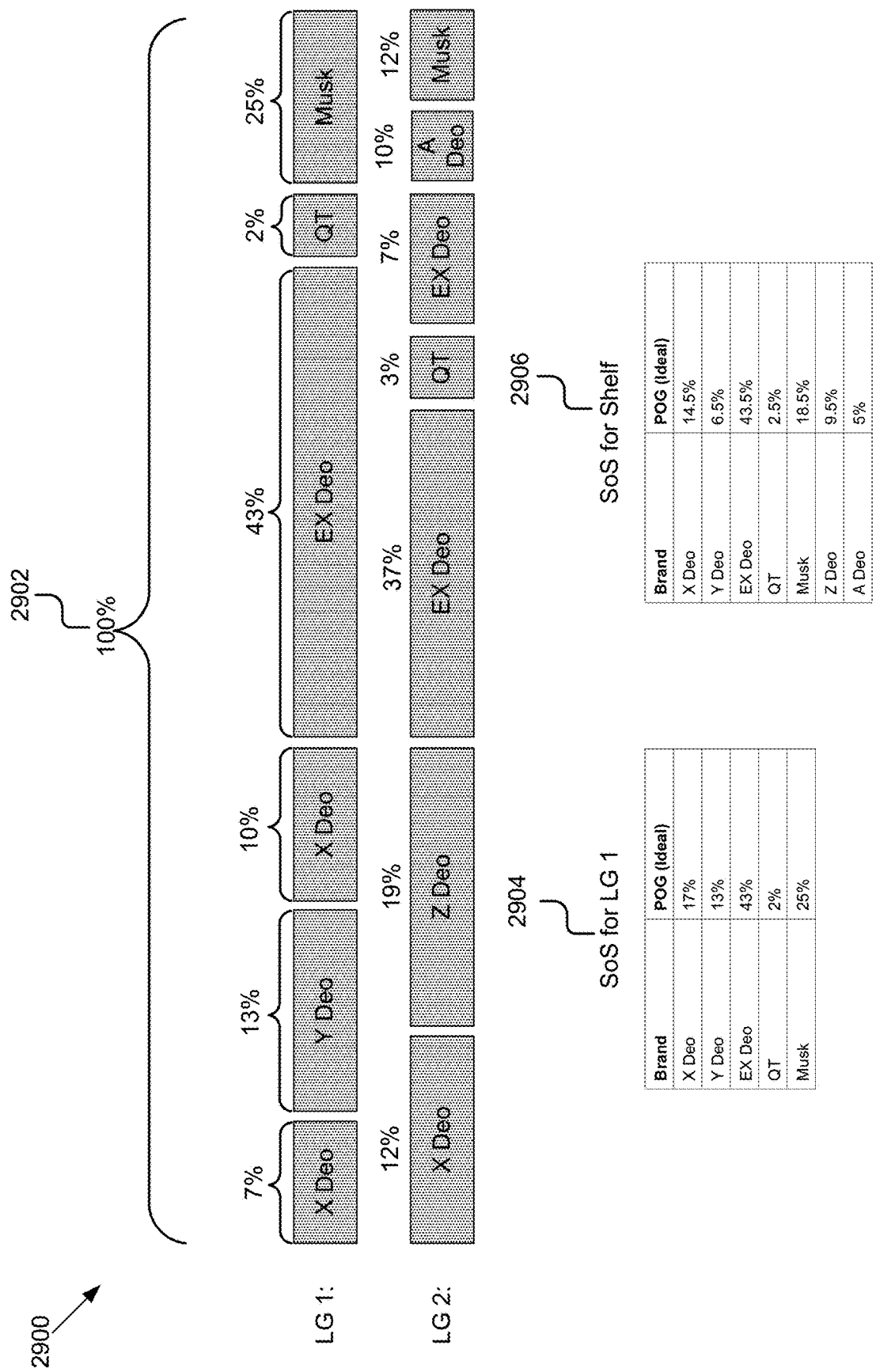

FIG. 29A is a block diagram 2900 showing analytics information about share of shelf data produced by the system of the present invention. A share of shelf data 2902 is an indicator used to compare how products compete with other products on the shelf. The share of shelf data 2902 is computed by accounting for the actual space the products take up on the shelf. The actual space the product takes up may be calculated based on processed linear groupings of shelf facings. Once a share of shelf data 2902 is computed, the percentages 2904 for each brand may be determined. The analytics information may include tables showing the percentage of share of shelf by brand for easy reference. FIG. 29B is a block diagram 2908 of an example share percentage based on brands. Brand chunking by the analytics module 221 automatically produces share of shelf values. The analytics module 221 may calculate a share of shelf value for both an image and a planogram and compare the share of shelf values to determine differences for corrective actions.

Figure 30:
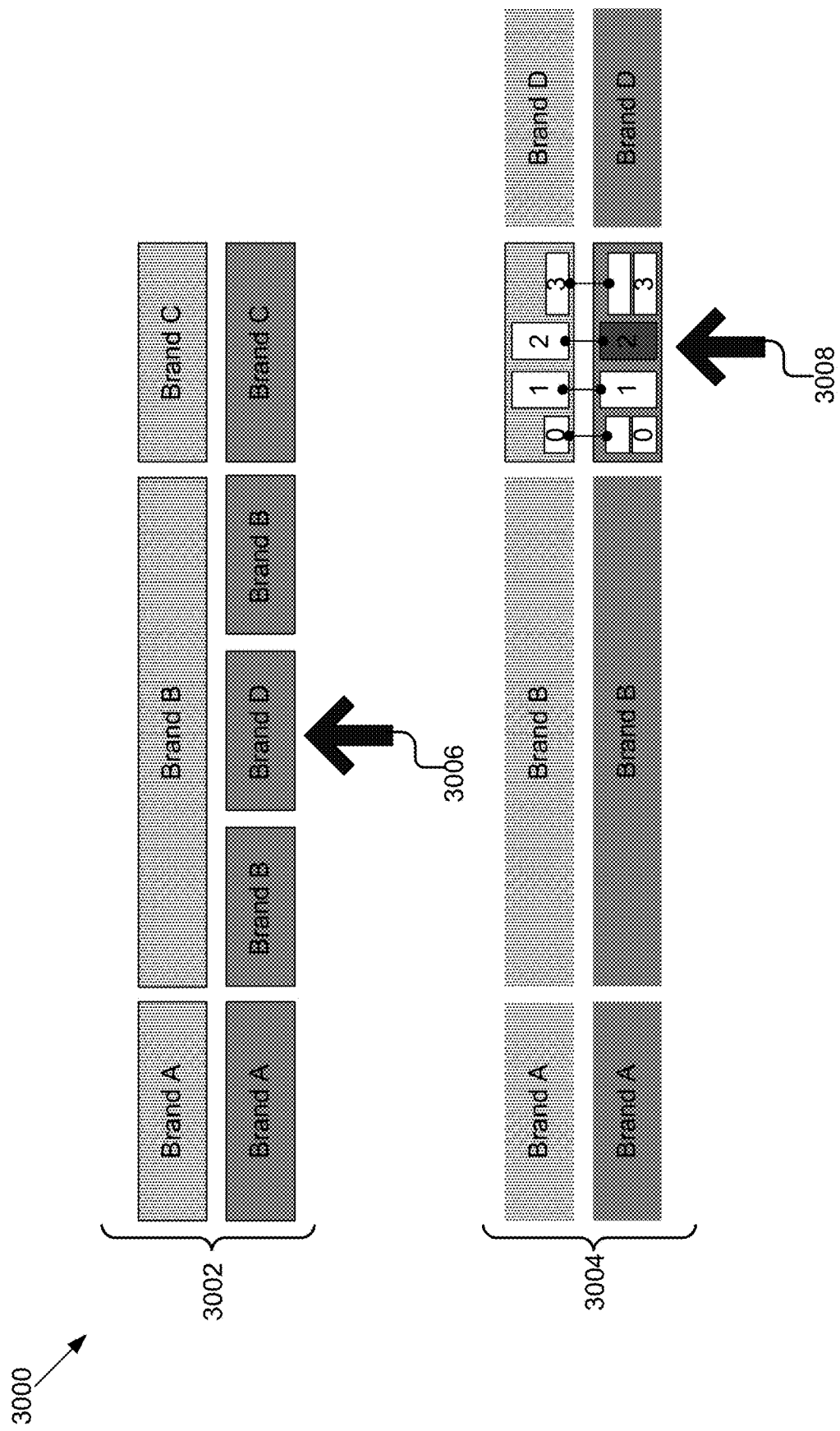
FIG. 30 is a block diagram of an example of a developed rule based on comparisons.

FIG. 30 is a block diagram 3000 of a developed rule based on comparisons. The corrective action module 215 may develop rules based on known data structures from comparisons of images and planograms. The rules may be developed for both chunk analysis and facing to facing analysis. Chunk rule 3002 may determine that a planogram shows brand chunks including brand A, brand B, and brand C. However, the image chunking 3006 also includes a brand D. The chunk rule 3002 may determine that a corrective action present with regards to chunk D. Facing rule 3004 may determine that a planogram shows a certain organization of facings including chunk 0, chunk 1, chunk 2, and chunk 3. However, the image facing 3008 includes additional chunks. The corrective action module 215 may determine that these additional chunks represent holes and a corrective action may be necessary.

Figure 31:
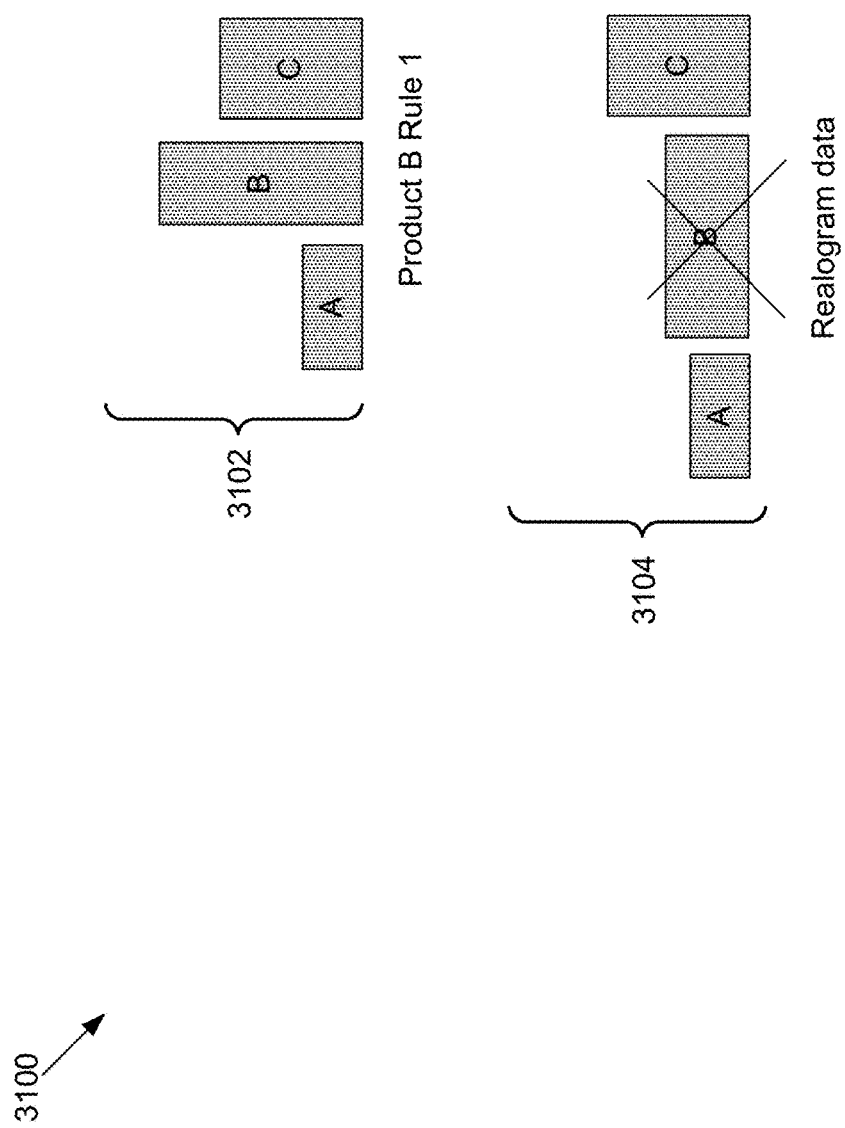
FIG. 31 is a block diagram of an example of a developed rule.

FIG. 31 is a block diagram 3100 of developed rules for products. The corrective action module 215 may define a set of heuristics to be used during a corrective action evaluation for objects. For example, Product B in the planogram 3102 is shown as being vertical in position. However, when compared to the image 3104, Product B is horizontal in position. If during the corrective action evaluation, a rule is present stating that Product B may never be horizontal, and it is determined that Product B is recognized and horizontal, a corrective action may be sent. This rule based system leverages rules assigned to the individual products. Thus, each product comes with a set of specific rules that only apply to that product and are leveraged by the corrective action module 215 using an algorithm that incorporates the specific rule when evaluating only that specific product. Thus, in the example, the rule about Product B being horizontal is part of the internal data structure composed around Product B.

Figure 32:
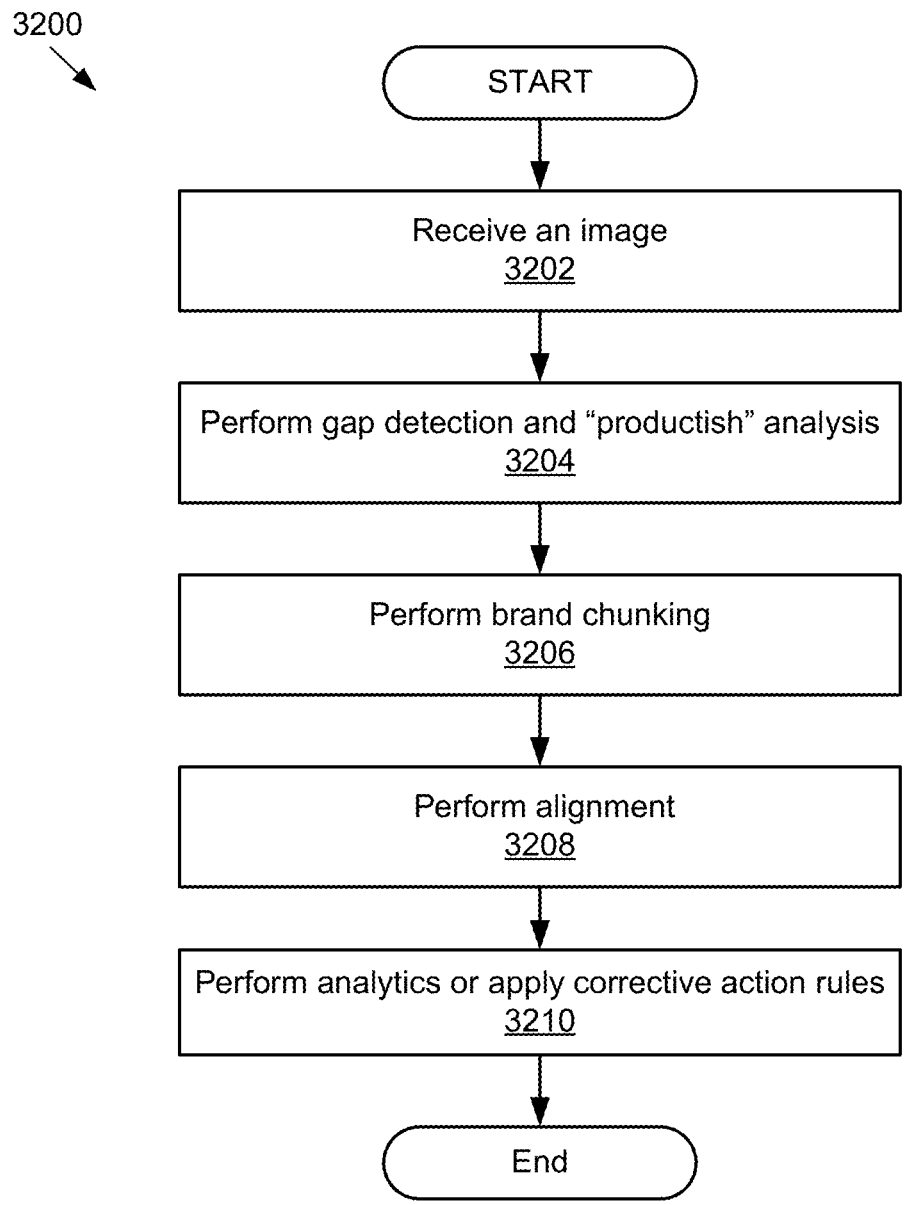
FIG. 32 is a flow diagram illustrating a third embodiment of the method for comparing an image to a planogram to generate a suggestion or corrective action.

FIG. 32 is a flow diagram another embodiment of a method 3200 for determining a corrective action from a realogram image. At 3202, the image recognition application 103 may receive an image. At 3204 the gap detector module 217 may perform gap detection and "productish" analysis. The "productish" analysis may be determining by the gap detector module 217 that a gap includes a potential product (e.g. there is a product in a location in a shelving unit, but the product was not recognized by image processing module 203) or a hole (i.e. an empty location in a shelving unit, a visible out-of-stock). In particular, "productish" analysis includes reviewing gaps and doing further analysis to determine the probability that the gaps may include an image of a product that cannot be definitively identified. At 3206, the analytics module 221 may perform brand chunking. At 3208, the alignment module 219 may perform an alignment between an image and a planogram. At 3210, the corrective action module 215 may perform analytics or apply corrective action rules. In some embodiments, the information produced by the alignment module 3208, aligning the planogram and image, may be used for stitching images, creating a recognition candidate list, determining corrective actions, generating ground truth data, or manual scoring of images and evaluation of planogram compliance.

Figure 33:
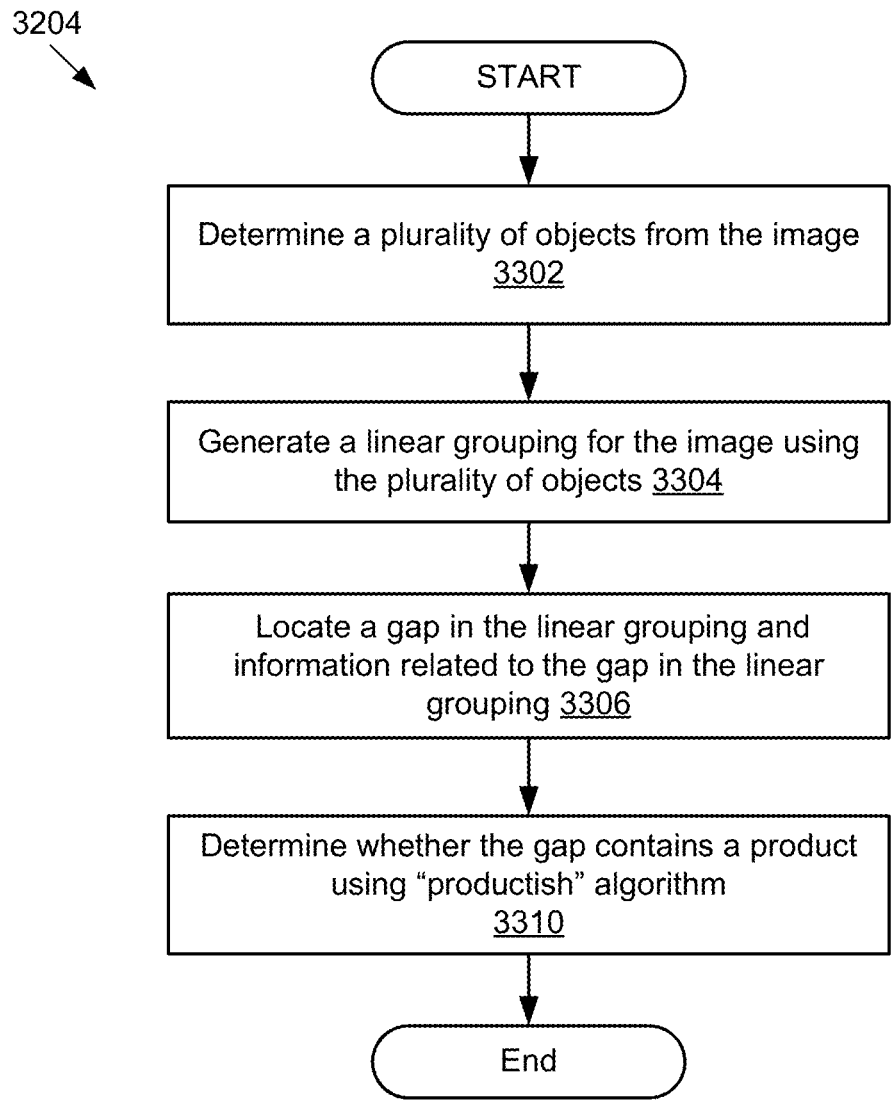
FIG. 33 is a flow diagram of an embodiment of a method for determining whether a gap contains a product.

FIG. 33 is a flow diagram of one embodiment of a method 3204 for determining if a gap contains a product. At 3302, the gap detector module 217 may determine a plurality of objects from the image. At 3304, the gap detector module 217 may receive linear grouping data related to the plurality of objects from the image processor. At 3306, the gap detector module 217 may locate a gap in the linear grouping and information related to the gap in the linear grouping. At 3310, the gap detector module 217 may determine whether the gap contains a product using the "productish" algorithm. The "productish" algorithm includes determining if the gap contains a potential product or a hole.

Figure 34:
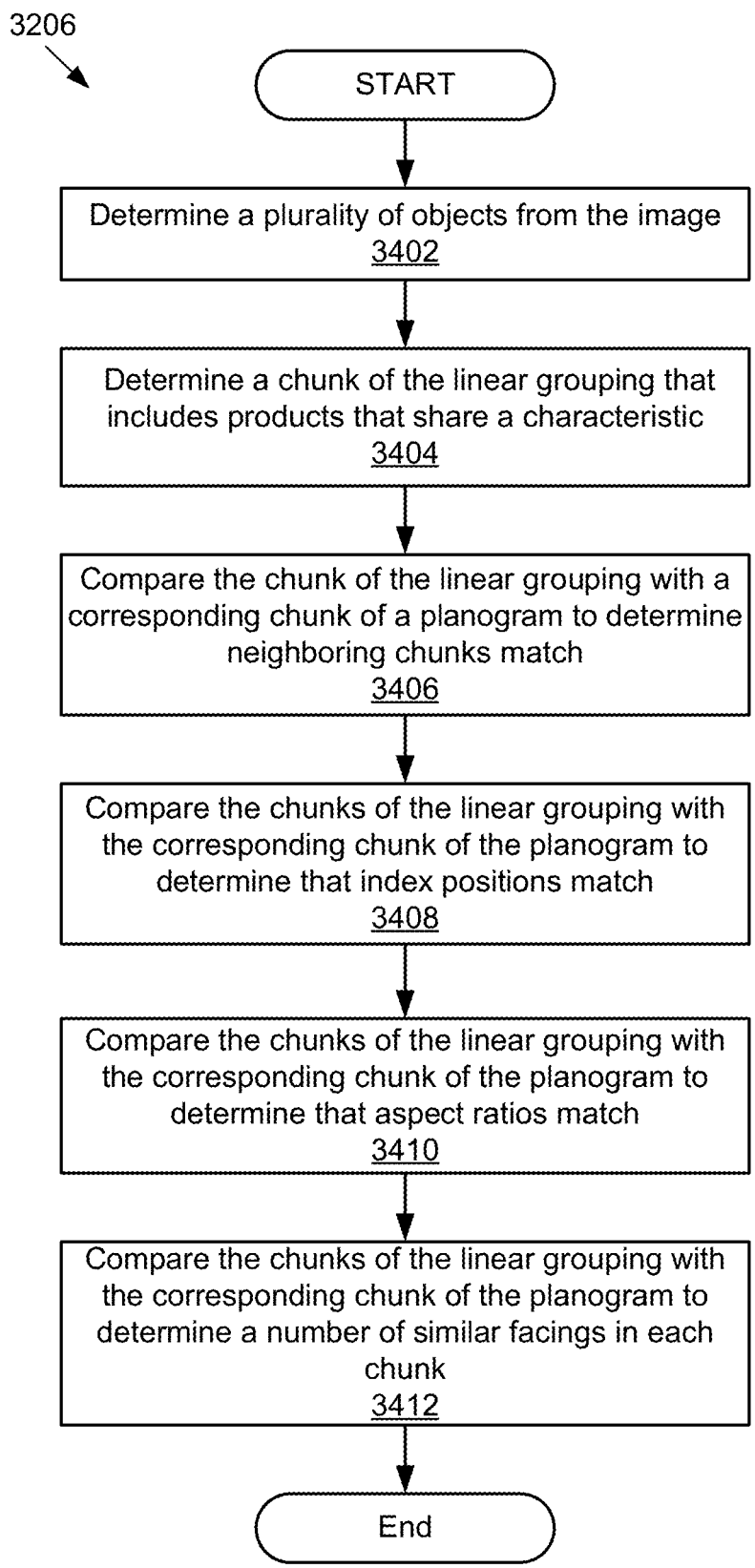
FIG. 34 is a flow diagram of an embodiment of a method for performing brand chunking.

FIG. 34 is a flow diagram 3206 of one embodiment of a method for performing brand chunking. At 3402, the analytics module 221 determines a plurality of objects from the image. At 3404, the analytics module 221 determines a chunk of the linear grouping that includes products that share a characteristic. At 3406, the analytics module 221 compares the chunk of the linear grouping with a corresponding chunk of a planogram to determine neighboring chunks match. At 3408, the analytics module 221 compares the chunks of the linear groupings with the corresponding chunks of the planogram to determine that index positions match. At 3410, the analytics module 221 compares the chunks of the linear groupings with the corresponding chunks of the planogram to determine that aspect ratios match. At 3412, the analytics module 221 compares the chunks of the linear grouping with the corresponding chunks of the planogram to determine the number of similar facings in each chunk.

Figure 35:
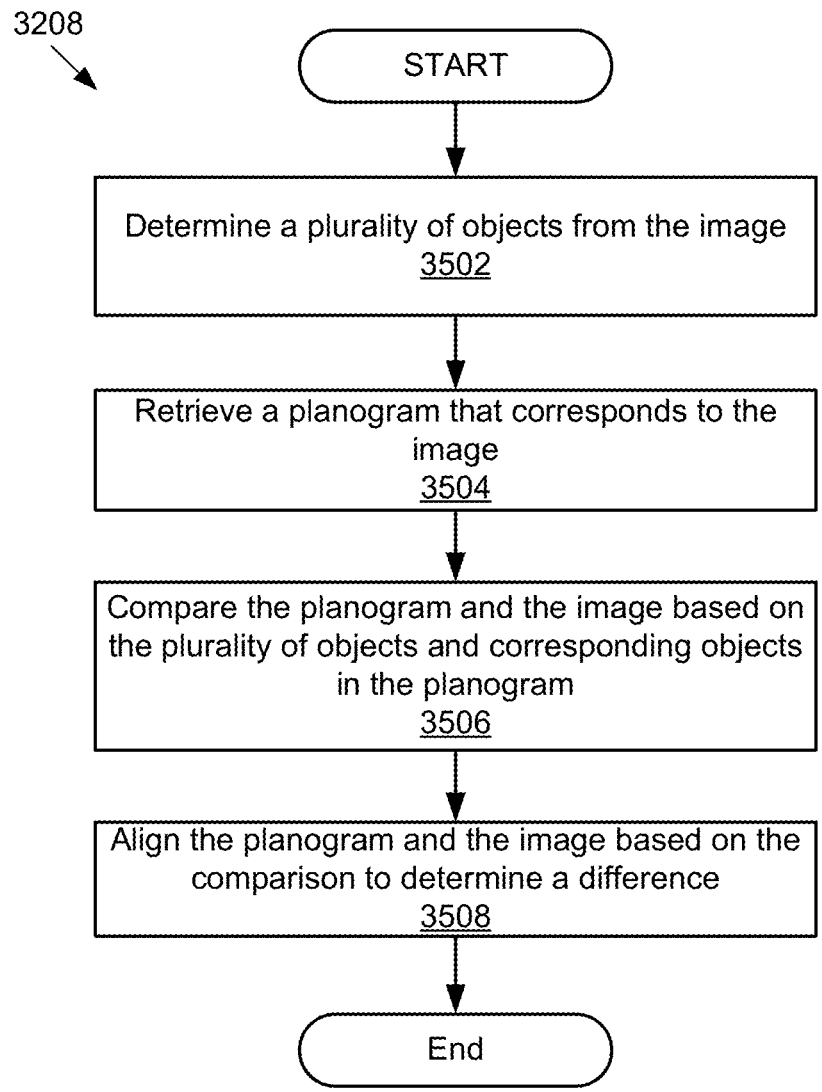
FIG. 35 is a flow diagram of an embodiment of a method for performing alignment.

FIG. 35 is a flow diagram of one embodiment of a method 3208 for performing alignment. At 3502, the alignment module 219 determines a plurality of objects from the image. At 3504, the alignment module 219 retrieves a planogram that corresponds to the image. At 3506, the alignment module 219 compares the planogram and the image based on the plurality of objects and corresponding objects in the planogram. At 3508, the alignment module 219 aligns the planogram and the image based on the comparison to determine a difference.

Figure 36:
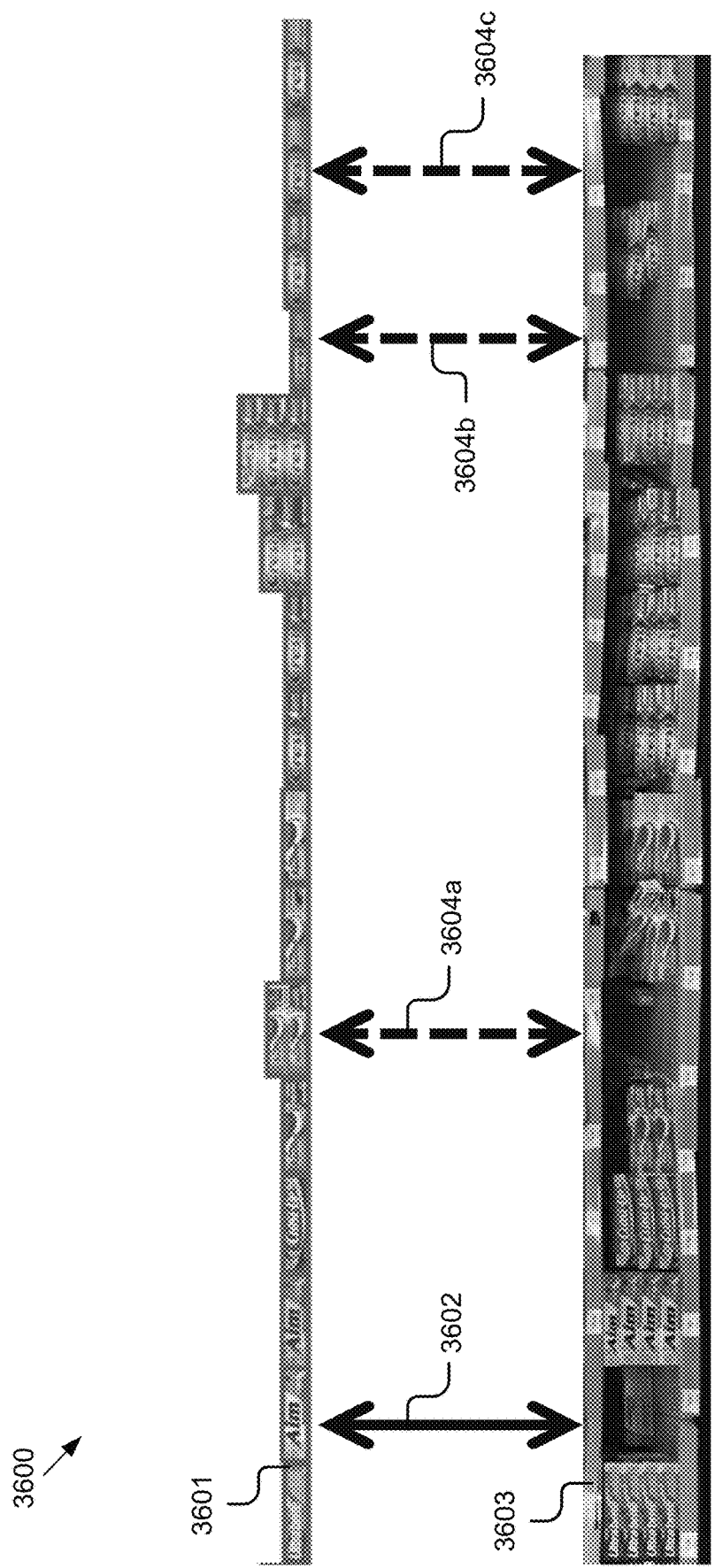
FIG. 36 is a graphical representation of an example of comparing an image with a planogram.

FIG. 36 is a graphical representation 3600 for comparing a planogram 3601 and an image 3603. The examples includes hidden out of stock 3602, where the planogram maps that one product should appear on a portion of the shelf and the image includes a second, different product on the corresponding portion of the shelf. The example also includes three visible out of stocks 3604 where the planogram indicates a product that should be present on the shelf and the image includes empty holes where those products should appear.

The output of Corrective Action Module 215 outputs symbolic data (e.g. JSON, XML, YAML or other formats). The example XML below gives a location and kind for the four corrective actions in FIG. 36. The location may be represented as indices into the planogram based on a linear group index and a facing index. The location may be a planogram location, an image (realogram) location or both and may specified in other ways (e.g. in image coordinates or physical shelf coordinates). In addition to location and kind, other information, may be included. Examples of other information may include recognition information, mapping between planogram and image (realogram) information, etc.

```
<CorrectiveActions>
    <CA>
        <Location><LinearGroup>5</LinearGroup><Facing>6</Facing></Location>
        <Kind>Hidden OoS</Kind>
    </CA>
    <CA>
        <Location><LinearGroup>5</LinearGroup><Facing>10</Facing></Location>
        <Kind>Visible OoS</Kind>
    </CA>
    <CA>
        <Location><LinearGroup>5</LinearGroup><Facing>17</Facing></Location>
        <Kind>Visible OoS</Kind>
    </CA>
    <CA>
        <Location><LinearGroup>5</LinearGroup><Facing>19</Facing></Location>
        <Kind>Visible OoS</Kind>
    </CA>
</CorrectiveActions>
```

A system and method for matching an image to a planogram has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
    capturing, by one or more processors, an image;
    processing, by the one or more processors, the image to identify a product based on a symbolic identifier;
    receiving, by the one or more processors, a planogram;
    identifying, by the one or more processors, a region of the planogram based on a linear grouping;
    identifying, by the one or more processors, a sample product and a neighboring sample product in the region of the planogram;
    determining, by the one or more processors, a match by comparing the sample product to the product and the neighboring sample product to a neighboring product of the product in a portion of the image;
    determining, by the one or more processors, a matching score for the match;
    determining, by the one or more processors, a geometrically consistent match between the product and the sample product included in the region of the planogram and between the neighboring product and the neighboring sample product included in the region of the planogram based on the matching score; and
    determining, by the one or more processors, an alignment between the region of the planogram and a corresponding region of the image that includes the product and the neighboring product based on the geometrically consistent match.

2. The computer-implemented method of claim 1, wherein determining the alignment includes determining a location in the corresponding region that does not include an expected product based on the planogram.

3. The computer-implemented method of claim 1, further comprising:
    determining, by the one or more processors, locations of corresponding products in the image based on expected product locations in the planogram;
    identifying, by the one or more processors, an unmatched location in the image where an expected product is mapped in the planogram and where a corresponding product is not identified in the image; and
    classifying, by the one or more processors, the unmatched location.

4. The computer-implemented method of claim 1, wherein the region of the planogram includes a match region and one or more neighbor regions.

5. The computer-implemented method of claim 1, wherein determining the match by comparing the sample product to the product and the neighboring sample product to the neighboring product of the product in the portion of the image further comprises:
    determining, by the one or more processors, whether the match satisfies a condition for discriminating a correct match; and
    identifying, by the one or more processors, the match as the geometrically consistent match in response to the condition being satisfied.

6. The computer-implemented method of claim 1, wherein the alignment is a difference and the computer-implemented method further comprises:
    identifying, by the one or more processors, a corrective action based on the difference between the region of the planogram and the corresponding region of the image that includes the product; and providing, by the one or more processors, the corrective action.

7. The computer-implemented method of claim 1, further comprising:

identifying, by the one or more processors, an expected product included in the planogram;

determining, by the one or more processors, a similar product included in a database of products, the similar product sharing a similarity with the expected product;

presenting, by the one or more processors, the similar product;

receiving, by the one or more processors, a selection of the similar product as an identified similar product; and storing, by the one or more processors, the identified similar product and the expected product for use in real world ground truth generation.

8. A system comprising:

a processor; and a memory storing instructions that, when executed, cause the system to perform operations including:

capturing an image;

processing the image to identify a product based on a symbolic identifier;

receiving a planogram;

identifying a region of the planogram based on a linear grouping;

identifying a sample product and a neighboring sample product in the region of the planogram;

determining a match by comparing the sample product to the product and the neighboring sample product to a neighboring product of the product in a portion of the image;

determining a matching score for the match;

determining a geometrically consistent match between the product and the sample product included in the region of the planogram and between the neighboring product and the neighboring sample product included in the region of the planogram based on the matching score; and determining an alignment between the region of the planogram and a corresponding region of the image that includes the product and the neighboring product based on the geometrically consistent match.

9. The system of claim 8, wherein determining the alignment includes determining a location in the corresponding region that does not include an expected product based on the planogram.

10. The system of claim 8, wherein the memory stores instructions that, when executed, further cause the system to perform operations including:

determining locations of corresponding products in the image based on expected product locations in the planogram;

identifying an unmatched location in the image where an expected product is mapped in the planogram and where a corresponding product is not identified in the image; and classifying the unmatched location.

11. The system of claim 8, wherein the region of the planogram includes a match region and one or more neighbor regions.

12. The system of claim 8, wherein determining the match by comparing the sample product to the product and the neighboring sample product to the neighboring product of the product in the portion of the image further comprises:

determining whether the match satisfies a condition for discriminating a correct match; and identifying the match as the geometrically consistent match in response to the condition being satisfied.

13. The system of claim 8, wherein the alignment is a difference and wherein the memory stores instructions that, when executed, further cause the system to perform operations including:

identifying a corrective action based on the difference between the region of the planogram and the corresponding region of the image that includes the product; and providing the corrective action.

14. The system of claim 8, wherein the memory stores instructions that, when executed, further cause the system to perform operations including:

identifying an expected product included in the planogram;

determining a similar product included in a database of products, the similar product sharing a similarity with the expected product;

presenting the similar product;

receiving a selection of the similar product as an identified similar product; and storing the identified similar product and the expected product for use in real world ground truth generation.

15. A computer program product comprising a non-transitory computer usable medium including a computer readable program, wherein the computer readable program when executed on a computer causes the computer to perform operations including:

capturing an image;

processing the image to identify a product based on a symbolic identifier;

receiving a planogram;

identifying a region of the planogram based on a linear grouping;

identifying a sample product and a neighboring sample product in the region of the planogram;

determining a match by comparing the sample product to the product and the neighboring sample product to a neighboring product of the product in a portion of the image;

determining a matching score for the match;

determining a geometrically consistent match between the product and the sample product included in the region of the planogram and between the neighboring product and the neighboring sample product included in the region of the planogram based on the matching score; and determining an alignment between the region of the planogram and a corresponding region of the image that includes the product and the neighboring product based on the geometrically consistent match.

16. The computer program product of claim 15, wherein the computer program product further causes the computer to perform operations including:

determining locations of corresponding products in the image based on expected product locations in the planogram;

identifying an unmatched location in the image where an expected product is mapped in the planogram and where a corresponding product is not identified in the image; and classifying the unmatched location.

17. The computer program product of claim 15, wherein the region of the planogram includes a match region and one or more neighbor regions.

18. The computer program product of claim 15, wherein the computer program product further causes the computer to perform operations including:
   determining whether the match satisfies a condition for discriminating a correct match; and
   identifying the match as the geometrically consistent match in response to the condition being satisfied.

19. The computer program product of claim 15, wherein the alignment is a difference and wherein the computer program product further causes the computer to perform operations including:
   identifying a corrective action based on the difference between the region of the planogram and the corresponding region of the image that includes the product; and
   providing the corrective action.

20. The system computer program product of claim 15, wherein the computer program product further causes the computer to perform operations including:
   identifying an expected product included in the planogram;
   determining a similar product included in a database of products, the similar product sharing a similarity with the expected product;
   presenting the similar product;
   receiving a selection of the similar product as an identified similar product; and
   storing the identified similar product and the expected product for use in real world ground truth generation.

\* \* \* \* \*

UNITED STATES PATENT AND TRADEMARK OFFICE
CERTIFICATE OF CORRECTION

| | |
|---|---|
| PATENT NO. | : 10,592,854 B2 |
| APPLICATION NO. | : 15/164633 |
| DATED | : March 17, 2020 |
| INVENTOR(S) | : Edward L. Schwartz |

Page 1 of 1

It is certified that error appears in the above-identified patent and that said Letters Patent is hereby corrected as shown below:

In the Claims

In Column 45, Line 20, please replace "The system computer program product of claim 15" with --The computer program product of claim 15--

Signed and Sealed this
Twelfth Day of May, 2020

Andrei Iancu
*Director of the United States Patent and Trademark Office*